United States Patent
Dyer et al.

(10) Patent No.: US 11,840,036 B2
(45) Date of Patent: Dec. 12, 2023

(54) METHOD OF MANUFACTURING A COMPONENT OF AN OUTSOLE FOR USE IN AN ARTICLE OF FOOTWEAR

(71) Applicant: NIKE, Inc., Beaverton, OR (US)

(72) Inventors: Caleb W. Dyer, Beaverton, OR (US); Jay Constantinou, Beaverton, OR (US); Jeremy D. Walker, Portland, OR (US); Zachary C. Wright, Beaverton, OR (US)

(73) Assignee: NIKE, INC., Beaverton, OR (US)

( * ) Notice: Subject to any disclaimer, the term of this patent is extended or adjusted under 35 U.S.C. 154(b) by 113 days.

(21) Appl. No.: 17/360,517

(22) Filed: Jun. 28, 2021

(65) Prior Publication Data

US 2021/0323256 A1    Oct. 21, 2021

Related U.S. Application Data

(63) Continuation of application No. 16/052,213, filed on Aug. 1, 2018, now Pat. No. 11,084,239.

(Continued)

(51) Int. Cl.
*A43B 5/02*     (2006.01)
*B29D 35/14*   (2010.01)
(Continued)

(52) U.S. Cl.
CPC .............. *B29D 35/142* (2013.01); *A43B 5/02* (2013.01); *A43B 13/14* (2013.01); *B29C 45/14* (2013.01);
(Continued)

(58) Field of Classification Search
CPC ......... A43B 13/122; A43B 5/02; A43B 13/22; B29D 35/142; B29D 35/122; B29K 2105/0061; B29K 2101/12
(Continued)

(56) References Cited

U.S. PATENT DOCUMENTS 2,920,983 A    1/1960  Bugosh
3,246,068 A    4/1966  Ferreira
(Continued)

FOREIGN PATENT DOCUMENTS

CN          1890097 A1    1/2007
CN       201157028 A1   12/2008
(Continued)

OTHER PUBLICATIONS

International Preliminary Examination Report issued for PCT/US2018/044768, dated Sep. 20, 2019.
(Continued)

*Primary Examiner* — Marie D Bays
(74) *Attorney, Agent, or Firm* — THOMAS | HORSTEMEYER, LLP

(57) ABSTRACT

An outsole component for use in an article of footwear is manufactured using a molding process that incorporates a second polymeric material with a film component including a first layer formed of a polymeric hydrogel material. The first layer forms the external or ground-facing layer of the outsole. Methods of manufacturing the outsole component, as well as articles of footwear including outsole component and methods of manufacturing such articles of footwear are also described.

16 Claims, 5 Drawing Sheets

Related U.S. Application Data

(60) Provisional application No. 62/539,720, filed on Aug. 1, 2017.

(51) Int. Cl.

| | | |
|---|---|---|
| *A43B 13/14* | (2006.01) | |
| *B29C 45/14* | (2006.01) | |
| *B29D 35/00* | (2010.01) | |
| *B29D 35/12* | (2010.01) | |
| *A43B 13/12* | (2006.01) | |
| *B29K 67/00* | (2006.01) | |
| *B29K 69/00* | (2006.01) | |
| *B29K 75/00* | (2006.01) | |
| *B29K 79/00* | (2006.01) | |
| *B29K 105/00* | (2006.01) | |

(52) U.S. Cl.
CPC .. *B29C 45/14065* (2013.01); *B29C 45/14073* (2013.01); *B29C 45/14467* (2013.01); *B29D 35/0009* (2013.01); *B29D 35/122* (2013.01); *A43B 13/12* (2013.01); *A43B 13/122* (2013.01); *B29C 2045/14155* (2013.01); *B29K 2067/00* (2013.01); *B29K 2069/00* (2013.01); *B29K 2075/00* (2013.01); *B29K 2079/085* (2013.01); *B29K 2105/0061* (2013.01)

(58) Field of Classification Search
USPC .......................................................... 36/25 R
See application file for complete search history.

(56) References Cited

U.S. PATENT DOCUMENTS

| | | |
|---|---|---|
| 3,463,662 A | 8/1969 | Hodes |
| 3,637,001 A | 1/1972 | Roberts et al. |
| 4,118,354 A | 10/1978 | Harada et al. |
| 4,271,608 A | 6/1981 | Tomuro |
| 4,501,591 A | 2/1985 | Ucci et al. |
| 4,520,138 A | 5/1985 | Himes |
| 4,523,005 A | 6/1985 | Szycher |
| 4,924,608 A | 5/1990 | Mogonye |
| 4,990,357 A | 2/1991 | Karakelle et al. |
| 5,120,816 A | 6/1992 | Gould et al. |
| 5,160,790 A | 11/1992 | Elton |
| 5,480,377 A | 1/1996 | Cartmell et al. |
| 5,576,072 A | 11/1996 | Hostettler et al. |
| 5,591,779 A | 1/1997 | Bleys et al. |
| 5,763,335 A | 6/1998 | Hermann |
| 5,832,636 A | 11/1998 | Lyden et al. |
| 5,943,792 A | 8/1999 | Powell |
| 5,969,076 A | 10/1999 | Lai et al. |
| 6,003,191 A | 12/1999 | Sherry et al. |
| 6,011,104 A | 1/2000 | Udy |
| 6,046,295 A | 4/2000 | Frisch, Jr. et al. |
| 6,076,283 A | 6/2000 | Boie |
| 6,112,380 A | 9/2000 | Dolan et al. |
| 6,162,369 A | 12/2000 | Allewaert et al. |
| 6,203,812 B1 | 3/2001 | Ehrhard et al. |
| 6,335,392 B1 | 1/2002 | Umezawa et al. |
| 6,367,167 B1 | 4/2002 | Krstic et al. |
| 6,698,110 B1 | 3/2004 | Robbins |
| 6,782,642 B2 | 8/2004 | Knoche et al. |
| 6,855,743 B1 | 2/2005 | Gvozdic |
| 6,874,251 B2 | 4/2005 | Moretti |
| 6,922,918 B2 | 8/2005 | Issler |
| 6,948,264 B1 | 9/2005 | Lyden |
| 6,949,271 B2 | 9/2005 | Shannon et al. |
| 7,020,988 B1 | 4/2006 | Holden et al. |
| 7,169,720 B2 | 1/2007 | Etchells et al. |
| 7,373,739 B2 | 5/2008 | Doerer et al. |
| 7,451,511 B2 | 11/2008 | Ellis et al. |
| 7,451,557 B2 | 11/2008 | McDonald et al. |
| 7,594,345 B2 | 9/2009 | Fusco |
| 7,752,775 B2 | 7/2010 | Lyden |
| 7,785,521 B1 | 8/2010 | Chen |
| 7,814,687 B2 | 10/2010 | Cook et al. |
| 7,832,120 B2 | 11/2010 | Jung |
| 7,845,096 B2 | 12/2010 | Ellis et al. |
| 7,854,076 B2 | 12/2010 | Keppler et al. |
| 8,110,242 B2 | 2/2012 | Hawkins et al. |
| 8,291,617 B2 | 10/2012 | Halberstadt et al. |
| 8,303,977 B2 | 11/2012 | Kuzma et al. |
| 8,609,766 B2 | 12/2013 | Cristiano |
| 8,791,200 B2 | 7/2014 | Köcher et al. |
| 8,796,394 B2 | 8/2014 | Messersmith et al. |
| 8,853,289 B2 | 10/2014 | Smith et al. |
| 8,906,497 B2 | 12/2014 | Marchgraber et al. |
| 9,139,684 B2 | 9/2015 | Coneski et al. |
| 9,206,114 B1 | 12/2015 | Coneski et al. |
| 9,392,841 B2 | 7/2016 | Walker et al. |
| 9,456,654 B2 | 10/2016 | Dyer et al. |
| 10,051,913 B2 | 8/2018 | Dyer et al. |
| 10,064,447 B2 | 9/2018 | Wright et al. |
| 10,070,685 B2 | 9/2018 | Walker et al. |
| 10,076,154 B2 | 9/2018 | Walker et al. |
| 10,076,155 B2 | 9/2018 | Dyer et al. |
| 10,076,156 B2 | 9/2018 | Dyer et al. |
| 10,076,157 B2 | 9/2018 | Wright et al. |
| 10,076,158 B2 | 9/2018 | Wright et al. |
| 10,085,513 B2 | 10/2018 | Dyer et al. |
| 10,092,062 B2 | 10/2018 | Wright et al. |
| 10,130,140 B2 | 11/2018 | Dyer et al. |
| 11,084,239 B2 * | 8/2021 | Dyer ...................... A43B 13/14 |
| 2001/0053897 A1 | 12/2001 | Frate et al. |
| 2002/0116843 A1 | 8/2002 | Harrison |
| 2002/0188057 A1 | 12/2002 | Chen |
| 2003/0074718 A1 | 4/2003 | English |
| 2003/0213148 A1 | 11/2003 | Knowles |
| 2003/0226283 A1 | 12/2003 | Braunschweiler |
| 2004/0020080 A1 | 2/2004 | Cox et al. |
| 2004/0147188 A1 | 7/2004 | Johnson et al. |
| 2004/0255362 A1 | 12/2004 | Soerens et al. |
| 2005/0288440 A1 | 12/2005 | Chou et al. |
| 2006/0035030 A1 | 2/2006 | Fan |
| 2006/0141186 A1 | 6/2006 | Janssen et al. |
| 2007/0017124 A1 | 1/2007 | Koo et al. |
| 2007/0124960 A1 | 6/2007 | Friedman |
| 2007/0141306 A1 | 6/2007 | Kasai et al. |
| 2008/0120869 A1 | 5/2008 | Roy et al. |
| 2008/0155857 A1 | 7/2008 | Rosen |
| 2008/0241371 A1 | 10/2008 | Havelka et al. |
| 2008/0314287 A1 | 12/2008 | Clark et al. |
| 2009/0084477 A1 | 4/2009 | Sandstrom et al. |
| 2009/0090031 A1 | 4/2009 | Jung |
| 2009/0234039 A1 | 9/2009 | Schutte et al. |
| 2009/0313855 A1 | 12/2009 | Yoshida et al. |
| 2010/0048752 A1 | 2/2010 | Vignola et al. |
| 2010/0083534 A1 | 4/2010 | Howlett |
| 2010/0109200 A1 | 5/2010 | Cox et al. |
| 2010/0113733 A1 | 5/2010 | Cox et al. |
| 2010/0146824 A1 | 6/2010 | Sensini |
| 2010/0154253 A1 | 6/2010 | Imazato et al. |
| 2010/0215707 A1 | 8/2010 | McDonald et al. |
| 2010/0323573 A1 | 12/2010 | Chu et al. |
| 2011/0008612 A1 | 1/2011 | Lee |
| 2011/0112236 A1 | 5/2011 | Ding |
| 2011/0287929 A1 | 11/2011 | Smith et al. |
| 2012/0088602 A1 | 4/2012 | Morken |
| 2012/0148778 A1 | 6/2012 | Dawkins |
| 2012/0151805 A1 | 6/2012 | Polegato Moretti |
| 2012/0210608 A1 | 8/2012 | Baker et al. |
| 2012/0216423 A1 | 8/2012 | Lyden |
| 2012/0216424 A1 | 8/2012 | Lyden |
| 2012/0260535 A1 | 10/2012 | Tsang |
| 2012/0312192 A1 | 12/2012 | Detty et al. |
| 2013/0109804 A1 | 5/2013 | Kusaka et al. |
| 2013/0255103 A1 | 10/2013 | Dua et al. |
| 2013/0260104 A1 | 10/2013 | Dua et al. |
| 2013/0260629 A1 | 10/2013 | Dua et al. |
| 2013/0340295 A1 | 12/2013 | Adami et al. |
| 2014/0024768 A1 | 1/2014 | Coneski et al. |
| 2014/0075791 A1 | 3/2014 | Smith et al. |

(56) References Cited

U.S. PATENT DOCUMENTS

| | | |
|---|---|---|
| 2014/0217636 A1 | 8/2014 | Skaja et al. |
| 2015/0141539 A1 | 5/2015 | Lee |
| 2015/0307745 A1 | 10/2015 | Popa et al. |
| 2015/0353474 A1 | 12/2015 | Coneski et al. |
| 2015/0353741 A1 | 12/2015 | Liao |
| 2016/0058107 A1 | 3/2016 | Walker et al. |
| 2016/0136912 A1 | 5/2016 | Le et al. |
| 2016/0286905 A1 | 10/2016 | Schiller |
| 2016/0295959 A1 | 10/2016 | Dyer et al. |

FOREIGN PATENT DOCUMENTS

| | | |
|---|---|---|
| CN | 201360601 A1 | 12/2009 |
| CN | 201445011 A1 | 5/2010 |
| CN | 101873812 A1 | 10/2010 |
| CN | 101953525 A1 | 1/2011 |
| CN | 101953534 A1 | 1/2011 |
| CN | 102038315 A1 | 5/2011 |
| CN | 102216063 A | 10/2011 |
| CN | 102250407 A | 11/2011 |
| CN | 102595949 A | 7/2012 |
| CN | 203952576 A1 | 11/2014 |
| CN | 104549961 A1 | 4/2015 |
| CN | 105982390 A | 10/2016 |
| DE | 4138941 A1 | 6/1993 |
| DE | 29602823 A1 | 4/1996 |
| DE | 102013221204 A1 | 4/2015 |
| EP | 1894482 A1 | 4/2008 |
| EP | 2030517 A1 | 3/2009 |
| EP | 2462908 A1 | 6/2012 |
| EP | 2292113 A1 | 12/2012 |
| GB | 2313537 A1 | 12/1997 |
| JP | H06253905 A | 9/1994 |
| JP | H08258511 A | 10/1996 |
| JP | H105005 A | 1/1998 |
| JP | 2000166609 A1 | 6/2000 |
| JP | 2000308501 A1 | 11/2000 |
| JP | 2002325601 A1 | 11/2002 |
| JP | 2005111691 A1 | 4/2005 |
| JP | 2008260889 A1 | 10/2008 |
| JP | 2010099332 A1 | 5/2010 |
| JP | 4864227 A1 | 2/2012 |
| KR | 100750324 B1 | 8/2007 |
| KR | 101232846 B1 | 6/2012 |
| KR | 20120124616 A | 11/2012 |
| TW | 377281 B | 12/1999 |
| TW | 201002788 A | 1/2010 |
| TW | 201616994 A | 5/2016 |
| WO | 0043449 A1 | 7/2000 |
| WO | 2005000061 A1 | 1/2005 |
| WO | 2006015325 A1 | 2/2006 |
| WO | 2007090245 A1 | 8/2007 |
| WO | 2007135069 A1 | 11/2007 |
| WO | 2013106658 A1 | 7/2013 |
| WO | 2014025161 A1 | 2/2014 |
| WO | 2014126643 A1 | 8/2014 |
| WO | 2015073636 A1 | 5/2015 |
| WO | 2016033271 A1 | 3/2016 |
| WO | 2016033274 A1 | 3/2016 |
| WO | 2016033276 A1 | 3/2016 |
| WO | 2016033277 A1 | 3/2016 |
| WO | 2016144531 A1 | 9/2016 |

OTHER PUBLICATIONS

International Search Report and Written Opinion for PCT/US2018/044768 dated Oct. 15, 2018.

Written Opinion of the International Preliminary Examining Authority for PCT/US2018/044768 dated Jun. 6, 2019.

* cited by examiner

US 11,840,036 B2

METHOD OF MANUFACTURING A COMPONENT OF AN OUTSOLE FOR USE IN AN ARTICLE OF FOOTWEAR

CLAIM OF PRIORITY TO RELATED APPLICATION

This application is a Continuation of and claims priority to U.S. Non-Provisional application Ser. No. 16/052,213, having the title "METHOD OF MANUFACTURING A COMPONENT OF AN OUTSOLE FOR USE IN AN ARTICLE OF FOOTWEAR", filed on Aug. 1, 2018, which claims the benefit of and priority to U.S. Provisional Application No. 62/539,720 filed on Aug. 1, 2017, the entire contents of which are incorporated herein by reference.

FIELD

This disclosure relates generally to articles of footwear. More specifically, the present disclosure relates to the manufacture of components of outsoles which can include complete outsole units that can be incorporated into articles of footwear such as those that are used under conditions conducive to the accumulation of soil on the outsoles.

BACKGROUND

The statements in this section merely provide background information related to the present disclosure and may not constitute prior art.

Articles of footwear of various types are frequently used for a variety of activities including outdoor activities, military use, and competitive sports. The outsoles of these types of footwear often are designed to provide traction on soft and slippery surfaces, such as unpaved surfaces including grass and dirt. For example, exaggerated tread patterns, lugs, cleats or spikes (both integral and removable), and rubber formulations which provide improved traction under wet conditions, have been used to improve the level of traction provided by the outsoles.

While these conventional means generally help give footwear improved traction, the outsoles often accumulate soil (e.g., inorganic materials such as mud, dirt, sand and gravel, organic material such as grass, turf, and other vegetation, and combinations of inorganic and organic materials) when the footwear is used on unpaved surfaces. In some instances, the soil can accumulate in the tread pattern (when a tread pattern is present), around and between lugs (when lugs are present), or on shafts of the cleats, in the spaces surrounding the cleats, and in the interstitial regions between the cleats (when cleats are present). The accumulations of soil can weigh down the footwear and interfere with the traction between the outsole and the ground.

DRAWINGS

In order that the disclosure may be well understood, there will now be described various forms thereof, given by way of example, reference being made to the accompanying drawings, in which.

Figure 1:
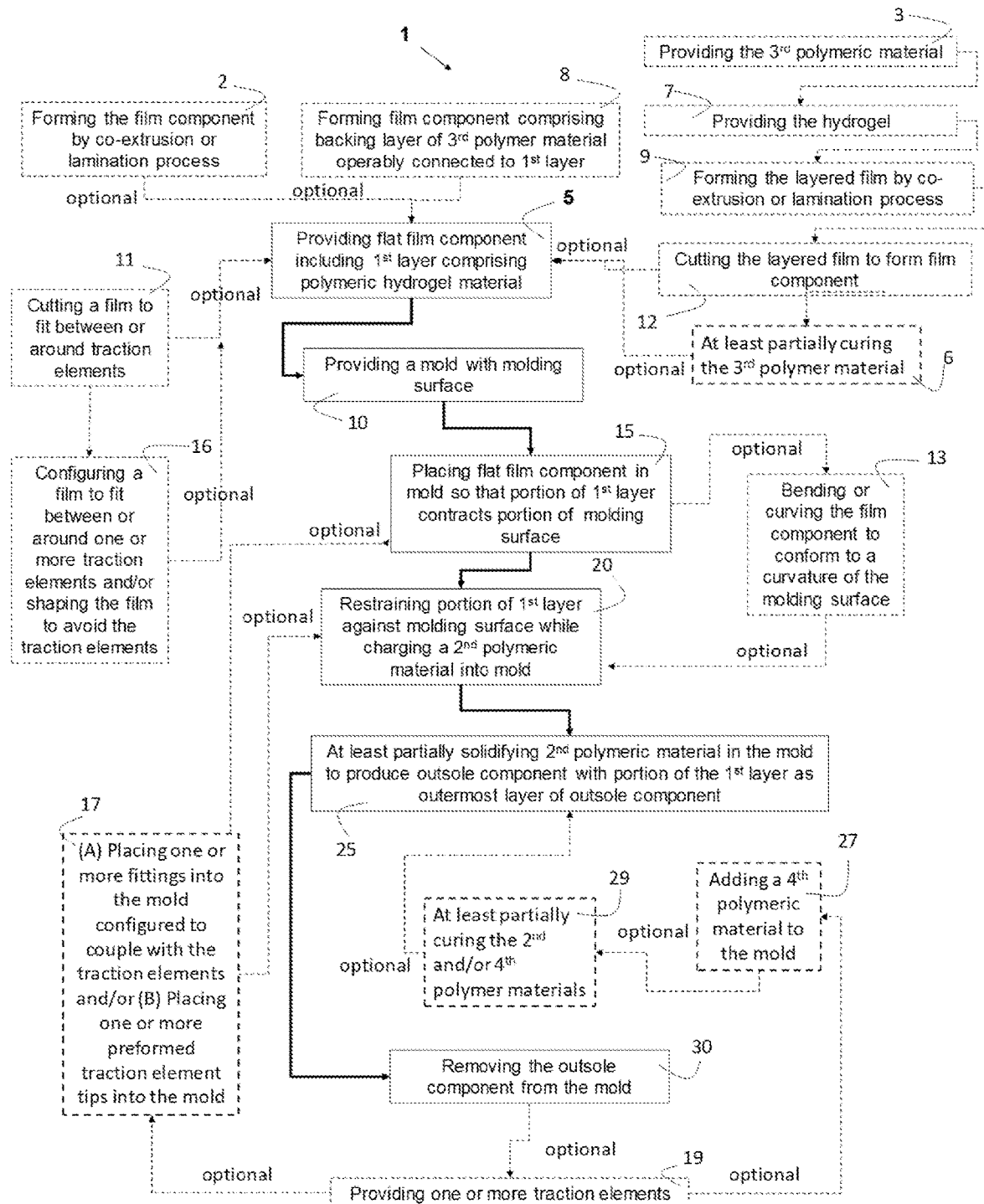
FIG. 1 is a flowchart describing a method of manufacturing an outsole or a component of an outsole according to an aspect of the present disclosure.

The drawings described herein are for illustration purposes only and are not intended to limit the scope of the present disclosure in any way.

DETAILED DESCRIPTION

The present disclosure generally provides an improved manufacturing process for making outsole components using a polymeric hydrogel material, as well as the outsole component formed therefrom.

Previous methods of manufacturing an outsole component for an article of footwear which include a hydrogel material defining a ground-contacting surface of the component involved first conforming a substantially planar portion of a hydrogel film to the curved shape of an outsole using a thermoforming process by heating and drawing the film against a mold, forming a curved and shaped film component having a three-dimensional shape (e.g., a curved and shaped component, the component having a depth at least 5 times greater than a thickness of the hydrogel film prior to the thermoforming). Due to the configuration of thermoforming equipment, a relatively large portion of the film is fed into the equipment (e.g., a 9 inch by 16 inch portion of film) to thermoform a single component, leading to a large proportion of the portion of film being wasted as scrap. After cooling the curved, shaped film component, excess film was then trimmed from a curved region of the perimeter of the curved, shaped film component. The trimmed component was then placed in an injection mold, and the mold was then back injected with a thermoplastic material to form the outsole component. This process required heating the hydrogel film twice—first during the thermoforming step, and then during the back-injection step. This process also involved drawing the hydrogel film while it was heated during the thermoforming process, producing thinning of the film in some regions of the component, such as in regions on or between traction elements, as well as a large proportion of excess material which ended up as scrap. Additionally, this process also required trimming the excess material from the perimeter of the thermoformed portion, in an area that was curved (i.e., not substantially planar), requiring either manually cutting out each thermoformed component, or using complicated, slow and expensive automated cutting equipment capable of cutting in the x, y and z dimensions.

In contrast, the present method eliminates the need for the thermoforming step. Eliminating the thermoforming step reduces the thermal history to which the hydrogel material is exposed during manufacturing, which can lead to reduced defects and increased durability in the finished product. The present method can also reduce the amount of scrap material produced while allowing the use of simpler, faster, more cost-effective manufacturing processes which can be more readily automated.

In one aspect, the present disclosure is directed to a method of manufacturing an outsole component for an article of footwear, the method comprising: providing a film component comprising a first externally-facing surface, the film component including a first layer compositionally comprising a polymeric hydrogel material, the first layer defining at least a portion of the first externally-facing surface of the film component; providing a mold having a molding surface; placing the film component into the mold; restraining the film component so that at least a portion of the first layer against the portion of the molding surface, forming a restrained film component; charging a second polymeric material into the mold with the restrained film component; at least partially solidifying the charged second polymeric material in the mold to produce an outsole component with an outermost surface comprising at least a portion of the first layer of the film component; and removing the outsole component from the mold. The present disclosure is also directed to outsole components manufactured according to these methods, as well as methods of manufacturing articles of footwear comprising providing an outsole component manufactured according to these methods, providing an upper for an article of footwear, and securing the outsole component and the upper to each other, such that the polymeric hydrogel material of the outsole component defines a ground-facing surface of the article of footwear.

In another aspect, the present disclosure is directed to an outsole component for an article of footwear, the outsole component comprising: a ground-contacting surface; at least one film component, the film component having a first surface, a second surface opposed to the first surface, and an external perimeter, the film component compositionally comprising a polymeric hydrogel material, the polymeric hydrogel material defining at least a portion of the first surface of the film component, and at least a portion of a ground-contacting surface of the outsole component; a second polymeric material operably connected to the second surface of the film component and to the entire external perimeter of each of the one or more film components; and one or more traction elements; wherein the at least one film component fits between or around the one or more traction elements.

Now having describe aspects of the present disclosure generally, additional details are provided. In an aspect, the method of the present disclosure begins with providing a film component including a first layer comprising a polymeric hydrogel material. Instead of providing a portion of hydrogel film, thermoforming the portion into a three-dimensional curved shape and then trimming along a perimeter of the thermoformed region to form a component which will fit within an injection mold, in the present method, the hydrogel film is provided as a film component. The film component is configured to be placed into a mold, i.e., when the mold is closed, the film component does not extend beyond the perimeter of the molding surface of the mold. The film component can be a pre-cut component, such as a substantially planar pre-cut film component. In particular aspects, once the film of the film component has been formed, the film itself as well as the film component are not thermoformed or otherwise heated above 80° C.

In some aspects, a portion of film can be cut or stamped or molded to form the shape of the film component. The film can be an extruded or co-extruded film, including an extruded layered film. In some aspects, the film component is configured to fit between or around one or more traction elements; i.e., the perimeter of the film component can be shaped to go between or around the base of a traction element, or one or more interior portions of the film component can be cut out e.g., forming a hole or a void, to go between or around the base of one or more traction elements, or both.

Next, a mold having a molding surface is provided, and the film component is placed in the mold so that a portion of the first layer of the film component (the first layer comprising the polymeric hydrogel material) contacts a portion of the molding surface of the mold. In aspects where the film component is substantially planar and the molding surface is curved, the film component can be bent or curved in order to fit into the mold and contact the molding surface. However, it is to be understood that this bending or curving will not involve heating the film component above 80 degrees Celsius (C). Next, the portion of the first layer contacting the molding surface is restrained against the portion of the molding surface while a second polymeric material is charged into the mold. Restraining the portion of the first layer against the molding surface reduces or eliminates the need to thermoform the film component and can prevent or reduce seepage of the second polymeric material between the film component and the molding surface during the charging step. In some aspects, the step of restraining the first layer of the portion against the molding surface can include applying a vacuum to the film component, or applying pins to the film component, or both. The charging step can include injection molding or pouring the second polymeric material into the mold. Once the second polymeric material has at least partially solidified within the mold, the outsole component can be removed from the mold. The use of the process of this disclosure avoids issues such as drawing and stretching of the film during thermoforming, which can damage the film resulting in rejects or scrap. The use of this process also reduces the "thermal history" of the film by limiting the number of times the hydrogel material is exposed to temperatures above 80 degrees C. during the manufacturing process, which can result in degradation of the material. The use of this process can also reduce the amount of waste material as compared to a conventional thermoforming process.

As used herein the term "outsole component" refers to a component which can be combined with one or more additional components to form a complete outsole unit, as well as to a complete outsole unit which can be attached to an upper to form an article of footwear. The term polymeric hydrogel material, hydrogel material, and hydrogel are used interchangeably throughout the disclosure to refer to the same element or material composition.

According to one aspect of a method of manufacturing an outsole component for an article of footwear according to the present disclosure comprises providing one or more flat film components that are formed of a layered film having a polymeric material forming a backing layer and a polymeric hydrogel material operably connected to the backing layer, such that the polymeric hydrogel material defines an externally-facing surface of the flat film component. Then a mold having a molding surface is provided and the flat film component is placed into the mold such that the polymeric hydrogel layer of the layered film is in direct contact with at least a portion of the molding surface. A second polymeric material is added into the mold such that the film component defines at least a portion of an external surface of the outsole with the hydrogel forming an outermost layer thereof. The film component is held against the molding surface during at least a portion of the adding of the second polymeric material to the mold. The second polymeric material is solidified in the mold; and the outsole or outsole component 5 is then removed from the mold.

According to another aspect of the present disclosure, a method of manufacturing an article of footwear comprises providing an outsole component manufactured according to the method described above and further defined herein; providing an upper; and securing the outsole component and the upper to each other, such that the polymeric hydrogel material defines a ground-facing surface of the article of footwear.

According to yet another aspect of the present disclosure an outsole component for an article of footwear comprises one or more film components, wherein each of the film components has an external perimeter and the film of each of the film components comprises a backing layer of a first polymeric film and a polymeric hydrogel material operably connected to the backing layer, such that the polymeric hydrogel material defines a ground-contacting surface of the outsole component. A second polymeric material is operably connected to the backing layer and to the entire external perimeter of each of the one or more film components. The outsole component further comprises one or more traction elements with the one or more film components being configured to fit between or around the traction elements.

The outsole components formed according to the teachings of the present disclosure can prevent or reduce the accumulation of soil on their surfaces during use or wear on unpaved surfaces. As used herein, the term "soil" includes one or more of a variety of materials that are commonly present in the ground or on playing surfaces, which might otherwise adhere to an article (e.g., exposed outsole of a footwear article, etc.). Soil can include, without limitation, inorganic materials, such as mud, sand, dirt, and gravel; organic matter such as grass, turf, leaves, other vegetation, and excrement; and combinations of inorganic and organic materials, such as clay. Additionally, soil can include other materials such as pulverized rubber which may be present on or in an unpaved surface.

As one skilled in the art will appreciate, preventing or reducing soil accumulation on articles of footwear can provide many benefits. Preventing or reducing soil accumulation on the outsoles of articles of footwear during wear on unpaved surfaces also can significantly affect the weight of accumulated soil adhered to the outsole during wear, reducing fatigue to the wearer caused by the adhered soil. Preventing or reducing soil accumulation on the outsole can help preserve traction during wear. For example, preventing or reducing soil accumulation on the outsole can improve or preserve the performance of traction elements present on the ground-facing surface of the outsole during wear on unpaved surfaces. When worn while playing sports, preventing or reducing soil accumulation on outsoles can improve or preserve the ability of the wearer to manipulate sporting equipment such as a ball with the article of footwear. Further, preventing or reducing soil accumulation on the outsole can make it easier to clean the article of footwear following use.

The following description is merely exemplary in nature and not intended to limit the present disclosure or its application or uses. For example, the outsole or component of an outsole incorporated in the articles of footwear, as made and used according to the teachings contained herein, is described throughout the present disclosure in conjunction with several examples of tread patterns and traction elements in order to more fully illustrate the composition and the use thereof. The incorporation and use of such an outsole or component of an outsole in articles of footwear with different tread patterns and traction elements are within the scope of the present disclosure. One skilled in the art will understand that throughout the description, corresponding reference numerals indicate like or corresponding parts and features. Further areas of applicability will become apparent from the description provided herein.

As used herein, the terms "article of footwear" and "footwear" are intended to be used interchangeably to refer to the same article. Typically, the term "article of footwear" will be used in a first instance, and the term "footwear" can be subsequently used to refer to the same article for ease of readability.

The outsoles or components of outsoles for use in an article of footwear manufactured according to the teachings of the present disclosure can be designed for a variety of uses, such as sporting, athletic, military, work-related, recreational, or casual use. For example, an article of footwear can be intended for outdoor use on unpaved surfaces (in part or in whole), such as on a ground surface that includes one or more of grass, turf, gravel, sand, dirt, clay, mud, and the like. The surface can be a general outdoor surface or an athletic performance surface (e.g., football/soccer field, golf course, baseball field, running track and field, cycling course, etc.). The article of footwear can be intended for indoor use, such as in indoor sports that are played upon dirt surfaces (e.g., indoor baseball fields with dirt infields and indoor football/soccer pitches). These articles of footwear can optionally include traction elements (e.g., lugs, cleats, studs, spikes, etc.) to provide traction on soft and slippery surfaces. Cleats, studs and spikes are commonly included in footwear designed for use in sports, such as football/soccer, golf, baseball, and the like, which are frequently played on unpaved surfaces. Lugs and/or exaggerated tread patterns are commonly included in footwear including boots design for use under rugged outdoor conditions, such as trail running, hiking, and military use.

Referring to FIG. 1, the method of manufacturing 1 an outsole component for use in an article of footwear comprises providing 5 a flat film component that includes a first layer compositionally comprising, consisting of, or consisting essentially of a polymeric hydrogel material defining an externally-facing surface of the flat film component. The polymeric hydrogel material represents a first polymeric material used in the process. The method of manufacturing 1 further comprises providing 10 a mold with a molding surface. This molding surface can have a predetermined shape for the desired outsole component. The flat film component is placed 15 into the mold such that a portion of the first layer contacts a portion of the molding surface. When necessary or desirable, the flat film component can be bent or curved 13 such that it conforms to a curvature associated with the molding surface while maintaining the film component at a temperature in the range of about 10 degrees C. to about 80 degrees C.

According to the method of manufacturing 1, a portion of the first layer is restrained or held against a portion of the molding surface while charging a second polymeric material 20 into the mold such that the film component defines at least a portion of the first layer of the film component forms an outermost layer of the outsole component. The film component is held 20 against the molding surface during at least a portion of the adding of the second polymeric material to the mold. The film component can be held in place using a holding mechanism. The second polymeric material is allowed to at least partially solidify 25 to produce the outsole component with a portion of the first layer as the outermost layer. Then the outsole component that is formed is removed 30 from the mold. The molding steps 20, 25 can be accomplished, without limitation, within the confines of an injection molding or compression molding process.

The step of placing the film component into the mold 15 so that a portion of the first layer contacts a portion of the molding surface comprises placing the film component into the mold so that the first layer contacts a portion of the molding surface that is less than 85 percent of the total molding surface area of the mold. Alternatively, the first layer contacts a portion of the molding surface that is less than 80 percent; alternatively, less than 75 percent; alternatively, between about 10 percent and about 80 percent of the total molding surface area of the mold.

As used herein, the total molding surface area corresponds to the surface area(s) of a section(s) of the mold against to which the layer is restrained. For example, the total surface area for a two-piece injection mold represents the total surface area of half the mold when the film component is restrained or held against that half of the mold during the molding operation.

In this method of manufacturing 1, the molding steps 20, 25 associated with forming the outsole component are the only steps in the method of manufacturing 1 that potentially exposes the hydrogel to a thermal treatment. In other words, the flat film component is maintained at a temperature in the range of about 10 degrees C. to about 80 degrees C. during the method of manufacturing 1, except during the step of charging 20 the second polymeric material into the mold including following charging the second polymer material into the mold and at least partially solidifying the second polymeric material in the mold 25.

The step of charging the mold 20 with the second polymeric material into the mold can include closing the mold and injecting the second polymeric material into the closed mold using an injection molding process. The step of charging the mold 20 can also include charging the second polymeric material into the mold, closing the mold before, during, or after the charging, and applying compression to the closed mold.

Although the layered film is described in the method of manufacturing 1 as being a flat component, the layered film can be substantially planar or relatively planar with some degree of curvature in a portion of the flat component or along one or more edges of the flat component. A greater degree of curvature can be incorporated into the flat component, for example during the molding steps 20, 25 as further defined herein. When desirable, the flat film component can optionally be bent or curved to conform to a curvature of the molding surface 13.

According to various aspects of the present disclosure, the flat film component can be formed by an extrusion process, or a co-extrusion or a lamination process 2. When desirable, the film component can comprise a backing layer formed of a third polymeric material 8. The flat film component can be prepared by providing 3 the third polymeric material; providing 7 the polymeric hydrogel material; and forming the layered film by a co-extrusion or lamination process 9 to provide a film component having a polymeric hydrogel layer and backing layer comprising the third polymer. The polymeric hydrogel can be exposed to a thermal treatment that exceeds 80 degrees C. during the extrusion, co-extrusion or lamination process used to form the layered film. Thus, in this case, the flat film component is maintained at a temperature in a range of about 10 degrees C. to about 80 degrees C. except during the steps of forming the layered film 2, 9, adding the second polymeric material into the mold 20 and after charging the mold with the second polymeric material, and at least partially solidifying the second polymeric material in the mold 25.

When desirable, the third polymeric material can be at least partially cured 6, or alternatively, fully cured prior to being used in the outsole method of manufacturing 1 or during the molding steps 20, 25 in the process. However, the flat film component is not subjected to any other process steps during the manufacturing process 1, such as thermoforming or vacuum forming that exposes the flat component to an elevated temperature (i.e., a thermal treatment) capable of forming the flat component into a curved shape.

As used herein, the term "providing", such as for "providing an outsole", when recited in the claims, is not intended to require any particular delivery or receipt of the provided item. Rather, the term "providing" is merely used to recite items that will be referred to in subsequent elements of the claim(s), for purposes of clarity and ease of readability.

Still referring to FIG. 1, the method of manufacturing 1 can further comprise at least partially curing 29 the second polymeric material. When desirable the second polymeric material can be fully cured. For the purpose of this disclosure, the term "partially cured" denotes the occurrence of at least about 1 percent, alternatively, at least about 5 percent of the total polymerization required to achieve a substantially full cure. The term "fully cured" is intended to mean a substantially full cure in which the degree of curing is such that the physical properties of the cured material do not noticeably change upon further exposure to conditions that induce curing (e.g., temperature, pressure, presence of curing agents, etc.).

For the purpose of this disclosure, the terms "about" and "substantially" are used herein with respect to measurable values and ranges due to expected variations known to those skilled in the art (e.g., limitations and variability in measurements).

Still referring to FIG. 1, the layered film can be cut 11 in order to form a flat film component that is configured to fit between or around one or more traction elements. When desirable, a portion of the layered film can be configured 16 to fit between or around one or more traction elements by cutting one or more holes or voids into the portion of the film to accommodate the traction elements, or by shaping the portion of the film to avoid the one or more traction elements, or by both cutting and shaping the film. One skilled in the art will understand the various way or methods in which a layered film can be cut. One aspect, of cutting the layered film is, without limitation, through the use of a die cutting operation using a flatbed press or a rotary press. Die cutting can be accomplished using a solid engraved die, an adjustable die, magnetic plate tooling, a dinking die, or a combination thereof.

Figure 2A:
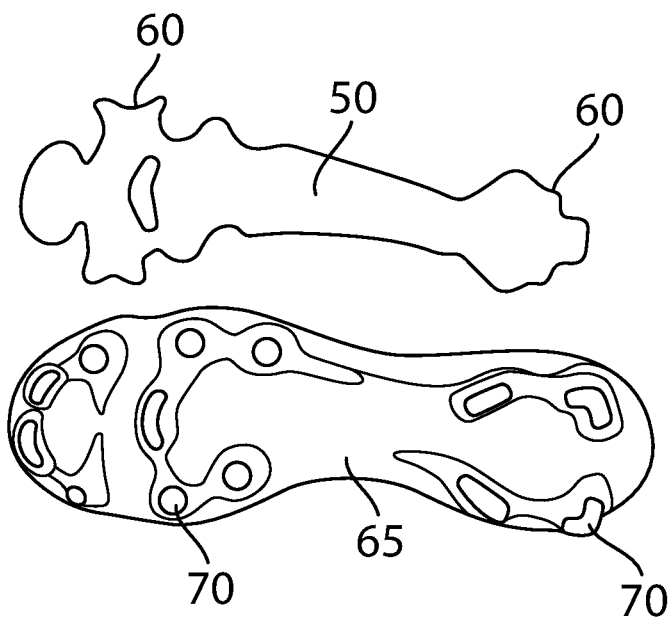
FIG. 2A is a bottom side view of various components of an outsole formed according to an aspect of the present disclosure.
Figure 2B:
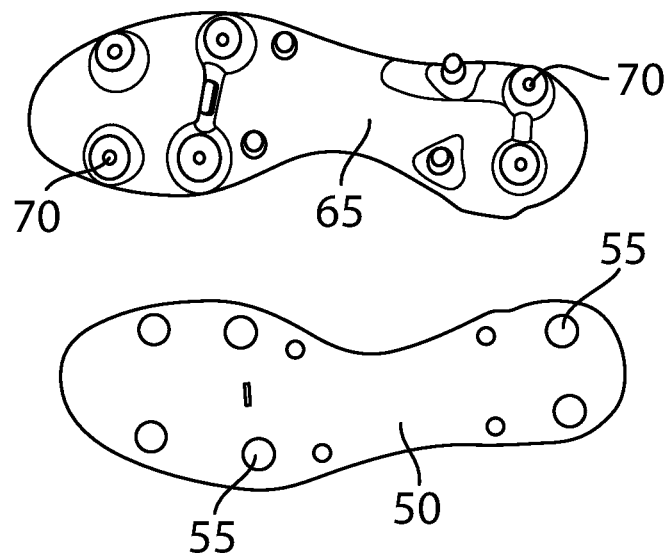
FIG. 2B is a bottom side view of various components of an outsole formed according to an aspect of the present disclosure.

Referring now to FIGS. 2A and 2B, a layered film of the flat film component 50 is shown after cutting 11 in the method of manufacturing 1 of FIG. 1. The cutting step can be configured to provide one or more holes or voids (e.g., 55, 60) that fit around one or more traction elements and provide a substantially contiguous region of the flat film along at least a portion of the outsole of the footwear. For example, referring to FIG. 2B, one or more holes 55 can be cut or punched into the flat film, each hole 55 having a shape and size to accommodate a corresponding traction element, so that, for example, the traction element can extend through the hole 55, or project from the outsole in a region substantially corresponding to the hole 55 in the film. Referring to FIG. 2A, one or more contours or voids 60 can be formed at or near the edges of the formed film, each contour or void 60 having a shape and size to accommodate a corresponding traction element, so that, for example, the traction element can project from the outsole in a region substantially corresponding to the void 60 in the film. In addition, configuring the film to fit between or around the traction elements can comprise cutting one or more holes in the flat portion to accommodate the traction elements or shaping the flat portion to avoid the traction elements. According to these aspects, the traction elements of the outsole do not comprise any of the hydrogel material.

Referring once again to FIG. 1, the mold provided in step 10 for use in the injection molding steps 20, 25 can include a molding surface of which at least a portion thereof is curved into a predetermined shape. The desired shape of the outsole or the component of the outsole to be formed defines the degree of curvature associated with the molding surface. Thus, the molding surface is in the predetermined shape of the outsole component that is to be formed.

A portion of the first layer of the flat film component can be restrained or held 20 against the molding surface using a holding mechanism that can include, but not be limited to, vacuum, one or more retractable pins, or a combination thereof. During the molding steps 20, 25 at least a portion of the first layer of the flat film component is placed against the molding surface 15, such that after the addition of the second polymeric material and cooling or solidifying 25 thereof, the layered film assumes the shape of the molding surface. In this configuration, the polymeric hydrogel material in the first layer of the flat film component forms at least a portion of the external surface of the outsole. According to some aspects, the polymeric hydrogel material forms at least 80%, or at least 85%, of the external surface of the outsole component.

Referring once again to FIGS. 2A and 2B, various aspects of an outsole component 65 formed via the method of manufacturing 1 are illustrated to show the incorporation of the flat film component 50 into the outsole component 65. As illustrated, the outsole component 65 has several traction elements 70 formed therewith. The traction elements can be integrally formed with the outsole during the molding steps 20, 25. In this case, the traction elements are substantially comprised of the second polymeric material or a third polymeric material. According to these aspects, the flat film component 50 has been configured to comprise holes or voids 55, 60, that correspond to the location of said traction elements 70, so that the traction elements 70 extend through or from regions of the outsole component 65 that correspond to the location of the holes or voids 55, 60 (i.e., the regions that lack the hydrogel material).

Referring once again to FIG. 1, when desirable, a fourth polymeric material can be added 27 to the mold from which at least a portion of the traction elements are formed. Alternatively, in some aspects all of the traction elements can be formed from the fourth polymeric material. The fourth material can be at least partially cured 29 when desirable. The fourth polymeric material can be a thermoplastic polymeric material. When desirable, the fourth polymeric material can be of the same or similar composition as the second or third polymeric materials. The fourth polymeric material can exhibit a greater degree of abrasion resistance than the second or third polymeric materials.

According to some aspects, one or more of the traction elements can comprise an element that is added separately after the outsole is removed from the mold, for example, as snap-fit, screw-on components, or a combination thereof. In these aspects, the separately-added traction elements can be individually selected to comprise the same material as the second, third, or fourth polymeric materials or a material that is different than or substantially free of the second, third, or fourth polymeric materials. The separately-added traction elements can be permanently or removably coupled with the outsole. When desirable, as shown in FIG. 1, one or more fittings can be placed 17(A) into the mold prior to adding the second polymeric material in order to be formed with the outsole or the outsole component. These fittings are configured to couple with the separately-added traction elements, e.g., snap-fit or screw-on components. According to certain aspects, preformed traction element tips can be placed 17(B) into the mold prior to adding the second polymeric material in order to be formed with the outsole or the outsole component. These pre-formed traction elements can be individually selected to comprise the same material as the second, third, or fourth polymeric materials or a material that is different than or substantially free of the second, third, or fourth polymeric materials.

Referring now to FIGS. 3A-3D, the one or more traction elements 70 provided on the external surface 75 of the outsole 65 can represent a tread pattern, lugs, cleats, studs, spikes, or a combination thereof. The number of traction elements 70 and the location or pattern of the traction elements located on the ground-facing or external surface 75 of the outsole 65 can vary between different articles of footwear 80. The location and pattern of the traction elements can be predetermined to provide a necessary or desired effect or function.

According to another aspect of the present disclosure, an outsole component for an article of footwear comprises one or more film components, wherein each of the film components has an external perimeter and the film of each of the film components comprises a backing layer of a first polymeric film and a polymeric hydrogel material operably connected to the backing layer, such that the polymeric hydrogel material defines a ground-contacting surface of the outsole component. A second polymeric material is operably connected to the backing layer and to the entire external perimeter of each of the one or more film components. The outsole component further comprises one or more traction elements with the one or more film components being configured to fit between or around the traction elements. The traction elements can have a ground-contacting surface that does not include the film component. The film component can include a void having an interior perimeter, and the traction elements passes through the void of the film component. When desirable, the traction element can comprise the second polymeric material, which is operably connected to the interior perimeter of the film component. The second polymeric material can also define the ground-contacting surface of the traction element.

The outsole 65 can be incorporated into an article of footwear 80 (best shown in FIGS. 3B and 3D), such that the outsole 65 is coupled with or attached to an upper 85. The upper 85 of the footwear 80 has a body which can be fabricated from materials known in the art for making articles of footwear, and is configured to receive a user's foot. The upper 85 of a shoe 85 consists of all components of the shoe above the outsole 65. The different components of the upper 85 can include a toe box; heal counter; and an Achilles notch, to name a few. These components can be attached by stitches or more likely molded to become a single unit to which the outsole 65 is coupled.

Figure 4:
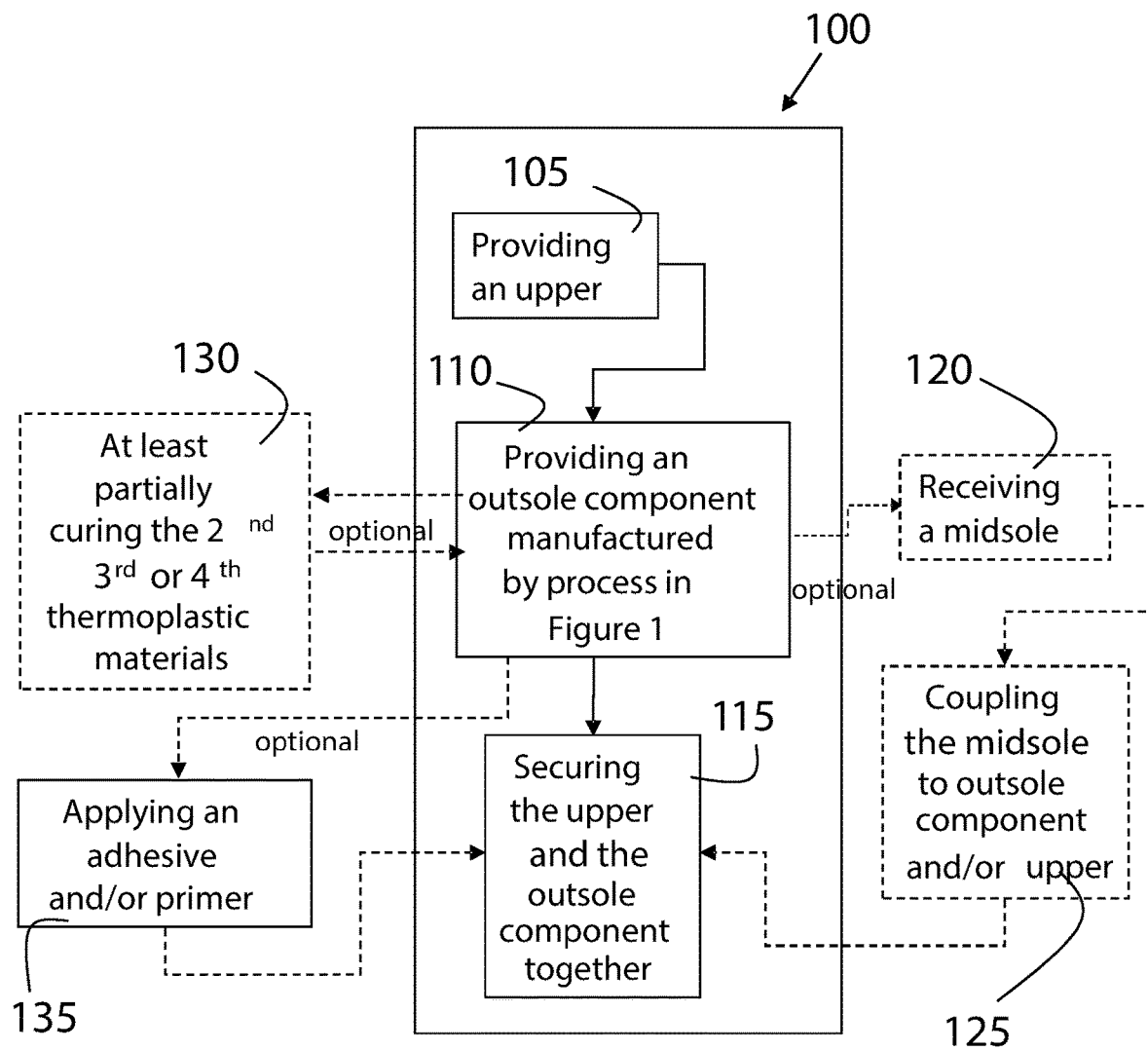
FIG. 4 is a flowchart describing a method of manufacturing an article of footwear that includes an outsole formed according to an aspect of the present disclosure.

Referring now to FIG. 4, according to another aspect of the present disclosure, a method of forming an article of footwear 100 can comprise, consist of, or consist essentially of providing or receiving 105 an upper; providing or receiving 110 an outsole component that is manufactured according the method of manufacturing 1 as previously described and further defined herein; and coupling or securing 115 the upper and the outsole component together. When desirable, the method can further include receiving 120 a midsole; and coupling 125 the midsole to outsole component and/or the upper prior to the coupling of the outsole component to the upper, such that the midsole resides between the outsole component and the upper.

The method of forming an article of footwear 100 can also comprise at least partially curing 130 the second, third, and/or fourth polymeric materials that are used in manufacturing the outsole through the occurrence of one or more cross-linking mechanisms. The occurrence of such cross-linking mechanisms can occur, for example, via a sulfur-based cross-linking process or a peroxide-initiated cross-linking process resulting in the curing of the polymeric materials or by exposing the polymeric materials to actinic radiation at a concentration and for a duration to at least partially cure the mixture.

When desirable, the method of forming an article of footwear 100 can also utilize an adhesive, primer, or a combination of both 135 to assist in securing or attaching the outsole component to the upper and/or the midsole to the upper or outsole. The adhesive or primer can comprise, but not be limited to, an epoxy, urethane, acrylic, cyanoacrylate, silicone, or a combination thereof.

While not wishing to be bound by theory, it is believed that the outsole of the article of footwear formed according to the present disclosure, when sufficiently wetted with water (including water containing dissolved, dispersed or otherwise suspended materials) can provide compressive compliance and/or expulsion of up taken water. In particular, it is believed that the compressive compliance of the wet surface composition of the component, the expulsion of liquid from the wet surface composition, or a combination thereof, can disrupt the adhesion of soil to the component of the article and/or cohesion of the soil particles to each other.

This disruption in the adhesion and/or cohesion of soil is believed to be a mechanism capable of preventing (or otherwise reducing) the soil from accumulating on the outsole (due to the presence of the wet material), or at least allows the soil to be removed with less effort (e.g., easier to wipe, brush, or otherwise physically remove). As one skilled in the art will appreciate, the prevention of soil from accumulating on the outsoles can provide numerous benefits, such as preventing weight accumulation on the articles of footwear.

As discussed above, the external surface of the outsole component manufactured by the method of the present disclosure includes a polymeric hydrogel material that allows the material to take up water. As used herein, the terms "take up", "taking up", "uptake", "uptaking", and the like refer to the drawing of a liquid (e.g., water) from an external source into the component, such as by absorption, adsorption, capillary action or a combination thereof. Furthermore, as briefly mentioned above, the term "water" refers to an aqueous liquid that can be pure water, or can be an aqueous carrier with lesser amounts of dissolved, dispersed or otherwise suspended materials (e.g., particulates, other liquids, and the like).

The ability of the polymeric hydrogel material to take up water and swell along with an associated increase in compliance can reflect its ability to prevent soil accumulation during use of the article of footwear. For the sake of convenience the polymeric hydrogel material can be described hereafter using the general term "hydrogel". As discussed above, when the hydrogel takes up water (e.g., through absorption, adsorption, capillary action, etc.), the water taken up by the hydrogel transitions the hydrogel from a dry, relatively more rigid state to a partially hydrated or fully saturated state that is relatively more compliant. The presence of water at the surface of the hydrogel is believed to be one mechanism that reduces the adherence of soil to the material.

Additionally, when a hydrated hydrogel is subjected to an application of pressure, either compressive or flexing, the hydrogel can reduce in volume, and expel at least a portion of its uptaken water. This expelled water is believed to reduce or disrupt the adhesive/cohesive forces of soil particles on or at the surface of the outsole. In particular, it is believed that the compressive compliance of the hydrated hydrogel material, the expulsion of liquid from the hydrated hydrogel material, or both in combination, can disrupt the adhesion of soil on or at the outsole, or the cohesion of the particles to each other, or can disrupt both the adhesion and cohesion. This disruption in the adhesion and/or cohesion of soil is believed to be a responsible mechanism for preventing (or otherwise reducing) the soil from accumulating on the footwear outsole (due to the presence of the wet material). As can be appreciated, preventing soil from accumulating on the bottom of footwear can improve the performance of traction elements present on the outsole during wear on unpaved surfaces, can prevent the footwear from gaining weight due to accumulated soil during wear, can preserve ball handling performance of the footwear, and thus can provide significant benefits to wearer as compared to an article of footwear without the material present on the outsole. Accordingly, the material can undergo dynamic transitions, and these dynamic transitions can result in forces or conditions that dislodge accumulated soil or otherwise reduce soil accumulation on the article as well.

The total amount of water that the hydrogel can take up depends on a variety of factors, such as its composition (e.g., its hydrophilicity), its cross-linking density, its thickness, and the existence and/or interfacial bond to other materials, such as the third polymeric material present as a backing layer in the layered film. For example, it is believed that a hydrogel comprising a polymeric network having a higher level of hydrophilicity and a lower level of cross-linking density can increase the water uptake capacity of the hydrogel. On the other hand, the interfacial bond between the hydrogel and a third polymeric material as a backing layer in the layered film can potentially restrict the swelling of the hydrogel. Accordingly, as described below, the water uptake capacity and the swelling capacity of the hydrogel can differ between the hydrogel in a neat film state (isolated film by itself) and the hydrogel as present the layered film.

The water uptake capacity and the water uptake rate of the hydrogel also can be dependent, at least in part, on the size and shape of its geometry, and are typically based on the same factors. However, it has been found that, to account for part dimensions when measuring water uptake capacity, it is possible to derive an intrinsic, steady-state material property. Therefore, conservation of mass can be used to define the ratio of water weight absorbed to the initial dry weight of the hydrogel at very long timescales (i.e. when the ratio is no longer changing at a measurable rate).

Conversely, the water uptake rate is transient and can be defined kinetically. The three primary factors for water uptake rate for a hydrogel present at a surface of an outsole given part geometry include time, thickness, and the exposed surface area available for taking up water. Once again, the weight of water taken up can be used as a metric of water uptake rate, but the water flux can also be accounted for by normalizing by the exposed surface area. For example, a thin rectangular film can be defined by 2×L×W, where L is the length of one side and W is the width. The value is doubled to account for the two major surfaces of the film, but the prefactor can be eliminated when the film has a non-absorbing, structural layer secured to one of the major surfaces (e.g., with an outsole backing plate of the third polymeric material in the layered film).

In addition to swelling, the compliance of the polymeric hydrogel material can also increase from being relatively stiff (i.e., dry-state) to being increasingly stretchable, compressible, and malleable (i.e., wet-state). The increased compliance accordingly can allow the hydrogel to readily compress under an applied pressure (e.g., during a foot strike on the ground), and in some aspects, to quickly expel at least a portion of its retained water (depending on the extent of compression). While not wishing to be bound by theory, it is believed that this compressive compliance alone, water expulsion alone, or both in combination can disrupt the adhesion and/or cohesion of soil at outsole, which prevents or otherwise reduces the accumulation of soil on outsole.

In addition to quickly expelling water, in particular aspects, the compressed hydrogel is capable of quickly re-absorbing water when the compression is released (e.g., liftoff from a foot strike during normal use). As such, during use in a wet or damp environment (e.g., a muddy or wet ground), the hydrogel can dynamically expel and repeatedly take up water over successive foot strikes, particularly from a wet surface. As such, the hydrogel can continue to prevent soil accumulation over extended periods of time (e.g., during an entire competitive match), particularly when there is ground water available for re-uptake.

Water Uptake Capacity—According to one aspect of the present disclosure, the polymeric hydrogel material (e.g., hydrogel present as a sample of a portion of an outsole component prepared according to the Component Sampling Procedure, the outsole component having the hydrogel present at or defining a side or surface of the outsole from which the sample was taken) has a water uptake capacity at 24 hours greater than 40 percent by weight, as characterized by the Water Uptake Capacity Test with the Component Sampling Procedure, each as described below. In some aspects, it is believed that if a particular outsole is not capable of taking up greater than 40 percent by weight in water within a 24-hour period, either due to its water uptake rate being too slow, or its ability to take up water is too low (e.g., due to its thinness, not enough hydrogel can be present, or the overall capacity of the hydrogel to take up water is too low), then the outsole may not be effective in preventing or reducing soil accumulation.

For the purpose of this disclosure, the term "overall water uptake capacity" is used to represent the amount of water taken up by the hydrogel as a percentage by weight of dry hydrogel. The procedure for measuring overall water uptake capacity can include measurement of the "dry" weight of the hydrogel, immersion of the hydrogel in water at ambient temperature (about 23 degrees C.) for a predetermined amount of time, followed by re-measurement of the weight of the hydrogel when "wet".

For the purpose of this disclosure, the term "weight" refers to a mass value, such as having the units of grams, kilograms, and the like. Further, the recitations of numerical ranges by endpoints include the endpoints and all numbers within that numerical range. For example, a concentration ranging from 40 percent by weight to 60 percent by weight includes concentrations of 40 percent by weight, 60% by weight, and all concentrations there between (e.g., 40.1 percent, 41 percent, 45 percent, 50 percent, 52.5 percent, 55 percent, 59 percent, etc.).

Furthermore, any range in parameters that is stated herein as being "between [a $1^{st}$ number] and [a $2^{nd}$ number]" or "between [a $1^{st}$ number] to [a $2^{nd}$ number]" is intended to be inclusive of the recited numbers. In other words, the ranges are meant to be interpreted similarly as to a range that is specified as being "from [a $1^{st}$ number] to [a $2^{nd}$ number]".

In further aspects, the hydrogel (including a side or surface of an outsole component formed of the hydrogel) has a water uptake capacity at 24 hours greater than 50 percent by weight, greater than 100 percent by weight, greater than 150 percent by weight, or greater than 200 percent by weight. In other aspects, the hydrogel has a water uptake capacity at 24 hours less than 900 percent by weight, less than 750 percent by weight, less than 600 percent by weight or less than 500 percent by weight.

In particular aspects, the hydrogel (including a side or surface of an outsole formed of the hydrogel) has a water uptake capacity at 24 hours ranging from 40 percent by weight to 900 percent by weight. For example, the hydrogel can have a water uptake capacity ranging from 100 percent by weight to 900 percent by weight, from 100 percent by weight to 750 percent by weight, from 100 percent by weight to 700 percent by weight, from 150 percent by weight to 600 percent by weight, from 200 percent by weight to 500 percent by weight, or from 300 percent by weight to 500 percent by weight.

These water uptake capacities can be determined by the Water Uptake Capacity Test with the Component Sampling Procedure, and can apply to samples taken at any suitable representative location along the outsole, where the film component forms the outermost layer of the outsole. In some cases, samples can be taken from one or more of the forefoot region, the midfoot region, and/or the heel region; from each of the forefoot region, the midfoot region, and the heel region; from within one or more of the traction element clusters (between the traction elements) at the forefoot region, the midfoot region, and/or the heel region; from of the traction element clusters; on planar regions of the traction elements (for aspects in which the material is present on the traction elements), and combinations thereof.

As discussed below, the water uptake capacity of the hydrogel (including a side or surface of an outsole formed of the hydrogel) can alternatively be measured in a simulated environment, such as using the hydrogel co-extruded with a backing substrate (e.g., third polymeric material) in a layered film. The backing substrate can be produced from any suitable thermoset or thermoplastic material that is compatible with the hydrogel, such as, without limitation, a material that is conventionally used to form an outsole backing plate. As such, suitable water uptake capacities at 24 hours for the hydrogel as co-extruded or laminated with a backing substrate, as characterized by the Water Uptake Capacity Test with the Co-extruded or Laminated Film Sampling Procedure, include those discussed above for the Water Uptake Capacity Test with the Component Sampling Procedure.

Additionally, it has been found that when the hydrogel is secured to another surface, such as being thermally or adhesively bonded to a substrate (e.g., the third polymeric material), the interfacial bond formed between the hydrogel and the outsole substrate can restrict the extent that the hydrogel can take up water and/or swell. As such, it is believed that the hydrogel as bonded to a substrate or co-extruded with a substrate can potentially have a lower water uptake capacity and/or a lower swell capacity compared to the same hydrogel in a neat material form, including neat film form.

As such, the water uptake capacity and the water uptake rate of the outsole component can also be characterized based on the hydrogel in neat form (e.g., an isolated film that is not bonded to another material). The hydrogel in neat form can have a water uptake capacity at 24 hours greater than 40 percent by weight, greater than 100 percent by weight, greater than 300 percent by weight, or greater than 1000 percent by weight, as characterized by the Water Uptake Capacity Test with the Neat Film Sampling Procedure or the Neat Material Sampling Procedure. The hydrogel in neat form can also have a water uptake capacity at 24 hours less than 900 percent by weight, less than 800 percent by weight, less than 700 percent by weight, less than 600 percent by weight or less than 500 percent by weight.

In particular aspects, the hydrogel in neat form has a water uptake capacity at 24 hours ranging from 40 percent by weight to 900 percent by weight, from 150 percent by weight to 700 percent by weight, from 200 percent by weight to 600 percent by weight, or from 300 percent by weight to 500 percent by weight.

Water Uptake Rate—The outsole component (including a side or surface of an outsole formed of the hydrogel) can have a water uptake rate greater than 20 grams/(square meter/square root of minutes) or 20 gms/m$^2$/√min, as characterized by the Water Uptake Rate Test with the Component Sampling Procedure. As discussed above, in some aspects, the outsole (e.g., the hydrogel) can take up water between the compressive cycles of foot strikes, which is believed to at least partially replenish the material between the foot strikes.

As such, in further aspects, the outsole component (including a side or surface of an outsole formed of the hydrogel) has a water uptake rate greater than 20 gms/m$^2$/√min, greater than 100 gms/m$^2$/√min, greater than 200 gms/m$^2$/√min, greater than 400 gms/m$^2$/√min, or greater than 600 gms/m$^2$/√min. In particular aspects, the outsole has a water uptake rate ranging from 1 to 1,500 gms/m$^2$/√min, 20 to 1,300 gms/m$^2$/√min, from 30 to 1,200 gms/m$^2$/√min, from 30 to 800 gms/m$^2$/√min, from 100 to 800 gms/m$^2$/√min, from 100 to 600 gms/m$^2$/√min, from 150 to 450 gms/m$^2$/√min, from 200 to 1,000 gms/m$^2$/√min, from 400 to 1,000 gms/m$^2$/√min, or from 600 to 900 gms/m$^2$/√min.

Suitable water uptake rates for the hydrogel as secured to a co-extruded backing substrate (e.g., third polymeric material), as characterized by the Water Uptake Rate Test with the Co-extruded or Laminated Film Sampling Procedure, and as provided in neat form, as characterized by the Water Uptake Rate Test with the Neat Film Sampling Procedure, each include those discussed above for the Water Uptake Rate Test with the Component Sampling Procedure.

Swelling Capacity—In certain aspects, the outsole component (including a side or surface of an outsole formed of the hydrogel) can swell, increasing the hydrogel's thickness and/or volume, due to water uptake. This swelling of the hydrogel can be a convenient indicator showing that the hydrogel is taking up water, and can assist in rendering the hydrogel compliant. In some aspects, the outsole has an increase in material thickness (or swell thickness increase) at 1 hour of greater than 20 percent or greater than 50 percent, for example ranging from 30 percent to 350 percent, from 50 percent to 400 percent, from 50 percent to 300 percent, from 100 percent to 300 percent, from 100 percent to 200 percent, or from 150 percent to 250 percent, as characterized by the Swelling Capacity Test with the Component Sampling Procedure. In further aspects, the outsole has an increase in material thickness at 24 hours ranging from 45 percent to 400 percent, from 100 percent to 350 percent, or from 150 percent to 300 percent.

Additionally, the hydrogel (including a side or surface of an outsole formed of the hydrogel) can have an increase in material volume (or volumetric swell increase) at 1 hour of greater than 50 percent, for example ranging from 10 percent to 130 percent, from 30 percent to 100 percent, or from 50 percent to 90 percent. Moreover, the outsole can have an increase in material volume at 24 hours ranging from 25 percent to 200 percent, from 50 percent to 150 percent, or from 75 percent to 100 percent.

For co-extruded or laminated film simulations, suitable increases in material thickness and volume at 1 hour and 24 hours for the hydrogel as secured to a co-extruded or lamination backing substrate, as characterized by the Swelling Capacity Test with the Co-extruded or Laminated Film Sampling Procedure, include those discussed above for the Swelling Capacity Test with the Component Sampling Procedure.

The material in neat form can have an increase in material thickness at 1 hour ranging from 35 percent to 400 percent, from 50 percent to 300 percent, or from 100 percent to 200 percent, as characterized by the Swelling Capacity Test with the Neat Film Sampling Procedure. In some further aspects, the material in neat form can have an increase in material thickness at 24 hours ranging 45 percent to 500 percent, from 100 percent to 400 percent, or from 150 percent to 300 percent. Correspondingly, the material in neat form can have an increase in material volume at 1 hour ranging from 50 percent to 500 percent, from 75 percent to 400 percent, or from 100 percent to 300 percent.

Contact Angle—In some aspects, the surface of the hydrogel forms a side or surface of the outsole, wherein the side or surface has hydrophilic properties. The hydrophilic properties of the hydrogel's surface can be characterized by determining the static sessile drop contact angle of the hydrogel's surface. Accordingly, in some aspects, the hydrogel's surface in a dry state has a static sessile drop contact angle (or dry-state contact angle) of less than 105 degrees, or less than 95 degrees, less than 85 degrees, as characterized by the Contact Angle Test. The Contact Angle Test can be conducted on a sample obtained in accordance with the Component Sampling Procedure, the Co-Extruded or Laminated Film Sampling Procedure, or the Neat Film Sampling Procedure. In some further aspects, the hydrogel in a dry state has a static sessile drop contact angle ranging from 60 degrees to 100 degrees, from 70 degrees to 100 degrees, or from 65 degrees to 95 degrees.

In other aspects, the hydrogel's surface in a wet state has a static sessile drop contact angle (or wet-state contact angle) of less than 90 degrees, less than 80 degrees, less than 70 degrees, or less than 60 degrees. In some further aspects, the surface in a wet state has a static sessile drop contact angle ranging from 45 degrees to 75 degrees. In some cases, the dry-state static sessile drop contact angle of the surface is greater than the wet-state static sessile drop contact angle of the surface by at least 10 degrees, at least 15 degrees, or at least 20 degrees, for example from 10 degrees to 40 degrees, from 10 degrees to 30 degrees, or from 10 degrees to 20 degrees.

Coefficient of Friction—The surface of the hydrogel, including the surface of an outsole can also exhibit a low coefficient of friction when the hydrogel is wet. Examples of suitable coefficients of friction for the hydrogel in a dry state (or dry-state coefficient of friction) are less than 1.5, for instance ranging from 0.3 to 1.3 or from 0.3 to 0.7, as characterized by the Coefficient of Friction Test. The Coefficient of Friction Test can be conducted on a sample obtained in accordance with the Component Sampling Procedure, the Co-Extruded or Laminated Film Sampling Procedure, or the Neat Film Sampling Procedure. Examples of suitable coefficients of friction for the hydrogel in a wet state (or wet-state coefficient of friction) are less than 0.8 or less than 0.6, for instance ranging from 0.05 to 0.6, from 0.1 to 0.6, or from 0.3 to 0.5. Furthermore, the hydrogel can exhibit a reduction in its coefficient of friction from its dry state to its wet state, such as a reduction ranging from 15 percent to 90 percent, or from 50 percent to 80 percent. In some cases, the dry-state coefficient of friction is greater than the wet-state coefficient of friction for the hydrogel, for example being higher by a value of at least 0.3 or 0.5, such as 0.3 to 1.2 or 0.5 to 1.

Storage Modulus—The compliance of the hydrogel, including an external or ground-facing layer of an outsole comprising the hydrogel, can be characterized by based on the hydrogel's storage modulus in the dry state (when equilibrated at 0 percent relative humidity (RH)), and in a partially wet state (e.g., when equilibrated at 50 percent RH or at 90 percent RH), and by reductions in its storage modulus between the dry and wet states. In particular, the hydrogel can have a reduction in storage modulus ($\Delta E'$) from the dry state relative to the wet state. A reduction in storage modulus as the water concentration in the hydrogel increases corresponds to an increase in compliance, because less stress is required for a given strain/deformation.

In some aspects, the hydrogel exhibits a reduction in the storage modulus from its dry state to its wet state (50 percent RH) of more than 20 percent, more than 40 percent, more than 60 percent, more than 75 percent, more than 90 percent, or more than 99 percent, relative to the storage modulus in the dry state, and as characterized by the Storage Modulus Test with the Neat Film Sampling Process. In some further aspects, the dry-state storage modulus of the hydrogel is greater than its wet-state (50 percent RH) storage modulus by more than 25 megaPascals (MPa), by more than 50 MPa, by more than 100 MPa, by more than 300 MPa, or by more than 500 MPa, for example ranging from 25 MPa to 800 MPa, from 50 MPa to 800 MPa, from 100 MPa to 800 MPa, from 200 MPa to 800 MPa, from 400 MPa to 800 MPa, from 25 MPa to 200 MPa, from 25 MPa to 100 MPa, or from 50 MPa to 200 MPa. Additionally, the dry-state storage modulus can range from 40 MPa to 800 MPa, from 100 MPa to 600 MPa, or from 200 MPa to 400 MPa, as characterized by the Storage Modulus Test. Additionally, the wet-state storage modulus can range from 0.003 MPa to 100 MPa, from 1 MPa to 60 MPa, or from 20 MPa to 40 MPa.

In other aspects, the hydrogel exhibits a reduction in the storage modulus from its dry state to its wet state (90 percent RH) of more than 20 percent, more than 40 percent, more than 60 percent, more than 75 percent, more than 90 percent, or more than 99 percent, relative to the storage modulus in the dry state, and as characterized by the Storage Modulus Test with the Neat Film Sampling Process. In further aspects, the dry-state storage modulus of the hydrogel is greater than its wet-state (90 percent RH) storage modulus by more than 25 megaPascals (MPa), by more than 50 MPa, by more than 100 MPa, by more than 300 MPa, or by more than 500 MPa, for example ranging from 25 MPa to 800 MPa, from 50 MPa to 800 MPa, from 100 MPa to 800 MPa, from 200 MPa to 800 MPa, from 400 MPa to 800 MPa, from 25 MPa to 200 MPa, from 25 MPa to 100 MPa, or from 50 MPa to 200 MPa. Additionally, the dry-state storage modulus can range from 40 MPa to 800 MPa, from 100 MPa to 600 MPa, or from 200 MPa to 400 MPa, as characterized by the Storage Modulus Test. Additionally, the wet-state storage modulus can range from 0.003 MPa to 100 MPa, from 1 MPa to 60 MPa, or from 20 MPa to 40 MPa.

In addition to a reduction in storage modulus, the hydrogel can also exhibit a reduction in its glass transition temperature from the dry state (when equilibrated at 0 percent relative humidity (RH) to the wet state (when equilibrated at 90% RH). While not wishing to be bound by theory, it is believed that the water taken up by the hydrogel plasticizes the hydrogel, which reduces its storage modulus and its glass transition temperature, rendering the material more compliant (e.g., compressible, expandable, and stretchable).

Glass Transition Temperature—In some aspects, the hydrogel can exhibit a reduction in glass transition temperature ($\Delta T_g$) from its dry-state (0 percent RH) glass transition temperature to its wet-state glass transition (90% RH) temperature of more than a 5 degree C. difference, more than a 6 degree C. difference, more than a 10 degree C. difference, or more than a 15 degree C. difference, as characterized by the Glass Transition Temperature Test with the Neat Film Sampling Process or the Neat Material Sampling Process. For instance, the reduction in glass transition temperature ($\Delta T_g$) can range from more than a 5 degree C. difference to a 40 degree C. difference, from more than a 6 degree C. difference to a 50 degree C. difference, form more than a 10 degree C. difference to a 30 degree C. difference, from more than a 30 degree C. difference to a 45 degree C. difference, or from a 15 degree C. difference to a 20 degree C. difference. The hydrogel can also exhibit a dry glass transition temperature ranging from −40 degrees C. to −80 degrees C. or from −40 degrees C. to −60 degrees C.

Alternatively (or additionally), the reduction in glass transition temperature ($\Delta T_g$) can range from a 5 degree C. difference to a 40 degree C. difference, form a 10 degree C. difference to a 30 degree C. difference, or from a 15 degree C. difference to a 20 degree C. difference. The material can also exhibit a dry glass transition temperature ranging from −40 degrees C. to −80 degrees C. or from −40 degrees C. to −60 degrees C.

In various aspects, the polymeric hydrogel material is a thermoplastic hydrogel having a melting point of less than 150 degrees C. For example, the onset of melting of the polymeric hydrogel material can occur between 90 degrees C. and 150 degrees C., including between 90 degrees C. and 135 degrees C., and between 110 degrees C. and 135 degrees C. Alternatively, the polymeric hydrogel material is a thermoplastic hydrogel having a melting point of greater than 150 degrees C. For example, the onset of melting of the polymeric hydrogel material can occur between 150 degrees C. and 190 degrees C., including between 150 degrees C. and 180 degrees C.

In addition to being effective at preventing soil accumulation, the outsole comprising the ground-facing layer of hydrogel has also been found to be sufficiently durable for its intended use on the externally facing side or surface of the article. Durability is based, at least in part, on the nature and strength of the interfacial bond of the outsole to an upper that comprises part of the finished article of footwear, as well as the physical properties of the hydrogel in the outsole itself. For example, during the useful life of the finished article of footwear, it is desirable that the outsole may not delaminate from the upper, and it can be substantially abrasion resistant or wear resistant (e.g., maintaining its structural integrity without rupturing or tearing). In various aspects, the useful life of the outsole (and the article of footwear containing it) is at least 10 hours, 20 hours, 50 hours, 100 hours, 120 hours, or 150 hours of use. For example, in some applications, the useful life of the outsole ranges from 20 hours to 120 hours. In other applications, the useful life of the outsole ranges from 50 hours to 100 hours of use.

The phrase "externally-facing" as used in reference to an element or material or layer refers to a surface or side of the element that is directed toward or facing the exterior of the article when the element is present in an article during its intended use. If the article is footwear, an externally-facing element can be "ground-facing" in other words, a surface or side of the element is directed toward or facing the ground when the element is present in an article of footwear during normal use, i.e., the element is positioned toward the ground during normal use by a wearer when in a standing position, and thus can contact the ground including unpaved surfaces when the footwear is used in a conventional manner, such as standing, walking or running on an unpaved surface. In other words, even though the element may not necessarily be facing the ground during various steps of manufacturing or shipping, if the element is intended to face the ground during normal use by a wearer, the element is understood to be ground-facing.

In some circumstances, due to the presence of elements such as traction elements, the ground-facing surface can be positioned toward the ground during conventional use but may not necessarily come into contact the ground. For example, on hard ground or paved surfaces, the terminal ends of traction elements on the outsole can directly contact the ground, while portions of the outsole located between the traction elements do not. As described in this example, the portions of the outsole located between the traction elements are considered to be ground-facing even though they may not directly contact the ground in all circumstances.

The hydrogel material in the outsole component can comprise a polymeric hydrogel. The hydrogel material can be any material that takes up water, to provide an outsole component that can take up a desired amount of water. The hydrogel material can comprise, consist of, or consist essentially of polymers or copolymers of polyurethane, polyurea, polyester, polycarbonate, polyetheramide, addition polymers of ethylenically unsaturated monomers, or any combination thereof.

As used herein, the term "polymer" refers to a molecule having polymerized units of one or more species of monomer. One skilled in the art will understand that the term "polymer" includes both homopolymers (i.e., a polymer in which the monomer species are the same) and copolymers. The term "copolymer" refers to a polymer having polymerized units of two or more species of monomers, and is understood to include terpolymers (i.e., copolymers having three monomer species). In a further aspect, the "monomer" can include different functional groups or segments, but for simplicity is generally referred to as a monomer. As used herein, reference to "a" polymer or other chemical compound refers to one or more molecules of the polymer or chemical compound, rather than being limited to a single molecule of the polymer or chemical compound. Furthermore, the one or more molecules may or may not be identical, so long as they fall under the category of the chemical compound. Thus, for example, "a" polylaurolactam is interpreted to include one or more polymer molecules of the polylaurolactam, where the polymer molecules may or may not be identical (e.g., different molecular weights and/or isomers).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one polyurethane", "one or more polyurethanes", and "polyurethane(s)" may be used interchangeably and are intended to have the same meaning.

Unless otherwise indicated, any of the functional groups or chemical compounds described herein can be substituted or unsubstituted. A "substituted" group or chemical compound, such as an alkyl, alkenyl, alkynyl, cycloalkyl, cycloalkenyl, aryl, heteroaryl, alkoxyl, ester, ether, or carboxylic ester refers to an alkyl, alkenyl, alkynyl, cycloalkyl, cycloalkenyl, aryl, heteroaryl, alkoxyl, ester, ether, or carboxylic ester group, has at least one hydrogen radical that is substituted with a non-hydrogen radical (i.e., a substituent). Examples of non-hydrogen radicals (or substituents) include, but are not limited to, alkyl, cycloalkyl, alkenyl, cycloalkenyl, alkynyl, ether, aryl, heteroaryl, heterocycloalkyl, hydroxyl, oxy (or oxo), alkoxyl, ester, thioester, acyl, carboxyl, cyano, nitro, amino, amido, sulfur, and halo. When a substituted alkyl group includes more than one non-hydrogen radical, the substituents can be bound to the same carbon or two or more different carbon atoms.

In an aspect, the polymeric hydrogel can comprise, consist of or consist essentially of a polyurethane hydrogel. Polyurethane hydrogels are prepared from one or more diisocyanate and one or more hydrophilic diol. The polymer can also include a hydrophobic diol in addition to the hydrophilic diol. The polymerization is normally carried out using roughly an equivalent amount of the diol and diisocyanate. Examples of hydrophilic diols are polyethylene glycols or copolymers of ethylene glycol and propylene glycol. The diisocyanate can be selected from a wide variety of aliphatic or aromatic diisocyanates. The hydrophobicity of the resulting polymer is determined by the amount and type of the hydrophilic diols, the type and amount of the hydrophobic diols, and the type and amount of the diisocyanates. Examples of commercially-available thermoplastic polyurethane hydrogels include, but are not limited to those under the tradename "TECOPHILIC", such as TG-500, TG-2000, SP-80A-150, SP-93A-100, SP-60D-60 (Lubrizol, Countryside, IL), "ESTANE" (e.g., ALR G 500; Lubrizol, Countryside, IL). Additional details regarding polyurethane are provided herein.

In various aspects, the polyurethane hydrogel is a thermoplastic polyurethane hydrogel having a melting point of less than 150 degrees C., including between 90 degrees C. and 135 degrees C., and between 110 degrees C. and 135 degrees C. Alternatively, the polyurethane hydrogel is a thermoplastic polyurethane hydrogel having a melting point of greater than 150 degrees C., including between 150 degrees C. and 190 degrees C., and between 150 degrees C. and 180 degrees C.

In an aspect, the polymeric hydrogel can comprise, consist of or consist essentially of a polyurea hydrogel. Polyurea hydrogels are prepared from one or more diisocyanate and one or more hydrophilic diamine. The polymer can also include a hydrophobic diamine in addition to the hydrophilic diamines. The polymerization is normally carried out using roughly an equivalent amount of the diamine and diisocyanate. Typical hydrophilic diamines are amine-terminated polyethylene oxides and amine-terminated copolymers of polyethylene oxide/polypropylene. Examples are "JEFFAMINE" diamines sold by Huntsman (The Woodlands, TX, USA). The diisocyanate can be selected from a wide variety of aliphatic or aromatic diisocyanates. The hydrophobicity of the resulting polymer is determined by the amount and type of the hydrophilic diamine, the type and amount of the hydrophobic amine, and the type and amount of the diisocyanate. Additional details regarding polyurea are provided herein.

In an aspect, the polymeric hydrogel can comprise, consist of, or consist essentially of a polyester hydrogel. Polyester hydrogels can be prepared from dicarboxylic acids (or dicarboxylic acid derivatives) and diols where part or all of the diol is a hydrophilic diol. Examples of hydrophilic diols are polyethylene glycols or copolymers of ethylene glycol and propylene glycol. A second hydrophobic diol can also be used to control the polarity of the final polymer. One or more diacid can be used which can be either aromatic or aliphatic. Of particular interest are block polyesters prepared from hydrophilic diols and lactones of hydroxyacids. The lactone is polymerized on the each end of the hydrophilic diol to produce a triblock polymer. In addition, these triblock segments can be linked together to produce a multiblock polymer by reaction with a dicarboxylic acid. Additional details regarding polyurea are provided herein.

In an aspect, the polymeric hydrogel can comprise, consist of, or or consist essentially of a polycarbonate hydrogel. Polycarbonates are typically prepared by reacting a diol with phosgene or a carbonate diester. A hydrophilic polycarbonate is produced when part or all of the diol is a hydrophilic diol. Examples of hydrophilic diols are hydroxyl terminated polyethers of ethylene glycol or polyethers of ethylene glycol with propylene glycol. A second hydrophobic diol can also be included to control the polarity of the final polymer. Additional details regarding polycarbonate are provided herein.

In an aspect, the polymeric hydrogel can comprise, consist of, or consist essentially of a polyetheramide hydrogel. Polyetheramides are prepared from dicarboxylic acids (or dicarboxylic acid derivatives) and polyether diamines (a polyether terminated on each end with an amino group). Hydrophilic amine-terminated polyethers produce hydrophilic polymers that will swell with water. Hydrophobic diamines can be used in conjunction with hydrophilic diamines to control the hydrophilicity of the final polymer. In addition, the type dicarboxylic acid segment can be selected to control the polarity of the polymer and the physical properties of the polymer. Typical hydrophilic diamines are amine-terminated polyethylene oxides and amine-terminated copolymers of polyethylene oxide/polypropylene. Examples are "JEFFAMINE" diamines sold by Huntsman (The Woodlands, TX, USA). Additional details regarding polyetheramide are provided herein.

In an aspect, the polymeric hydrogel can comprise, consist of, or consist essentially of a hydrogel formed of addition polymers of ethylenically unsaturated monomers. The addition polymers of ethylenically unsaturated monomers can be random polymers. Polymers prepared by free radical polymerization of one of more hydrophilic ethylenically unsaturated monomer and one or more hydrophobic ethylenically unsaturated monomers. Examples of hydrophilic monomers are acrylic acid, methacrylic acid, 2-acrylamido-2-methylpropane sulphonic acid, vinyl sulphonic acid, sodium p-styrene sulfonate, [3-(methacryloylamino)propyl]trimethylammonium chloride, 2-hydroxyethyl methacrylate, acrylamide, N, N-dimethylacrylamide, 2-vinylpyrrolidone, (meth)acrylate esters of polyethylene glycol, and (meth)acrylate esters of polyethylene glycol monomethyl ether. Examples of hydrophobic monomers are (meth)acrylate esters of $C_1$ to $C_4$ alcohols, polystyrene, polystyrene methacrylate macromonomer and mono(meth)acrylate esters of siloxanes. The water uptake and physical characteristics can be tuned by selection of the monomer and the amounts of each monomer type. Additional details regarding ethylenically unsaturated monomers are provided herein.

The addition polymers of ethylenically unsaturated monomers can be comb polymers. Comb polymers are produced when one of the monomers is a macromer (an oligomer with an ethylenically unsaturated group one end). In one case the main chain is hydrophilic while the side chains are hydrophobic. Alternatively the comb backbone can be hydrophobic while the side chains are hydrophilic. An example is a backbone of a hydrophobic monomer such as styrene with the methacrylate monoester of polyethylene glycol.

The addition polymers of ethylenically unsaturated monomers can be block polymers. Block polymers of ethylenically unsaturated monomers can be prepared by methods such as anionic polymerization or controlled free radical polymerization. Hydrogels are produced when the polymer has both hydrophilic blocks and hydrophobic blocks. The polymer can be a diblock polymer (A-B) polymer, triblock polymer (A-B-A) or multiblock polymer. Triblock polymers with hydrophobic end blocks and a hydrophilic center block are most useful for this application. Block polymers can be prepared by other means as well. Partial hydrolysis of polyacrylonitrile polymers produces multiblock polymers with hydrophilic domains (hydrolyzed) separated by hydrophobic domains (unhydrolyzed) such that the partially hydrolyzed polymer acts as a hydrogel. The hydrolysis converts acrylonitrile units to hydrophilic acrylamide or acrylic acid units in a multiblock pattern.

The polymeric hydrogel can comprise, consist of, or consist essentially of a hydrogel formed of copolymers. In some aspects, the polymeric hydrogel can comprise a polyurethane/polyurea copolymer, polyurethane/polyester copolymer, or a polyester/polycarbonate copolymer.

The hydrogel material can comprise a polymer network. In other words, the hydrogel can include any suitable polymer chains that provide the desired functional properties (e.g., water uptake, swelling, and more generally, preventing soil accumulation) and desirably provide good durability for the article. For example, the hydrogel can be based on one or more polyurethanes, one or more polyureas, one or more polyesters, one or more polyetheramide, one or ore polymers of ethylenically unsaturated monomers, one or more polyamides, one or more polyolefins, and combinations thereof (e.g., a hydrogel based on polyurethane(s) and polyamide(s)). The hydrogel or cross-linked polymeric network can include a plurality of copolymer chains wherein at least a portion of the copolymer chains each include a polyurethane segment, a polyamide segment, or a combination thereof. In some aspects, the one or more polyurethanes, one or more polyamides, one or more polyolefins, and combinations thereof include polysiloxane segments and/or ionomer segments.

In some aspects, the hydrogel material compositionally comprises a hydrophilic polymer and optionally one or more additives. In further aspects, the hydrogel compositionally comprises a polymeric network (e.g., a hydrophilic polymeric network) and optionally one or more additives. In some aspects, the polymeric network is preferably a plurality of cross-linked (or cross-linkable) polymer chains, where the polymer chains can be homopolymers, copolymers, or a combination of both homopolymers and copolymers. When cross-linked, the network can be either physically or covalently or both physically and covalently cross-linked.

For a physical cross-link, a copolymer chain can form entangled regions and/or crystalline regions through non-covalent bonding interactions, such as, for example, an ionic bond, a polar bond, and/or a hydrogen bond. In particular aspects, the crystalline regions create the physical cross-link between the copolymer chains. The crystalline regions can include hard segments, as described below.

In some aspects, the polymeric network can exhibit sol-gel reversibility, allowing it to function as a thermoplastic polymer, which can be advantageous for manufacturing and recyclability. As such, in some aspects, the polymeric network of the hydrogel includes a physically cross-linked polymeric network to function as a thermoplastic material.

The hydrogels can be characterized as including both hard segments and soft segments. These hard and soft regions can exist as phase separated regions within the polymeric network while the hydrogel is in a solid (non-molten) state. The hard segments can form portions of the polymer chain backbones, and can exhibit high polarities, allowing the hard segments of multiple polymer chains to aggregate together, or interact with each other, to form semi-crystalline regions in the polymeric network. The plurality of polymer chains can comprise one or more hard segments; and one or more soft segments covalently bonded to the hard segments, wherein the one or more soft segments are present in the copolymer chains at a ratio ranging from 20:1 to 110:1 by weight relative to the one or more hard segments.

A "semi-crystalline" or "crystalline" region has an ordered molecular structure with sharp melting points, which remains solid until a given quantity of heat is absorbed and then rapidly changes into a low viscosity liquid. A "pseudo-crystalline" region has properties of a crystal, but does not exhibit a true crystalline diffraction pattern. For ease of reference, the term "crystalline region" is used herein to collectively refer to a crystalline region, a semi-crystalline region, and a pseudo-crystalline region of a polymeric network.

In comparison, the soft segments can be longer, more flexible, hydrophilic regions of the polymeric network that allow the polymer network to expand and swell under the pressure of taken up water. The soft segments can constitute amorphous hydrophilic regions of the hydrogel or cross-linked polymeric network. The soft segments, or amorphous regions, can also form portions of the backbones of the polymer chains along with the hard segments. Additionally, one or more portions of the soft segments, or amorphous regions, can be grafted or otherwise represent pendant chains that extend from the backbones at the soft segments. The soft segments, or amorphous regions, can be covalently bonded to the hard segments, or crystalline regions (e.g., through carbamate linkages). For example, a plurality of amorphous hydrophilic regions can be covalently bonded to the crystalline regions of the hard segments.

As used herein, the term "hydrophilic," refers to polymers having a strong tendency to bind or absorb water, which results in swelling and formation of reversible swelling gels. A "swelling gel" is a gel that absorbs an amount of water greater than at least 100 weight percent of its own weight when immersed in water.

The hydrophilic soft segments of the copolymer chains can comprise polyether segments, polyester segments, polycarbonate segments, or combinations thereof. At least a portion of the one or more hydrophilic soft segments can constitute backbone segments of the copolymer chain. At least a portion of the hydrophilic soft segments can comprise one or more pendant polyether groups. The one or more hydrophilic soft segments can be present in the copolymer chains at a ratio ranging from 40:1 to 110:1 by weight relative to the one or more hard segments. The polymeric network can be a cross-linked polymeric network. The polymeric network can be a network formed of copolymer chains. The polymer chains of the polymeric network comprise polyurethane chain segments, polyamide chain segments, or both.

According to another aspect of the present disclosure, the cross-linked polymeric network of the hydrogel in the external or ground-facing layer of the outsole includes a plurality of copolymer chains. At least a portion of these copolymer chains comprise a hard segment physically cross-linked to other hard segments of the copolymer chains and a soft segment covalently bonded to the hard segment, such as through a carbamate group or an ester group.

The hydrogel or cross-linked polymeric network can include a plurality of copolymer chains. At least a portion of the copolymer chains include a first segment that forms at least a crystalline region with other hard segments of the copolymer chains and a second segment, such as a soft segment (e.g., a segment having polyether chains or one or more ether groups) covalently bonded to the first segment. The soft segment forms amorphous regions of the hydrogel or cross-linked polymeric network. In some cases, the hydrogel or cross-linked polymeric network includes a plurality of copolymer chains, where at least a portion of the copolymer chains has hydrophilic segments.

When the polymeric network of the hydrogel is cross-linked, it has been found that the cross-linking density of the cross-linked polymeric network can affect the structural integrity and water uptake capacities of the hydrogel. For example, if the cross-linking density is too high, the resulting hydrogel can be stiff and less compliant, having a relatively low water uptake and swelling capacity. On the other hand, if the cross-linking density is too low, then the resulting hydrogel can lose its structural integrity when saturated. As such, the polymeric network(s) of the hydrogel preferably have a cross-linking density that is selected such that the hydrogel has a desired balance of properties, e.g., it retains its structural integrity, yet is also sufficiently compliant when partially or fully saturated with water.

The hydrogel material in the layered film of the outsole can be formed via co-extrusion or lamination with a backing plate or layer comprising a third polymeric material. Subsequently, a second polymeric material is used to complete the formation of the outsole in a molding process. The second ($2^{nd}$) polymeric material and/or third ($3^{rd}$) polymeric material can independently be selected to comprise a thermoset polymer or a thermoplastic polymer. The composition of the second and third polymeric materials can be selected to be substantially the same material or, alternatively, different materials. When desirable, the second and/or third polymeric materials can comprise one or more natural or synthetic rubbers. The natural or synthetic rubbers can include, but not be limited to, butadiene rubber, isoprene rubber, or nitrile rubber. The natural or synthetic rubbers can be individually selected as virgin materials, regrind materials, or a mixture thereof.

Now having described aspects of the hydrogel material in general, additional details are provided regarding the thermoplastic polymers referenced herein, including thermoplastic hydrogels. In various aspects, the thermoplastic polymer can include one or more polymers selected from the group consisting of polyesters, polyethers, polyamides, polyurethanes and polyolefins as well as copolymers of each or combinations thereof, such as those described herein.

In aspects, the thermoplastic polymer can include polymers of the same or different types of monomers (e.g., homopolymers and copolymers, including terpolymers). In certain aspects, the thermoplastic polymer can include different monomers randomly distributed in the polymer (e.g., a random co-polymer).

For example, the thermoplastic polymer can be a polymer having repeating polymeric units of the same chemical structure (segments) which are relatively harder (hard segments), and repeating polymeric segments which are relatively softer (soft segments). In various aspects, the polymer has repeating hard segments and soft segments, physical crosslinks can be present within the segments or between the segments or both within and between the segments. Particular examples of hard segments include isocyanate segments. Particular examples of soft segments include an alkoxy group such as polyether segments and polyester segments. As used herein, the polymeric segment can be referred to as being a particular type of polymeric segment such as, for example, an isocyanate segment (e.g., diisocyanate segment), an alkoky polyamide segment (e.g., a polyether segment, a polyester segment), and the like. It is understood that the chemical structure of the segment is derived from the described chemical structure. For example, an isocyanate segment is a polymerized unit including an isocyanate functional group. When referring to polymeric segments of a particular chemical structure, the polymer can contain up to 10 mol % of segments of other chemical structures. For example, as used herein, a polyether segment is understood to include up to 10 mol % of non-polyether segments.

In various aspects, the thermoplastic polymer of the outsole component, including but not limited to the thermoplastic hydrogel of the outsole component, has a melting temperature ($T_m$) from about 90 degrees C. to about 190 degrees C. when determined in accordance with ASTM D3418-97 as described herein below. In a further aspect, the thermoplastic polymer has a melting temperature ($T_m$) from about 93 degrees C. to about 99 degrees C. when determined in accordance with ASTM D3418-97 as described herein below. In a still further aspect, the thermoplastic polymer has a melting temperature ($T_m$) from about 112 degrees C. to about 118 degrees C. when determined in accordance with ASTM D3418-97 as described herein below.

In various aspects, the thermoplastic polymer has a glass transition temperature ($T_g$) from about −20 degrees C. to about 30 degrees C. when determined in accordance with ASTM D3418-97 as described herein below. In a further aspect, the thermoplastic polymer has a glass transition temperature ($T_g$) from about −13 degree C. to about −7 degrees C. when determined in accordance with ASTM D3418-97 as described herein below. In a still further aspect, the thermoplastic polymer or thermoplastic hydrogel has a glass transition temperature ($T_g$) from about 17 degrees C. to about 23 degrees C. when determined in accordance with ASTM D3418-97 as described herein below.

In various aspects, the thermoplastic polymer has a melt flow index from about 10 to about 30 cubic centimeters per 10 minutes ($cm^3$/10 min) when tested in accordance with ASTM D1238-13 as described herein below at 160 degrees C. using a weight of 2.16 kilograms (kg). In a further aspect, the thermoplastic polymer has a melt flow index from about 22 $cm^3$/10 min to about 28 $cm^3$/10 min when tested in accordance with ASTM D1238-13 as described herein below at 160 degrees C. using a weight of 2.16 kg.

In various aspects, the thermoplastic polymer has a cold Ross flex test result of about 120,000 to about 180,000 cycles without cracking or whitening when tested on a thermoformed plaque of the thermoplastic polymer in accordance with the cold Ross flex test as described herein below. In a further aspect, the thermoplastic polymer has a cold Ross flex test result of about 140,000 to about 160,000 cycles without cracking or whitening when tested on a thermoformed plaque of the thermoplastic polymer in accordance with the cold Ross flex test as described herein below.

In various aspects, the thermoplastic polymer has a modulus from about 5 megaPascals (MPa) to about 100 MPa when determined on a thermoformed plaque in accordance with ASTM D412-98 Standard Test Methods for Vulcanized Rubber and Thermoplastic Rubbers and Thermoplastic Elastomers-Tension with modifications described herein below. In a further aspect, the thermoplastic polymer has a modulus from about 20 MPa to about 80 MPa when determined on a thermoformed plaque in accordance with ASTM D412-98 Standard Test Methods for Vulcanized Rubber and Thermoplastic Rubbers and Thermoplastic Elastomers-Tension with modifications described herein below.

In certain aspects, the thermoplastic polymer can be a thermoplastic polyurethane (also referred to as "TPU"). In aspects, the thermoplastic polyurethane can be a thermoplastic polyurethane polymer. In such aspects, the thermoplastic polyurethane polymer can include hard and soft segments. In aspects, the hard segments can comprise or consist of isocyanate segments (e.g., diisocyanate segments). In the same or alternative aspects, the soft segments can comprise or consist of alkoxy segments (e.g., polyether segments, or polyester segments, or a combination of polyether segments and polyester segments). In a particular aspect, the thermoplastic material can comprise or consist essentially of an elastomeric thermoplastic polyurethane having repeating hard segments and repeating soft segments.

Thermoplastic Polyurethanes

In aspects, one or more of the thermoplastic polyurethanes can be produced by polymerizing one or more isocyanates with one or more polyols to produce polymer chains having carbamate linkages (—N(CO)O—) as illustrated below in Formula 1, where the isocyanate(s) each preferably include two or more isocyanate (—NCO) groups per molecule, such as 2, 3, or 4 isocyanate groups per molecule (although, single-functional isocyanates can also be optionally included, e.g., as chain terminating units).

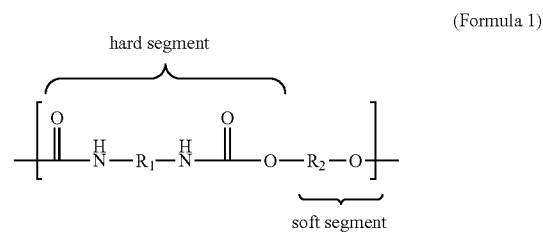

(Formula 1)

In these aspects, each $R_1$ and $R_2$ independently is an aliphatic or aromatic segment. Optionally, each $R_2$ can be a hydrophilic segment.

Additionally, the isocyanates can also be chain extended with one or more chain extenders to bridge two or more isocyanates. This can produce polyurethane polymer chains as illustrated below in Formula 2, where $R_3$ includes the chain extender. As with each $R_1$ and $R_3$, each $R_3$ independently is an aliphatic or aromatic segment.

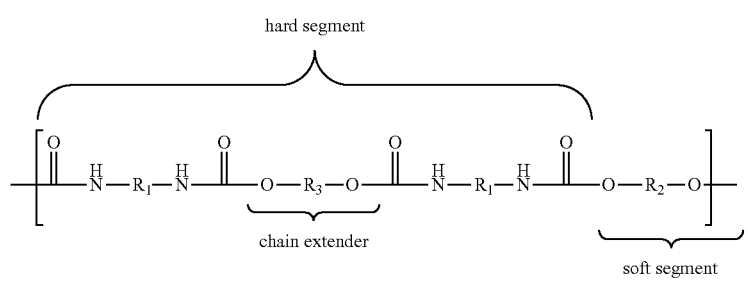

(Formula 2)

Each segment $R_1$, or the first segment, in Formulas 1 and 2 can independently include a linear or branched $C_{3-30}$ segment, based on the particular isocyanate(s) used, and can be aliphatic, aromatic, or include a combination of aliphatic portions(s) and aromatic portion(s). The term "aliphatic" refers to a saturated or unsaturated organic molecule that does not include a cyclically conjugated ring system having delocalized pi electrons. In comparison, the term "aromatic" refers to a cyclically conjugated ring system having delocalized pi electrons, which exhibits greater stability than a hypothetical ring system having localized pi electrons.

Each segment $R_1$ can be present in an amount of 5% to 85% by weight, from 5% to 70% by weight, or from 10% to 50% by weight, based on the total weight of the reactant monomers.

In aliphatic embodiments (from aliphatic isocyanate(s)), each segment $R_1$ can include a linear aliphatic group, a branched aliphatic group, a cycloaliphatic group, or combinations thereof. For instance, each segment $R_1$ can include a linear or branched $C_{3-20}$ alkylene segment (e.g., $C_{4-15}$ alkylene or $C_{6-10}$ alkylene), one or more $C_{3-8}$ cycloalkylene segments (e.g., cyclopropyl, cyclobutyl, cyclopentyl, cyclohexyl, cycloheptyl, or cyclooctyl), and combinations thereof.

Examples of suitable aliphatic diisocyanates for producing the polyurethane polymer chains include hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, and combinations thereof.

In an aspect, the diisocyanate segments can include aliphatic diisocyanate segments. In one aspect, a majority of the diisocyanate segments comprise the aliphatic diisocyanate segments. In an aspect, at least 90% of the diisocyanate segments are aliphatic diisocyanate segments. In an aspect, the diisocyanate segments consist essentially of aliphatic diisocyanate segments. In an aspect, the aliphatic diisocyanate segments are substantially (e.g., about 50% or more, about 60% or more, about 70% or more, about 80% or more, about 90% or more) linear aliphatic diisocyanate segments. In an aspect, at least 80% of the aliphatic diisocyanate segments are aliphatic diisocyanate segments that are free of side chains. In an aspect, the aliphatic diisocyanate segments include C2-C10 linear aliphatic diisocyanate segments.

In aromatic embodiments (from aromatic isocyanate(s)), each segment $R_1$ can include one or more aromatic groups, such as phenyl, naphthyl, tetrahydronaphthyl, phenanthrenyl, biphenylenyl, indanyl, indenyl, anthracenyl, and fluorenyl. Unless otherwise indicated, an aromatic group can be an unsubstituted aromatic group or a substituted aromatic group, and can also include heteroaromatic groups. "Heteroaromatic" refers to monocyclic or polycyclic (e.g., fused bicyclic and fused tricyclic) aromatic ring systems, where one to four ring atoms are selected from oxygen, nitrogen, or sulfur, and the remaining ring atoms are carbon, and where the ring system is joined to the remainder of the molecule by any of the ring atoms. Examples of suitable heteroaryl groups include pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl.

Examples of suitable aromatic diisocyanates for producing the polyurethane polymer chains include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4, 4'-diisocyanate (DDDI), 4,4'-dibenzyl diisocyanate (DBDI), 4-chloro-1,3-phenylene diisocyanate, and combinations thereof. In some aspects, the polymer chains are substantially free of aromatic groups.

In particular aspects, the polyurethane polymer chains are produced from diisocynates including HMDI, TDI, MDI, $H_{12}$ aliphatics, and combinations thereof. For example, the low processing temperature polymeric composition of the present disclosure can comprise one or more polyurethane polymer chains are produced from diisocyanates including HMDI, TDI, MDI, H12 aliphatics, and combinations thereof.

In certain aspects, polyurethane chains which are crosslinked (e.g., partially crosslinked polyurethane polymers which retain thermoplastic properties) or which can be crosslinked, can be used in accordance with the present disclosure. It is possible to produce crosslinked or crosslinkable polyurethane polymer chains using multi-functional isocyantes. Examples of suitable triisocyanates for producing the polyurethane polymer chains include TDI, HDI, and IPDI adducts with trimethyloylpropane (TMP), uretdiones (i.e., dimerized isocyanates), polymeric MDI, and combinations thereof.

Segment $R_3$ in Formula 2 can include a linear or branched $C_2$-$C_{10}$ segment, based on the particular chain extender polyol used, and can be, for example, aliphatic, aromatic, or polyether. Examples of suitable chain extender polyols for producing the polyurethane polymer chains include ethylene glycol, lower oligomers of ethylene glycol (e.g., diethylene glycol, triethylene glycol, and tetraethylene glycol), 1,2-propylene glycol, 1,3-propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1,4-cyclohexanedimethanol, 2-ethyl-1,6-hexanediol, 1-methyl-1,3-propanediol, 2-methyl-1,3-propanediol, dihydroxyalkylated aromatic compounds (e.g., bis(2-hydroxyethyl) ethers of hydroquinone and resorcinol, xylene-a,a-diols, bis(2-hydroxyethyl) ethers of xylene-a,a-diols, and combinations thereof.

Segment $R_2$ in Formula 1 and 2 can include a polyether group, a polyester group, a polycarbonate group, an aliphatic group, or an aromatic group. Each segment $R_2$ can be present in an amount of 5% to 85% by weight, from 5% to 70% by weight, or from 10% to 50% by weight, based on the total weight of the reactant monomers.

In some examples, at least one $R_2$ segment of the thermoplastic polyurethane includes a polyether segment (i.e., a segment having one or more ether groups). Suitable polyethers include, but are not limited to, polyethylene oxide (PEO), polypropylene oxide (PPO), polytetrahydrofuran (PTHF), polytetramethylene oxide (PTMO), and combinations thereof. The term "alkyl" as used herein refers to straight chained and branched saturated hydrocarbon groups containing one to thirty carbon atoms, for example, one to twenty carbon atoms, or one to ten carbon atoms. The term Cn means the alkyl group has "n" carbon atoms. For example, $C_4$ alkyl refers to an alkyl group that has 4 carbon atoms. $C_{1-7}$alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

In some examples of the thermoplastic polyurethane, the at least one $R_2$ segment includes a polyester segment. The polyester segment can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof). The polyester also can be derived from polycarbonate prepolymers, such as poly(hexam ethylene carbonate) glycol, poly(propylene carbonate) glycol, poly(tetramethylene carbonate)glycol, and poly(nonanemethylene carbonate) glycol. Suitable polyesters can include, for example, polyethylene adipate (PEA), poly(1,4-butylene adipate), poly(tetramethylene adipate), poly(hexamethylene adipate), polycaprolactone, polyhexamethylene carbonate, poly(propylene carbonate), poly(tetramethylene carbonate), poly(nonanemethylene carbonate), and combinations thereof.

In various of the thermoplastic polyurethanes, at least one $R_2$ segment includes a polycarbonate segment. The polycarbonate segment can be derived from the reaction of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with ethylene carbonate.

In various examples, the aliphatic group is linear and can include, for example, a $C_{1-20}$ alkylene chain or a $C_{1-20}$ alkenylene chain (e.g., methylene, ethylene, propylene, butylene, pentylene, hexylene, heptylene, octylene, nonylene, decylene, undecylene, dodecylene, tridecylene, ethenylene, propenylene, butenylene, pentenylene, hexenylene, heptenylene, octenylene, nonenylene, decenylene, undecenylene, dodecenylene, tridecenylene). The term "alkylene" refers to a bivalent hydrocarbon. The term Cn means the alkylene group has "n" carbon atoms. For example, $C_{1-6}$ alkylene refers to an alkylene group having, e.g., 1, 2, 3, 4, 5, or 6 carbon atoms. The term "alkenylene" refers to a bivalent hydrocarbon having at least one double bond.

In various aspects, the aliphatic and aromatic groups can be substituted with one or more pendant relatively hydrophilic and/or charged groups. In some aspects, the pendant hydrophilic group includes one or more (e.g., 2, 3, 4, 5, 6, 7, 8, 9, 10 or more) hydroxyl groups. In various aspects, the pendant hydrophilic group includes one or more (e.g., 2, 3, 4, 5, 6, 7, 8, 9, 10 or more) amino groups. In some cases, the pendant hydrophilic group includes one or more (e.g., 2, 3, 4, 5, 6, 7, 8, 9, 10 or more) carboxylate groups. For example, the aliphatic group can include one or more polyacrylic acid group. In some cases, the pendant hydrophilic group includes one or more (e.g., 2, 3, 4, 5, 6, 7, 8, 9, 10 or more) sulfonate groups. In some cases, the pendant hydrophilic group includes one or more (e.g., 2, 3, 4, 5, 6, 7, 8, 9, 10 or more) phosphate groups. In some examples, the pendant hydrophilic group includes one or more ammonium groups (e.g., tertiary and/or quaternary ammonium). In other examples, the pendant hydrophilic group includes one or more zwitterionic groups (e.g., a betaine, such as poly(carboxybetaine (pCB) and ammonium phosphonate groups such as a phosphatidylcholine group).

In some aspects, the $R_2$ segment can include charged groups that are capable of binding to a counterion to ionically crosslink the thermoplastic polymer and form ionomers. In these aspects, for example, $R_2$ is an aliphatic or aromatic group having pendant amino, carboxylate, sulfonate, phosphate, ammonium, or zwitterionic groups, or combinations thereof.

In various cases when a pendant hydrophilic group is present, the pendant "hydrophilic" group is at least one polyether group, such as two polyether groups. In other cases, the pendant hydrophilic group is at least one polyester. In various cases, the pendant hydrophilic group is polylactone group (e.g., polyvinylpyrrolidone). Each carbon atom of the pendant hydrophilic group can optionally be substituted with, e.g., a $C_{1-6}$ alkyl group. In some of these aspects, the aliphatic and aromatic groups can be graft polymeric groups, wherein the pendant groups are homopolymeric groups (e.g., polyether groups, polyester groups, polyvinylpyrrolidone groups).

In some aspects, the pendant hydrophilic group is a polyether group (e.g., a polyethylene oxide group, a polyethylene glycol group), a polyvinylpyrrolidone group, a polyacrylic acid group, or combinations thereof.

The pendant hydrophilic group can be bonded to the aliphatic group or aromatic group through a linker. The linker can be any bifunctional small molecule (e.g., $C_{1-20}$) capable of linking the pendant hydrophilic group to the aliphatic or aromatic group. For example, the linker can include a diisocyanate group, as previously described herein, which when linked to the pendant hydrophilic group and to the aliphatic or aromatic group forms a carbamate bond. In some aspects, the linker can be 4,4'-diphenylmethane diisocyanate (MDI), as shown below.

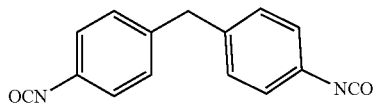
(Formula 3)

In some exemplary aspects, the pendant hydrophilic group is a polyethylene oxide group and the linking group is MDI, as shown below.

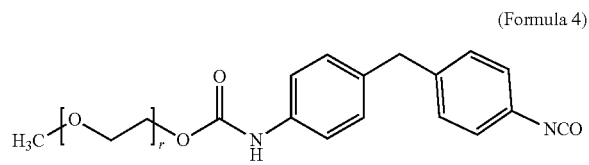
(Formula 4)

In some aspects, the pendant hydrophilic group is functionalized to enable it to bond to the aliphatic or aromatic group, optionally through the linker. In various aspects, for example, when the pendant hydrophilic group includes an alkene group, which can undergo a Michael addition with a sulfhydryl-containing bifunctional molecule (i.e., a molecule having a second reactive group, such as a hydroxyl group or amino group), to result in a hydrophilic group that can react with the polymer backbone, optionally through the linker, using the second reactive group. For example, when the pendant hydrophilic group is a polyvinylpyrrolidone group, it can react with the sulfhydryl group on mercaptoethanol to result in hydroxyl-functionalized polyvinylpyrrolidone, as shown below.

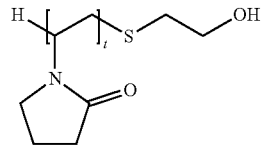
(Formula 5)

In some of the aspects disclosed herein, at least one $R_2$ segment includes a polytetramethylene oxide group. In other exemplary aspects, at least one $R_2$ segment can include an aliphatic polyol group functionalized with a polyethylene oxide group or polyvinylpyrrolidone group, such as the polyols described in E.P. Patent No. 2 462 908, which is hereby incorporated by reference. For example, the $R_2$ segment can be derived from the reaction product of a polyol (e.g., pentaerythritol or 2,2,3-trihydroxypropanol) and either MDI-derivatized methoxypolyethylene glycol (to obtain compounds as shown in Formulas 6 or 7) or with MDI-derivatized polyvinylpyrrolidone (to obtain compounds as shown in Formulas 8 or 9) that had been previously been reacted with mercaptoethanol, as shown below.

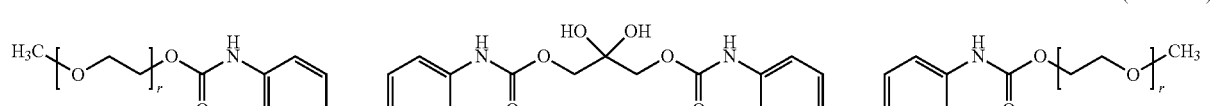
(Formula 6)

(Formula 7)

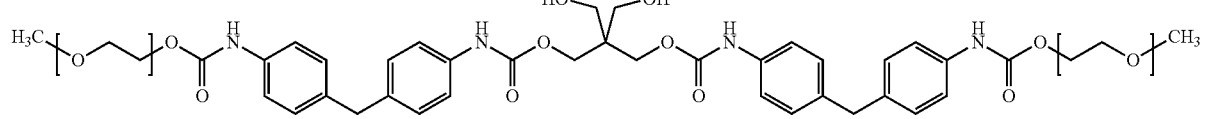
(Formula 8)

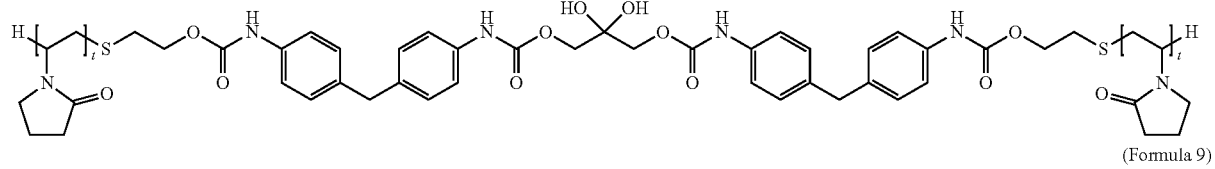
(Formula 9)

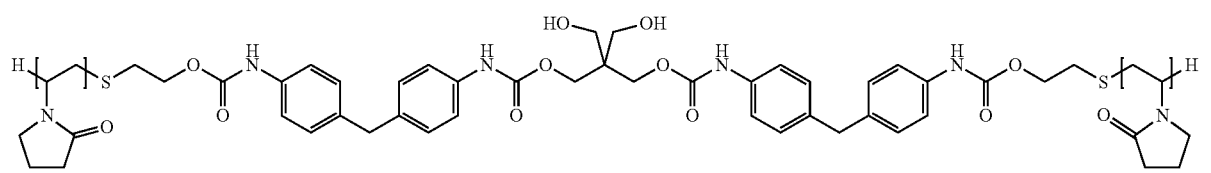

In various aspects, at least one $R_2$ is a polysiloxane, In these cases, $R_2$ can be derived from a silicone monomer of Formula 10, such as a silicone monomer disclosed in U.S. Pat. No. 5,969,076, which is hereby incorporated by reference:

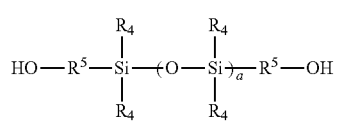
(Formula 10)

wherein: a is 1 to 10 or larger (e.g., 1, 2, 3, 4, 5, 6, 7, 8, 9, or 10); each $R_4$ independently is hydrogen, $C_{1-18}$ alkyl, $C_{2-18}$ alkenyl, aryl, or polyether; and each $R_5$ independently is $C_{1-10}$ alkylene, polyether, or polyurethane.

In some aspects, each $R_4$ independently is a H, $C_{1-10}$ alkyl, $C_{2-10}$ alkenyl, $C_{1-6}$ aryl, polyethylene, polypropylene, or polybutylene group. For example, each $R_4$ can independently be selected from the group consisting of methyl, ethyl, n-propyl, isopropyl, n-butyl, isobutyl, s-butyl, t-butyl, ethenyl, propenyl, phenyl, and polyethylene groups.

In various aspects, each $R_5$ independently includes a $C_{1-10}$ alkylene group (e.g., a methylene, ethylene, propylene, butylene, pentylene, hexylene, heptylene, octylene, nonylene, or decylene group). In other cases, each $R_5$ is a polyether group (e.g., a polyethylene, polypropylene, or polybutylene group). In various cases, each $R_5$ is a polyurethane group.

Optionally, in some aspects, the polyurethane can include an at least partially crosslinked polymeric network that includes polymer chains that are derivatives of polyurethane. In such cases, it is understood that the level of crosslinking is such that the polyurethane retains thermoplastic properties (i.e., the crosslinked thermoplastic polyurethane can be softened or melted and re-solidified under the processing conditions described herein). This crosslinked polymeric network can be produced by polymerizing one or more isocyanates with one or more polyamino compounds, polysulfhydryl compounds, or combinations thereof, as shown in Formulas 11 and 12, below:

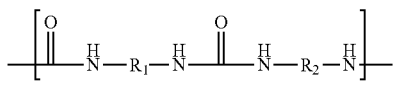

(Formula 11)

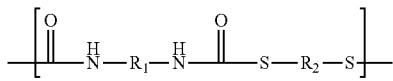

(Formula 12)

wherein the variables are as described above. Additionally, the isocyanates can also be chain extended with one or more polyamino or polythiol chain extenders to bridge two or more isocyanates, such as previously described for the polyurethanes of Formula 2.

As described herein, the thermoplastic polyurethane can be physically crosslinked through e.g., nonpolar or polar interactions between the urethane or carbamate groups on the polymers (the hard segments. In these aspects, component $R_1$ in Formula 1, and components $R_1$ and $R_3$ in Formula 2, forms the portion of the polymer often referred to as the "hard segment", and component $R_2$ forms the portion of the polymer often referred to as the "soft segment". In these aspects, the soft segment can be covalently bonded to the hard segment. In some examples, the thermoplastic polyurethane having physically crosslinked hard and soft segments can be a hydrophilic thermoplastic polyurethane (i.e., a thermoplastic polyurethane including hydrophilic groups as disclosed herein).

Thermoplastic Polyamides

In various aspects, the thermoplastic polymer can comprise a thermoplastic polyamide. The thermoplastic polyamide can be a polyamide homopolymer having repeating polyamide segments of the same chemical structure. Alternatively, the polyamide can comprise a number of polyamide segments having different polyamide chemical structures (e.g., polyamide 6 segments, polyamide 11 segments, polyamide 12 segments, polyamide 66 segments, etc.). The polyamide segments having different chemical structure can be arranged randomly, or can be arranged as repeating blocks.

In aspects, the thermoplastic polymers can be a block co-polyamide. For example, the block co-polyamide can have repeating hard segments, and repeating soft segments. The hard segments can comprise polyamide segments, and the soft segments can comprise non-polyamide segments. The thermoplastic polymers can be an elastomeric thermoplastic co-polyamide comprising or consisting of block co-polyamides having repeating hard segments and repeating soft segments. In block co-polymers, including block co-polymers having repeating hard segments and soft segments, physical crosslinks can be present within the segments or between the segments or both within and between the segments.

The thermoplastic polyamide can be a co-polyamide (i.e., a co-polymer including polyamide segments and non-polyamide segments). The polyamide segments of the co-polyamide can comprise or consist of polyamide 6 segments, polyamide 11 segments, polyamide 12 segments, polyamide 66 segments, or any combination thereof. The polyamide segments of the co-polyamide can be arranged randomly, or can be arranged as repeating segments. In a particular example, the polyamide segments can comprise or consist of polyamide 6 segments, or polyamide 12 segments, or both polyamide 6 segment and polyamide 12 segments. In the example where the polyamide segments of the co-polyamide include of polyamide 6 segments and polyamide 12 segments, the segments can be arranged randomly. The non-polyamide segments of the co-polyamide can comprise or consist of polyether segments, polyester segments, or both polyether segments and polyester segments. The co-polyamide can be a co-polyamide, or can be a random co-polyamide. The thermoplastic copolyamide can be formed from the polycodensation of a polyamide oligomer or prepolymer with a second oligomer prepolymer to form a copolyamide (i.e., a co-polymer including polyamide segments. Optionally, the second prepolymer can be a hydrophilic prepolymer.

In some aspects, the thermoplastic polyamide itself, or the polyamide segment of the thermoplastic copolyamide can be derived from the condensation of polyamide prepolymers, such as lactams, amino acids, and/or diamino compounds with dicarboxylic acids, or activated forms thereof. The resulting polyamide segments include amide linkages (—(CO)NH—). The term "amino acid" refers to a molecule having at least one amino group and at least one carboxyl group. Each polyamide segment of the thermoplastic polyamide can be the same or different.

In some aspects, the thermoplastic polyamide or the polyamide segment of the thermoplastic copolyamide is derived from the polycondensation of lactams and/or amino acids, and includes an amide segment having a structure shown in Formula 13, below, wherein $R_6$ is the segment of the polyamide derived from the lactam or amino acid.

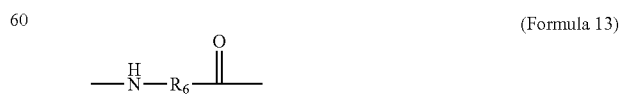

(Formula 13)

In some aspects, $R_6$ is derived from a lactam. In some cases, $R_6$ is derived from a $C_{3-20}$ lactam, or a $C_{4-15}$ lactam, or a $C_{6-12}$ lactam. For example, $R_6$ can be derived from caprolactam or laurolactam. In some cases, $R_6$ is derived from one or more amino acids. In various cases, $R_6$ is derived from a $C_{4-25}$ amino acid, or a $C_{5-20}$ amino acid, or a $C_{8-15}$ amino acid. For example, $R_6$ can be derived from 12-aminolauric acid or 11-aminoundecanoic acid.

Optionally, in order to increase the relative degree of hydrophilicity of the thermoplastic copolyamide, Formula 13 can include a polyamide-polyether block copolymer segment, as shown below:

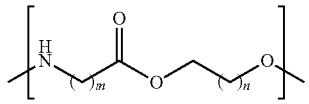

(Formula 14)

wherein m is 3-20, and n is 1-8. In some exemplary aspects, m is 4-15, or 6-12 (e.g., 6, 7, 8, 9, 10, 11, or 12), and n is 1, 2, or 3. For example, m can be 11 or 12, and n can be 1 or 3. In various aspects, the thermoplastic polyamide or the polyamide segment of the thermoplastic co-polyamide is derived from the condensation of diamino compounds with dicarboxylic acids, or activated forms thereof, and includes an amide segment having a structure shown in Formula 15, below, wherein $R_7$ is the segment of the polyamide derived from the diamino compound, $R_8$ is the segment derived from the dicarboxylic acid compound:

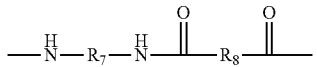

(Formula 15)

In some aspects, $R_7$ is derived from a diamino compound that includes an aliphatic group having $C_{4-15}$ carbon atoms, or $C_{5-10}$ carbon atoms, or $C_{6-9}$ carbon atoms. In some aspects, the diamino compound includes an aromatic group, such as phenyl, naphthyl, xylyl, and tolyl. Suitable diamino compounds from which $R_7$ can be derived include, but are not limited to, hexamethylene diamine (HMD), tetramethylene diamine, trimethyl hexamethylene diamine (TMD), m-xylylene diamine (MXD), and 1,5-pentamine diamine. In various aspects, $R_8$ is derived from a dicarboxylic acid or activated form thereof, includes an aliphatic group having $C_{4-15}$ carbon atoms, or $C_{5-12}$ carbon atoms, or $C_{6-10}$ carbon atoms. In some cases, the dicarboxylic acid or activated form thereof from which $R_8$ can be derived includes an aromatic group, such as phenyl, naphthyl, xylyl, and tolyl groups. Suitable carboxylic acids or activated forms thereof from which $R_8$ can be derived include, but are not limited to adipic acid, sebacic acid, terephthalic acid, and isophthalic acid. In some aspects, the polymer chains are substantially free of aromatic groups.

In some aspects, each polyamide segment of the thermoplastic polyamide (including the thermoplastic copolyamide) is independently derived from a polyamide prepolymer selected from the group consisting of 12-aminolauric acid, caprolactam, hexamethylene diamine and adipic acid.

In some aspects, the thermoplastic polyamide comprises or consists of a thermoplastic poly(ether-block-amide). The thermoplastic poly(ether-block-amide) can be formed from the polycondensation of a carboxylic acid terminated polyamide prepolymer and a hydroxyl terminated polyether prepolymer to form a thermoplastic poly(ether-block-amide), as shown in Formula 16:

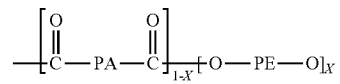

(Formula 16)

In various aspects, a disclosed poly(ether block amide) polymer is prepared by polycondensation of polyamide blocks containing reactive ends with polyether blocks containing reactive ends. Examples include, but are not limited to: 1) polyamide blocks containing diamine chain ends with polyoxyalkylene blocks containing carboxylic chain ends; 2) polyamide blocks containing dicarboxylic chain ends with polyoxyalkylene blocks containing diamine chain ends obtained by cyanoethylation and hydrogenation of aliphatic dihydroxylated alpha-omega polyoxyalkylenes known as polyether diols; 3) polyamide blocks containing dicarboxylic chain ends with polyether diols, the products obtained in this particular case being polyetheresteramides. The polyamide block of the thermoplastic poly(ether-block-amide) can be derived from lactams, amino acids, and/or diamino compounds with dicarboxylic acids as previously described. The polyether block can be derived from one or more polyethers selected from the group consisting of polyethylene oxide (PEO), polypropylene oxide (PPO), polytetrahydrofuran (PTHF), polytetramethylene oxide (PTMO), and combinations thereof.

Disclosed poly(ether block amide) polymers include those comprising polyamide blocks comprising dicarboxylic chain ends derived from the condensation of α, ω-aminocarboxylic acids, of lactams or of dicarboxylic acids and diamines in the presence of a chain-limiting dicarboxylic acid. In poly(ether block amide) polymers of this type, a α, ω-aminocarboxylic acid such as aminoundecanoic acid can be used; a lactam such as caprolactam or lauryllactam can be used; a dicarboxylic acid such as adipic acid, decanedioic acid or dodecanedioic acid can be used; and a diamine such as hexamethylenediamine can be used; or various combinations of any of the foregoing. In various aspects, the copolymer comprises polyamide blocks comprising polyamide 12 or of polyamide 6.

Disclosed poly(ether block amide) polymers include those comprising polyamide blocks derived from the condensation of one or more α, ω-aminocarboxylic acids and/or of one or more lactams containing from 6 to 12 carbon atoms in the presence of a dicarboxylic acid containing from 4 to 12 carbon atoms, and are of low mass, i.e., they have an Mn of from 400 to 1000. In poly(ether block amide) polymers of this type, a α, ω-aminocarboxylic acid such as aminoundecanoic acid or aminododecanoic acid can be used; a dicarboxylic acids such as adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98% and are preferably hydrogenated) and dodecanedioic acid HOOC—(CH2)10-COOH can be used; and a lactam such as caprolactam and lauryllactam can be used; or various combinations of any of the foregoing. In various aspects, the copolymer comprises polyamide blocks obtained by condensation of lauryllactam in the presence of adipic acid or dodecanedioic acid and with a number average molecular weight of 750 have a melting point of 127-130 degrees C. In a further aspect, the various constituents of the polyamide block and their proportion can be chosen in order to obtain a melting point of less than 150 degrees C. and advantageously between 90 degrees C. and 135 degrees C.

Disclosed poly(ether block amide) polymers include those comprising polyamide blocks derived from the condensation of at least one α, ω-aminocarboxylic acid (or a lactam), at least one diamine and at least one dicarboxylic acid. In copolymers of this type, a α,ω-aminocarboxylic acid, the lactam and the dicarboxylic acid can be chosen from those described herein above and the diamine such as an aliphatic diamine containing from 6 to 12 atoms and can be arylic and/or saturated cyclic such as, but not limited to, hexamethylenediamine, piperazine, 1-aminoethylpiperazine, bisaminopropylpiperazine, tetramethylenediam ine, octamethylene-diamine, decamethylenediamine, dodecamethylenediamine, 1,5-diaminohexane, 2,2,4-trimethyl-1,6-diam inohexane, diamine polyols, isophoronediamine (IPD), methylpentamethylenediamine (MPDM), bis(aminocyclohexyl)methane (BACM) and bis(3-methyl-4-aminocyclohexyl)methane (BMACM) can be used.

In various aspects, the constituents of the polyamide block and their proportion can be chosen in order to obtain a melting point of less than 150 degrees C. and advantageously between 90 degrees C. and 135 degrees C. In a further aspect, the various constituents of the polyamide block and their proportion can be chosen in order to obtain a melting point of less than 150 degrees C. and advantageously between 90 degrees C. and 135 degrees C.

In an aspect, the number average molar mass of the polyamide blocks can be from about 300 grams per mole (g/mol) and about 15,000 g/mol, from about 500 g/mol and about 10,000 g/mol, from about 500 g/mol and about 6,000 g/mol, from about 500 g/mol to 5,000 g/mol, and from about 600 g/mol and about 5,000 g/mol. In a further aspect, the number average molecular weight of the polyether block can range from about 100 g/mol to about 6,000 g/mol, from about 400 g/mol to 3000 g/mol and from about 200 g/mol to about 3,000 g/mol. In a still further aspect, the polyether (PE) content (x) of the poly(ether block amide) polymer can be from about 0.05 to about 0.8 (i.e., from about 5 mole percent to about 80 mole percent). In a yet further aspect, the polyether blocks can be present from about 10 weight percent to about 50 weight percent, from about 20 weight percent to about 40 weight percent, and from about 30 weight percent to about 40 weight percent. The polyamide blocks can be present from about 50 weight percent to about 90 weight percent, from about 60 weight percent to about 80 weight percent, and from about 70 weight percent to about 90 weight percent.

In an aspect, the polyether blocks can contain units other than ethylene oxide units, such as, for example, propylene oxide or polytetrahydrofuran (which leads to polytetramethylene glycol sequences). It is also possible to use simultaneously PEG blocks, i.e. those consisting of ethylene oxide units, PPG blocks, i.e. those consisting of propylene oxide units, and PTMG blocks, i.e. those consisting of tetramethylene glycol units, also known as polytetrahydrofuran. PPG or PTMG blocks are advantageously used. The amount of polyether blocks in these copolymers containing polyamide and polyether blocks can be from about 10 weight percent to about 50 weight percent of the copolymer and from about 35 weight percent to about 50 weight percent.

The copolymers containing polyamide blocks and polyether blocks can be prepared by any means for attaching the polyamide blocks and the polyether blocks. In practice, two processes are essentially used, one being a 2-step process and the other a one-step process.

In the two-step process, the polyamide blocks having dicarboxylic chain ends are prepared first, and then, in a second step, these polyamide blocks are linked to the polyether blocks. The polyamide blocks having dicarboxylic chain ends are derived from the condensation of polyamide precursors in the presence of a chain-stopper dicarboxylic acid. If the polyamide precursors are only lactams or α,ω-aminocarboxylic acids, a dicarboxylic acid is added. If the precursors already comprise a dicarboxylic acid, this is used in excess with respect to the stoichiometry of the diamines. The reaction usually takes place between 180 and 300 degrees C., preferably 200 to 290 degrees C., and the pressure in the reactor is set between 5 and 30 bar and maintained for approximately 2 to 3 hours. The pressure in the reactor is slowly reduced to atmospheric pressure and then the excess water is distilled off, for example for one or two hours.

Once the polyamide having carboxylic acid end groups has been prepared, the polyether, the polyol and a catalyst are then added. The total amount of polyether can be divided and added in one or more portions, as can the catalyst. In an aspect, the polyether is added first and the reaction of the OH end groups of the polyether and of the polyol with the COOH end groups of the polyamide starts, with the formation of ester linkages and the elimination of water. Water is removed as much as possible from the reaction mixture by distillation and then the catalyst is introduced in order to complete the linking of the polyamide blocks to the polyether blocks. This second step takes place with stirring, preferably under a vacuum of at least 50 millibar (5000 Pascals) at a temperature such that the reactants and the copolymers obtained are in the molten state. By way of example, this temperature can be between 100 and 400 degrees C. and usually between 200 and 250 degrees C. The reaction is monitored by measuring the torque exerted by the polymer melt on the stirrer or by measuring the electric power consumed by the stirrer. The end of the reaction is determined by the value of the torque or of the target power. The catalyst is defined as being any product which promotes the linking of the polyamide blocks to the polyether blocks by esterification. Advantageously, the catalyst is a derivative of a metal (M) chosen from the group formed by titanium, zirconium and hafnium. In an aspect, the derivative can be prepared from a tetraalkoxides consistent with the general formula M(OR)4, in which M represents titanium, zirconium or hafnium and R, which can be identical or different, represents linear or branched alkyl radicals having from 1 to 24 carbon atoms.

In a further aspect, the catalyst can comprise a salt of the metal (M), particularly the salt of (M) and of an organic acid and the complex salts of the oxide of (M) and/or the hydroxide of (M) and an organic acid. In a still further aspect, the organic acid can be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid and crotonic acid. Acetic and propionic acids are particularly preferred. In some aspects, M is zirconium and such salts are called zirconyl salts, e.g., the commercially available product sold under the name zirconyl acetate.

In an aspect, the weight proportion of catalyst varies from about 0.01 to about 5 percent of the weight of the mixture of the dicarboxylic polyamide with the polyetherdiol and the polyol. In a further aspect, the weight proportion of catalyst varies from about 0.05 to about 2 percent of the weight of the mixture of the dicarboxylic polyamide with the polyetherdiol and the polyol.

In the one-step process, the polyamide precursors, the chain stopper and the polyether are blended together; what is then obtained is a polymer having essentially polyether blocks and polyamide blocks of very variable length, but also the various reactants that have reacted randomly, which are distributed randomly along the polymer chain. They are the same reactants and the same catalyst as in the two-step process described above. If the polyamide precursors are only lactams, it is advantageous to add a little water. The copolymer has essentially the same polyether blocks and the same polyamide blocks, but also a small portion of the various reactants that have reacted randomly, which are distributed randomly along the polymer chain. As in the first step of the two-step process described above, the reactor is closed and heated, with stirring. The pressure established is between 5 and 30 bar. When the pressure no longer changes, the reactor is put under reduced pressure while still maintaining vigorous stirring of the molten reactants. The reaction is monitored as previously in the case of the two-step process.

The proper ratio of polyamide to polyether blocks can be found in a single poly(ether block amide), or a blend of two or more different composition poly(ether block amide)s can be used with the proper average composition. In one aspect, it can be useful to blend a block copolymer having a high level of polyamide groups with a block copolymer having a higher level of polyether blocks, to produce a blend having an average level of polyether blocks of about 20 to 40 weight percent of the total blend of poly(am id-block-ether) copolymers, and preferably about 30 to 35 weight percent. In a further aspect, the copolymer comprises a blend of two different poly(ether-block-amide)s comprising at least one block copolymer having a level of polyether blocks below about 35 weight percent, and a second poly(ether-block-amide) having at least about 45 weight percent of polyether blocks.

Exemplary commercially available copolymers include, but are not limited to, those available under the tradenames of VESTAMID (Evonik Industries); PLATAMID (Arkema), e.g., product code H2694; PEBAX (Arkema), e.g., product code "PEBAX MH1657" and "PEBAX MV1074"; PEBAX RNEW (Arkema); GRILAMID (EMS-Chemie AG), or also to other similar materials produced by various other suppliers.

In some aspects, the thermoplastic polyamide is physically crosslinked through, e.g., nonpolar or polar interactions between the polyamide groups of the polymers. In examples where the thermoplastic polyamide is a thermoplastic copolyamide, the thermoplastic copolyamide can be physically crosslinked through interactions between the polyamide groups, an optionally by interactions between the copolymer groups. When the thermoplastic copolyamide is physically crosslinked thorough interactions between the polyamide groups, the polyamide segments can form the portion of the polymer referred to as the "hard segment", and copolymer segments can form the portion of the polymer referred to as the "soft segment". For example, when the thermoplastic copolyamide is a thermoplastic poly(ether-block-amide), the polyamide segments form the hard segment portion of the polymer, and polyether segments can form the soft segment portion of the polymer. Therefore, in some examples, the thermoplastic polymer can include a physically crosslinked polymeric network having one or more polymer chains with amide linkages.

In some aspects, the polyamide segment of the thermoplastic co-polyamide includes polyamide-11 or polyamide-12 and the polyether segment is a segment selected from the group consisting of polyethylene oxide, polypropylene oxide, and polytetramethylene oxide segments, and combinations thereof.

Optionally, the thermoplastic polyamide can be partially covalently crosslinked, as previously described herein. In such cases, it is to be understood that the degree of crosslinking present in the thermoplastic polyamide is such that, when it is thermally processed in the form of a yarn or fiber to form the articles of footwear of the present disclosure, the partially covalently crosslinked thermoplastic polyamide retains sufficient thermoplastic character that the partially covalently crosslinked thermoplastic polyamide is softened or melted during the processing and re-solidifies.

Thermoplastic Polyesters

In aspects, the thermoplastic polymers can comprise a thermoplastic polyester. The thermoplastic polyester can be formed by reaction of one or more carboxylic acids, or its ester-forming derivatives, with one or more bivalent or multivalent aliphatic, alicyclic, aromatic or araliphatic alcohols or a bisphenol. The thermoplastic polyester can be a polyester homopolymer having repeating polyester segments of the same chemical structure. Alternatively, the polyester can comprise a number of polyester segments having different polyester chemical structures (e.g., polyglycolic acid segments, polylactic acid segments, polycaprolactone segments, polyhydroxyalkanoate segments, polyhydroxybutyrate segments, etc.). The polyester segments having different chemical structure can be arranged randomly, or can be arranged as repeating blocks.

Exemplary carboxylic acids that can be used to prepare a thermoplastic polyester include, but are not limited to, adipic acid, pimelic acid, suberic acid, azelaic acid, sebacic acid, nonane dicarboxylic acid, decane dicarboxylic acid, undecane dicarboxylic acid, terephthalic acid, isophthalic acid, alkyl-substituted or halogenated terephthalic acid, alkyl-substituted or halogenated isophthalic acid, nitro-terephthalic acid, 4,4'-diphenyl ether dicarboxylic acid, 4,4'-diphenyl thioether dicarboxylic acid, 4,4'-diphenyl sulfonedicarboxylic acid, 4,4'-diphenyl alkylenedicarboxylic acid, naphthalene-2,6-dicarboxylic acid, cyclohexane-1,4-dicarboxylic acid and cyclohexane-1,3-dicarboxylic acid. Exemplary diols or phenols suitable for the preparation of the thermoplastic polyester include, but are not limited to, ethylene glycol, diethylene glycol, 1,3-propanediol, 1,4-butanediol, 1,6-hexanediol, 1,8-octanediol, 1,10-decanediol, 1,2-propanediol, 2,2-dimethyl-1,3-propanediol, 2,2,4-trimethylhexanediol, p-xylenediol, 1,4-cyclohexanediol, 1,4-cyclohexane dimethanol, and bis-phenol A.

In some aspects, the thermoplastic polyester is a polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), a liquid crystal polyester, or a blend or mixture of two or more of the foregoing.

The thermoplastic polyester can be a co-polyester (i.e., a co-polymer including polyester segments and non-polyester segments). The co-polyester can be an aliphatic co-polyester (i.e., a co-polyester in which both the polyester segments and the non-polyester segments are aliphatic). Alternatively, the co-polyester can include aromatic segments. The polyester segments of the co-polyester can comprise or consist of polyglycolic acid segments, polylactic acid segments, polycaprolactone segments, polyhydroxyalkanoate segments, polyhydroxybutyrate segments, or any combination thereof. The polyester segments of the co-polyester can be arranged randomly, or can be arranged as repeating blocks.

For example, the thermoplastic polyester can be a block co-polyester having repeating blocks of polymeric units of the same chemical structure (segments) which are relatively harder (hard segments), and repeating blocks of polymeric segments which are relatively softer (soft segments). In block co-polyesters, including block co-polyesters having repeating hard segments and soft segments, physical cross-links can be present within the blocks or between the blocks or both within and between the blocks. In a particular example, the thermoplastic material can comprise or consist essentially of an elastomeric thermoplastic co-polyester having repeating blocks of hard segments and repeating blocks of soft segments.

The non-polyester segments of the co-polyester can comprise or consist of polyether segments, polyamide segments, or both polyether segments and polyamide segments. The co-polyester can be a block co-polyester, or can be a random co-polyester. The thermoplastic co-polyester can be formed from the polycodensation of a polyester oligomer or prepolymer with a second oligomer prepolymer to form a block copolyester. Optionally, the second prepolymer can be a hydrophilic prepolymer. For example, the co-polyester can be formed from the polycondensation of terephthalic acid or naphthalene dicarboxylic acid with ethylene glycol, 1,4-butanediol, or 1-3 propanediol. Examples of co-polyesters include polyethelene adipate, polybutylene succinate, poly (3-hydroxbutyrate-co-3-hydroxyvalerate), polyethylene terephthalate, polybutylene terephthalate, polytrimethylene terephthalate, polyethylene napthalate, and combinations thereof. In a particular example, the co-polyamide can comprise or consist of polyethylene terephthalate.

In some aspects, the thermoplastic polyester is a block copolymer comprising segments of one or more of polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), and a liquid crystal polyester. For example, a suitable thermoplastic polyester that is a block copolymer can be a PET/PEI copolymer, a polybutylene terephthalate/tetraethylene glycol copolymer, a polyoxyalkylenediimide diacid/polybutylene terephthalate copolymer, or a blend or mixture of any of the foregoing.

In some aspects, the thermoplastic polyester is a biodegradable resin, for example, a copolymerized polyester in which poly($\alpha$-hydroxy acid) such as polyglycolic acid or polylactic acid is contained as principal repeating units.

The disclosed thermoplastic polyesters can be prepared by a variety of polycondensation methods known to the skilled artisan, such as a solvent polymerization or a melt polymerization process.

Thermoplastic Polyolefins

In some aspects, the thermoplastic polymers can comprise or consist essentially of a thermoplastic polyolefin. Exemplary of thermoplastic polyolefins useful can include, but are not limited to, polyethylene, polypropylene, and thermoplastic olefin elastomers (e.g., metallocene-catalyzed block copolymers of ethylene and $\alpha$-olefins having 4 to about 8 carbon atoms). In a further aspect, the thermoplastic polyolefin is a polymer comprising a polyethylene, an ethylene-$\alpha$-olefin copolymer, an ethylene-propylene rubber (EPDM), a polybutene, a polyisobutylene, a poly-4-methylpent-1-ene, a polyisoprene, a polybutadiene, a ethylene-methacrylic acid copolymer, and an olefin elastomer such as a dynamically cross-linked polymer obtained from polypropylene (PP) and an ethylene-propylene rubber (EPDM), and blends or mixtures of the foregoing. Further exemplary thermoplastic polyolefins useful in the disclosed compositions, yarns, and fibers are polymers of cycloolefins such as cyclopentene or norbornene.

It is to be understood that polyethylene, which optionally can be crosslinked, is inclusive a variety of polyethylenes, including, but not limited to, low density polyethylene (LDPE), linear low density polyethylene (LLDPE), (VLDPE) and (ULDPE), medium density polyethylene (MDPE), high density polyethylene (HDPE), high density and high molecular weight polyethylene (HDPE-HMW), high density and ultrahigh molecular weight polyethylene (HDPE-UHMW), and blends or mixtures of any the foregoing polyethylenes. A polyethylene can also be a polyethylene copolymer derived from monomers of monolefins and diolefins copolymerized with a vinyl, acrylic acid, methacrylic acid, ethyl acrylate, vinyl alcohol, and/or vinyl acetate. Polyolefin copolymers comprising vinyl acetate-derived units can be a high vinyl acetate content copolymer, e.g., greater than about 50 weight percent vinyl acetate-derived composition.

In some aspects, the thermoplastic polyolefin, as disclosed herein, can be formed through free radical, cationic, and/or anionic polymerization by methods well known to those skilled in the art (e.g., using a peroxide initiator, heat, and/or light). In a further aspect, the disclosed thermoplastic polyolefin can be prepared by radical polymerization under high pressure and at elevated temperature. Alternatively, the thermoplastic polyolefin can be prepared by catalytic polymerization using a catalyst that normally contains one or more metals from group IVb, Vb, VIb or VIII metals. The catalyst usually has one or more than one ligand, typically oxides, halides, alcoholates, esters, ethers, amines, alkyls, alkenyls and/or aryls that can be either p- or s-coordinated complexed with the group IVb, Vb, VIb or VIII metal. In various aspects, the metal complexes can be in the free form or fixed on substrates, typically on activated magnesium chloride, titanium(III) chloride, alumina or silicon oxide. It is understood that the metal catalysts can be soluble or insoluble in the polymerization medium. The catalysts can be used by themselves in the polymerization or further activators can be used, typically a group Ia, IIa and/or IIIa metal alkyls, metal hydrides, metal alkyl halides, metal alkyl oxides or metal alkyloxanes. The activators can be modified conveniently with further ester, ether, amine or silyl ether groups.

Suitable thermoplastic polyolefins can be prepared by polymerization of monomers of monolefins and diolefins as described herein. Exemplary monomers that can be used to prepare disclosed thermoplastic polyolefin include, but are not limited to, ethylene, propylene, 1-butene, 1-pentene, 1-hexene, 2-methyl-1-propene, 3-methyl-1-pentene, 4-methyl-1-pentene, 5-methyl-1-hexene and mixtures thereof.

Suitable ethylene-$\alpha$-olefin copolymers can be obtained by copolymerization of ethylene with an $\alpha$-olefin such as propylene, butene-1, hexene-1, octene-1,4-methyl-1-pentene or the like having carbon numbers of 3 to 12.

Suitable dynamically cross-linked polymers can be obtained by cross-linking a rubber component as a soft segment while at the same time physically dispersing a hard segment such as PP and a soft segment such as EPDM by using a kneading machine such as a Banbury mixer and a biaxial extruder.

In some aspects, the thermoplastic polyolefin can be a mixture of thermoplastic polyolefins, such as a mixture of two or more polyolefins disclosed herein above. For example, a suitable mixture of thermoplastic polyolefins can be a mixture of polypropylene with polyisobutylene, polypropylene with polyethylene (for example PP/HDPE, PP/LDPE) or mixtures of different types of polyethylene (for example LDPE/HDPE).

In some aspects, the thermoplastic polyolefin can be a copolymer of suitable monolefin monomers or a copolymer of a suitable monolefin monomer and a vinyl monomer. Exemplary thermoplastic polyolefin copolymers include, but are not limited to, ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyam ides.

In some aspects, the thermoplastic polyolefin can be a polypropylene homopolymer, a polypropylene copolymers, a polypropylene random copolymer, a polypropylene block copolymer, a polyethylene homopolymer, a polyethylene random copolymer, a polyethylene block copolymer, a low density polyethylene (LDPE), a linear low density polyethylene (LLDPE), a medium density polyethylene, a high density polyethylene (HDPE), or blends or mixtures of one or more of the preceding polymers.

In some aspects, the polyolefin is a polypropylene. The term "polypropylene," as used herein, is intended to encompass any polymeric composition comprising propylene monomers, either alone or in mixture or copolymer with other randomly selected and oriented polyolefins, dienes, or other monomers (such as ethylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polypropylene can be of any standard melt flow (by testing); however, standard fiber grade polypropylene resins possess ranges of Melt Flow Indices between about 1 and 1000.

In some aspects, the polyolefin is a polyethylene. The term "polyethylene," as used herein, is intended to encompass any polymeric composition comprising ethylene monomers, either alone or in mixture or copolymer with other randomly selected and oriented polyolefins, dienes, or other monomers (such as propylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polyethylene can be of any standard melt flow (by testing); however, standard fiber grade polyethylene resins possess ranges of Melt Flow Indices between about 1 and 1000.

Commercially-available thermoplastic polyamide hydrogels suitable for the present aspects include those under the tradename "PEBAX" (e.g., "PEBAX MH1657" and "PEBAX MV1074" from Arkema, Inc., Clear Lake, TX), and "SERENE" coating (Sumedics, Eden Prairie, MN). Suitable commercially-available polyolefin materials include, but are not limited to the "POLYOX" product line by Dow Chemical, Midland MI, and styrenic block co-polymers. Commercially-available styrenic co-polymers include, but are not limited to TPE-s (e.g., styrene-butadiene-styrene (SBS) block copolymers, such as "SOFPRENE" and styrene-ethylene-butylene-styrene (SEBS) block copolymer, such as "LAPRENE", by SO.F.TER. GROUP, Lebanon, TN); thermoplastic copolyester elastomers (e.g., thermoplastic elastomer vulcanizates (TPE-v or TPV)), such as "FORPRENE" by SO.F.TER. GROUP), "TERMOTON-V" by Termopol, Istanbul Turkey, and TPE block copolymers, such as "SANTOPRENE" (ExxonMobil, Irving, TX).

According to some aspects, the second polymeric material and/or third polymeric material can further comprise, consist of, or consist essentially of one or more processing aids. These processing aids can be independently selected from the group including, but not limited to, curing agents, initiators, plasticizers, mold release agents, lubricants, antioxidants, flame retardants, dyes, pigments, reinforcing and non-reinforcing fillers, fiber reinforcements, and light stabilizers.

The outsole of the finished article of footwear in the present disclosure alternatively can be characterized based on its structure. For example, the outsole can be described, without limitation, according to the thickness or dimensions of the hydrogel located on the externally-facing surface of the surface of the outsole, according to the way the layered film is arranged in the finished article of footwear, according to the number of traction elements that are present, or according to whether or not the outsole is affixed to an upper that comprises a single piece or multiple pieces. According to an aspect, the outsole has an externally-facing surface that is comprised, at least in part, by the hydrogel material. The externally-facing surface of the outsole can comprise from at least 10 percent, at least 25 percent, at least 50 percent, at least 70 percent, at least 80 percent, or between about 5 percent and about 95 percent hydrogel, based on the total surface area of the externally-facing surface of the outsole. The outsole can further comprise one or more traction elements present on its externally-facing surface.

According to another aspect of the present disclosure, the outsole exhibits a "dry-state" thickness that is in the range of about 0.1 millimeter (mm) to about 9.0 mm. Alternatively, the dry-state thickness of the outsole is about 0.2 mm to about 5.0 mm; alternatively, about 0.2 mm to about 2.0 mm. The hydration and swelling of the hydrogel can be observed by an increase in the thickness of the outsole from the dry-state thickness, through a range of intermediate-state thicknesses as they hydrogel is hydrated, and finally to a saturated-state thickness, which is an average thickness of the outsole when hydrogel is fully saturated with water. For example, the saturated-state thickness for the fully-saturated outsole can be greater than 150 percent, greater than 200 percent, greater than 250 percent, greater than 300 percent, greater than 350 percent, greater than 400 percent, or greater than 500 percent, of the dry-state thickness of the outsole.

The dry and wet states of the hydrogel in the outsole may allow the article of footwear to dynamically adapt in durability to account for dry and wet surface play. For example, when used on a dry ground, the hydrogel can be substantially dry, in which condition the hydrogel is relatively stiffer and more wear resistant. Alternatively, when used on wet ground or when wet material is present on dry ground, the hydrogel can quickly take up water to achieve a hydrated or fully saturated condition, in which condition the hydrogel material can be in a swollen and/or relatively compliant state. However, the wet ground imposes less wear on the swollen and compliant hydrogel as compared to dry ground. As such, the outsole can be used in a variety of conditions, as desired. Nonetheless, the articles of footwear are particularly beneficial for use in wet environments, such as with muddy surfaces, grass surfaces, and the like.

The outsole can be directly secured or otherwise operably secured to the upper using any suitable mechanism or method. As used herein, the terms "operably secured to", such as for an outsole that is operably secured to an upper, refers collectively to direct connections, indirect connections, integral formations, and combinations thereof. For instance, for an outsole that is operably secured to an upper, the outsole can be directly connected to the upper (e.g., adhered directly thereto or glued with a cement, a primer, or an adhesive), can be integrally formed with the upper (e.g., as a unitary component), and combinations thereof.

The upper of the footwear has a body, which can be fabricated from materials known in the art for making articles of footwear, and is configured to receive a user's foot. The upper of a shoe consists of all components of the shoe above the outsole. The different components of the upper can include a toe box; heal counter; and an Achilles notch, to name a few. These components are attached by stitches or more likely molded to become a single unit to which the outsole is attached.

The upper or components of the upper usually comprise a soft body made up of one or more lightweight materials. The materials used in the upper provide stability, comfort, and a secure fit. For example, the upper can be made from or include one or more components made from one or more of natural or synthetic leather, a thermoset polymer, a thermoplastic polymer, or a mixture thereof. When desirable, the upper can be made using one of these components as a fabric or textile formed therefrom.

The textile can include; a knit, braided, woven, or non-woven textile made in whole or in part of a natural fiber; a knit, braided, woven or non-woven textile made in whole or in part of a synthetic polymer, a film of a synthetic polymer, etc.; and combinations thereof. The textile can include one or more natural or synthetic fibers or yarns. The synthetic yarns can comprise, consist of, or consist essentially of thermoplastic polyurethane (TPU), polyamide (e.g., "NYLON" etc.), polyester (e.g., polyethylene terephthalate or PET), polyolefin, or a mixture thereof.

The upper and components of the upper can be manufactured according to conventional techniques (e.g., molding, extrusion, thermoforming, stitching, knitting, etc.). While illustrated in FIGS. 3B and 3D as a generic design, the upper 85 can alternatively have any desired aesthetic design, functional design, brand designators, or the like.

Figure 3A:
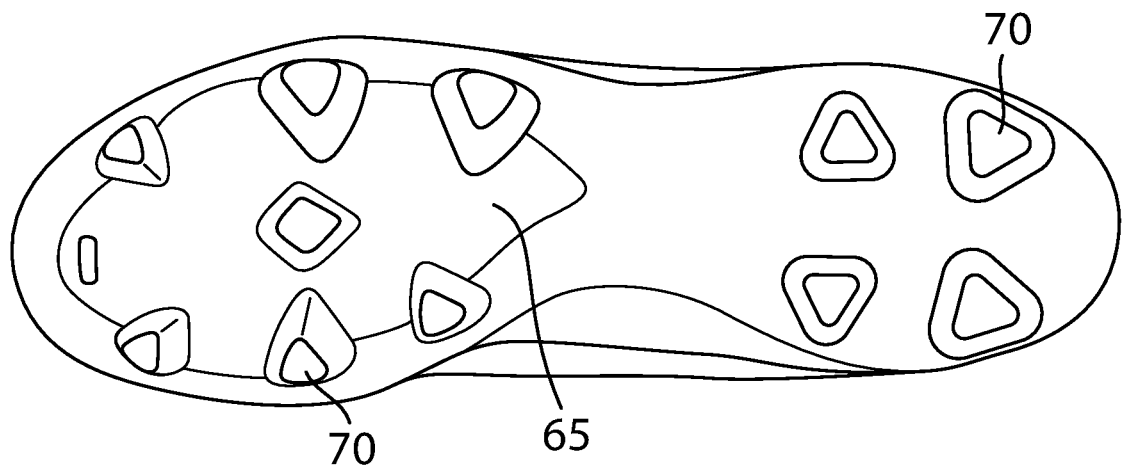
FIG. 3A is a bottom side view of the external surface of an outsole with traction elements according to an aspect of the present disclosure.
Figure 3B:
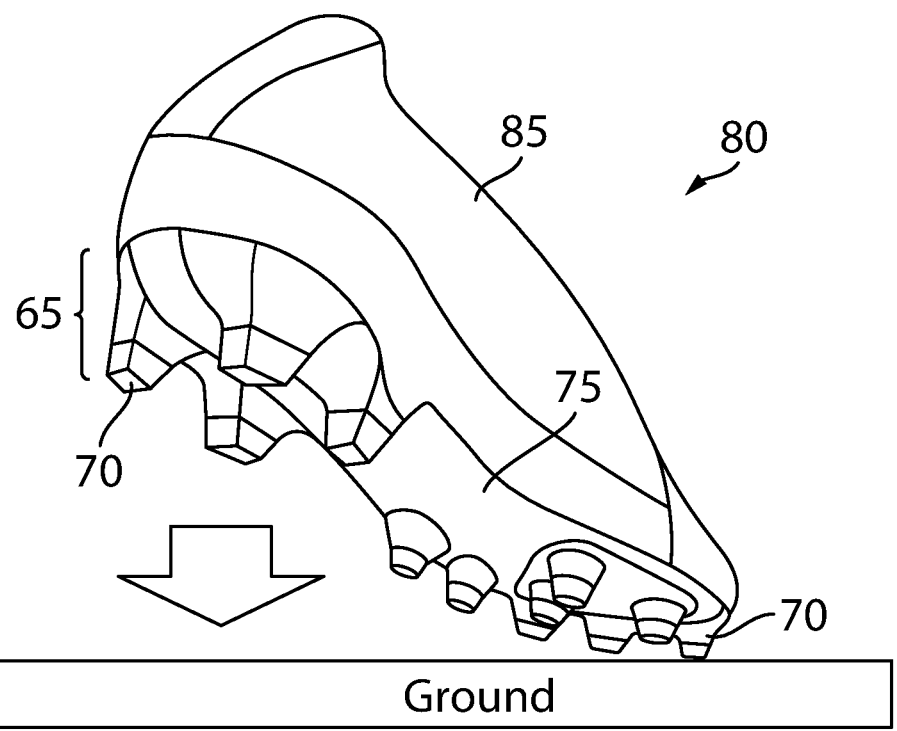
FIG. 3B is a perspective view of an article of footwear having an outsole with traction elements according to an aspect of the present disclosure.
Figure 3C:
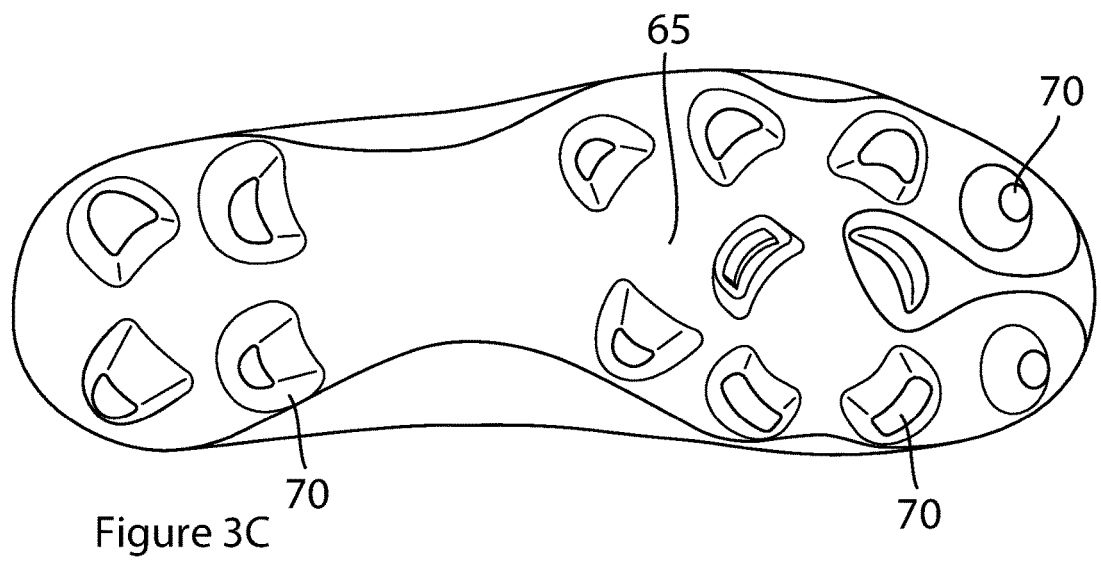
FIG. 3C is a bottom side view of the external surface of the outsole having traction elements according to an aspect of the present disclosure.
Figure 3D:
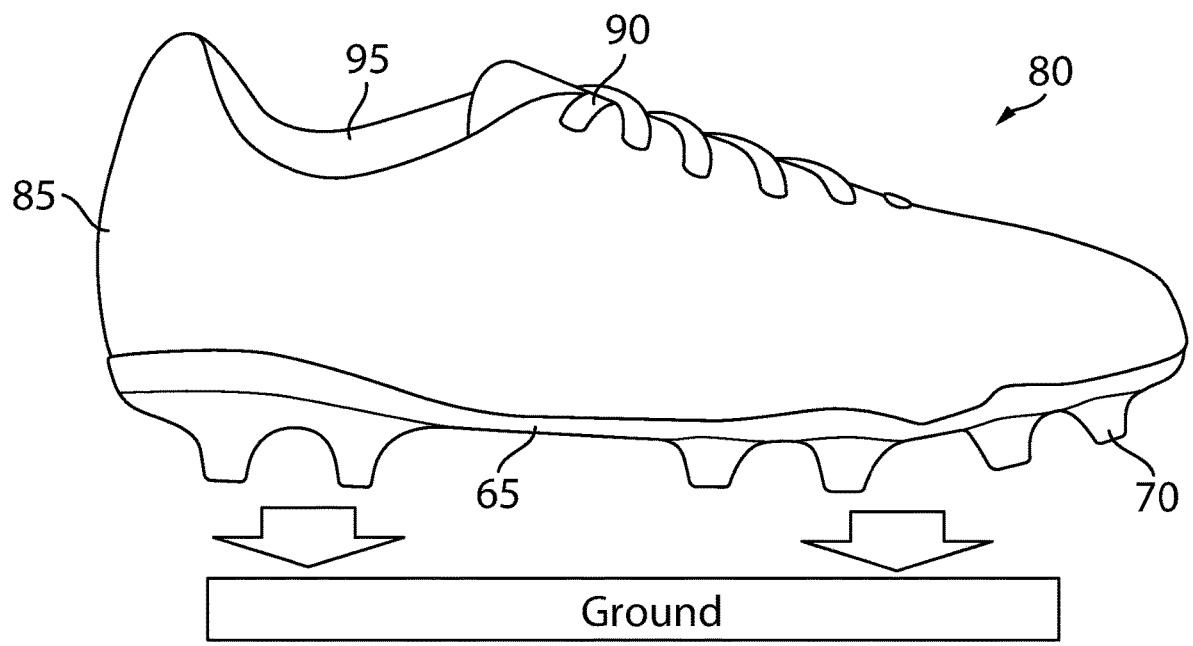
FIG. 3D is a perspective view of an article of footwear having an outsole with traction elements according to an aspect of the present disclosure.

Still referring to FIG. 3D, the upper 85 can further comprise laces, flaps, straps, or other securing or foot engagement structures 90 used to securely hold the shoe 80 to a wearer's foot. A tongue member, bootie, or other similar type structure can be provided in or near the shoe instep area in order to increase comfort and/or to moderate the pressure or feel applied to the wearer's foot by any foot engagement structures 95.

When desirable, at least a portion of the upper 85 of the article of footwear, and in some aspects substantially the entirety of the upper, can be formed of a knitted component. Thus, the textile can be a knit textile with a circular knit textile being one specific example thereof. The knitted component can additionally or alternatively form another element of the article of footwear 80 such as the insole, for example.

The knitted component can have a first side forming an inner surface of the upper (e.g., facing the void of the article of footwear) and a second side forming an outer surface of the upper. An upper including the knitted component can substantially surround the void in order to substantially encompass the foot of a person when the article of footwear is in use. The first side and the second side of the knitted component can exhibit different characteristics (e.g., the first side can provide abrasion resistance and comfort while the second side can be relatively rigid and provide water resistance). The knitted component can be formed as an integral one-piece element during a knitting process, such as a weft knitting process (e.g., with a flat knitting machine or circular knitting machine), a warp knitting process, or any other suitable knitting process. That is, the knitting process can substantially form the knit structure of the knitted component without the need for significant post-knitting processes or steps. Alternatively, two or more portions of the knitted component can be formed separately and then attached. In some aspects, the knitted component can be shaped after the knitting process to form and retain the desired shape of the upper (for example, by using a foot-shaped last). The shaping process can include attaching the knitted component to another object (e.g., a strobel) and/or attaching one portion of the knitted component to another portion of the knitted component at a seam by sewing, by using an adhesive, or by another suitable attachment process.

Forming the upper with the knitted component can provide the upper with advantageous characteristics including, but not limited to, a particular degree of elasticity (for example, as expressed in terms of Young's modulus), breathability, bendability, strength, moisture absorption, weight, and abrasion resistance. These characteristics can be accomplished by selecting a particular single layer or multi-layer knit structure (e.g., a ribbed knit structure, a single jersey knit structure, or a double jersey knit structure), by varying the size and tension of the knit structure, by using one or more yarns formed of a particular material (e.g., a polyester material, a monofilament material, or an elastic material such as spandex), by selecting yarns of a particular size (e.g., denier), or a combination thereof. The knitted component can also provide desirable aesthetic characteristics by incorporating yarns having different colors or other visual properties arranged in a particular pattern. The yarns and/or the knit structure of the knitted component can be varied at different locations such that the knitted component has two or more portions with different properties (e.g., a portion forming the throat area of the upper can be relatively elastic while another portion can be relatively inelastic). In some aspects, the knitted component can incorporate one or more materials with properties that change in response to a stimulus (e.g., temperature, moisture, electrical current, magnetic field, or light). For example, the knitted component can include yarns formed of a polymeric material (e.g., polyurethanes, polyamides, polyolefins, and nylons) that transitions from a solid state to a softened or liquid state when subjected to certain temperatures at or above its melting point and then transitions back to the solid state when cooled. The polymeric material can provide the ability to heat and then cool a portion of the knitted component to thereby form an area of bonded or continuous material that exhibits certain advantageous properties including a relatively high degree of rigidity, strength, and water resistance, for example.

In some aspects, the knitted component can include one or more yarns or strands that are at least partially inlaid or otherwise inserted within the knit structure of the knitted component during or after the knitting process, herein referred to as "tensile strands." The tensile strands can be substantially inelastic so as to have a substantially fixed length. The tensile strands can extend through a plurality of courses of the knitted component or through a passage within the knitted component and may limit the stretch of the knitted component in at least one direction. For example, the tensile strands can extend approximately from a bite line of the upper to a throat area of the upper to limit the stretch of the upper in the lateral direction. The tensile strands can form one or more lace apertures for receiving a lace and/or can extend around at least a portion of a lace aperture formed in the knit structure of the knitted component.

When desirable, the article of footwear can further include the use of an adhesive, a primer, or a combination thereof located between the outsole and the upper attached thereto. The adhesive or primer can comprise, but not be limited to, an epoxy, urethane, acrylic, cyanoacrylate, silicone, or a combination thereof.

According to various aspects, at least a portion of the external surface of the outsole can comprise a pattern or a texture. When desirable, this pattern can represent a tread pattern. In some aspects, the external surface of the outsole comprises one or more traction elements (as shown in FIGS. 2(A-B) and 3(A-D)) wherein the portion of said traction elements that contact the ground are substantially free of the hydrogel material. In aspects, the traction elements comprise a material that is harder than the hydrogel material. In some aspects, the one or more traction elements can have a conical or rectangular shape as further described below. The traction elements can provide enhanced traction between the outsole and the ground. The traction elements also can provide support or flexibility to the outsole and/or provide an aesthetic design or look to the footwear article.

According to the various aspects, the traction elements can include, but are not limited to, various shaped projections, such as cleats, studs, spikes, or similar elements configured to enhance traction between the outsole and the ground for a wearer during cutting, turning, stopping, accelerating, and backward movement. According to the aspects, the traction elements can be arranged in any necessary or desirable pattern along the bottom surface of the outsole. For instance, the traction elements can be distributed in groups or clusters along the outsole (e.g., clusters of 2-8 traction elements). In certain aspects, the traction elements can be arranged along the outsole symmetrically or non-symmetrically between a medial side and a lateral side of the article of footwear. In certain aspects, one or more of the traction elements can be arranged along a centerline of the outsole between the medial side and the lateral side.

According to some aspects, the traction elements can be made of one or more materials that are different from the hydrogel, the second polymeric material, the third polymeric material, or the fourth polymeric material that comprises the outsole. In some aspects, one or more of the traction elements can comprise the same material as the second, third, or fourth polymeric materials. In some aspects, one or more of the traction elements comprise the second polymeric material, third polymeric material, or fourth polymeric material and can be formed integrally with the outsole during the molding steps as described in the methods of manufacturing the outsole defined herein. In yet other aspects, at least one of the traction elements can be substantially free of the second, third, or fourth polymeric materials. In some aspects, the one or more traction elements are made of a material that is harder than the second, third, or fourth polymeric materials.

For example, in certain aspects the traction elements can include one or more of polymeric materials such as thermoplastic elastomers; thermoset polymers; elastomeric polymers; silicone polymers; natural and synthetic rubbers; composite materials including polymers reinforced with carbon fiber and/or glass; natural leather; metals such as aluminum, steel and the like; and combinations thereof. In some aspects, the traction elements are integrally formed with the outsole (e.g., molded together), the traction elements can include the same materials as the component (e.g., thermoplastic or thermoset materials). In some aspects, the traction elements are separately provided (i.e., not molded with the outsole) and can be otherwise operably coupled with the outsole. For example, the outsole can contain certain fittings or receptacles or receiving holes with which the traction elements can be coupled. In these aspects the traction elements can comprise any suitable materials that can secured in the receiving holes of the outsole (e.g., metals and polymeric materials) either as snap-fit, screw-on, or the like.

In some aspects, the traction elements can each independently have any necessary or desired dimension (e.g., shape and size). Examples of shapes for the traction elements include rectangular, hexagonal, cylindrical, conical, circular, square, triangular, trapezoidal, diamond, ovoid, as well as other regular or irregular shapes (e.g., curved lines, C-shapes, etc.). In some aspects, the traction elements can have the same or different heights, widths, and/or thicknesses as each other. Further examples of suitable dimensions for the traction elements and their arrangements along the outsole include those provided in soccer/global football footwear commercially available under the tradenames "TIEMPO", "HYPERVENOM", "MAGISTA", and "MERCURIAL" from Nike, Inc. of Beaverton, OR.

In various aspects, the traction elements can be incorporated into the outsole by any necessary or desired mechanism such that the traction elements extend from the bottom surface of the outsole. In some aspects, the traction elements can be integrally formed with the outsole through a molding process. In some aspects, the outsole can be configured to receive removable traction elements, such as screw-in or snap-in traction elements. In these aspects, the outsole can include receiving holes (e.g., threaded or snap-fit holes) or fittings, and the traction elements can be screwed or snapped into or otherwise coupled with the receiving holes or fittings to secure the traction elements to the outsole.

In further aspects, a first portion of the traction elements can be integrally formed with the outsole and a second portion of the traction elements can be secured with screw-in, snap-in, or other similar mechanisms. The traction elements can also be configured as short studs for use with artificial ground (AG) footwear, if desired. In some aspects, the receiving holes or fittings can be raised or otherwise protrude from the general plane of the external surface of the outsole. In some aspects, the receiving holes can be flush with the external surface. In some aspects, the outsole can comprise a combination of these features and elements.

According to various aspects, the one or more traction elements have a length (the dimension by which it protrudes from the externally-facing surface of the outsole) that is greater than the hydrated or saturated-state thickness of the outsole. The materials present in the outsole and its corresponding dry and saturated thicknesses can be selected to ensure that the traction elements continue to provide ground-engaging traction during use of the footwear, even when the hydrogel is in a fully swollen state. For example, the outsole can be characterized by a "clearance" which is the difference between the length of one or more traction elements and the thickness of the outsole (in its dry state, hydrated state, or saturated state). In some aspects, the average clearance for the saturated-state of the outsole is desirably at least 8 millimeters (mm). In some aspects, the average clearance of the outsole in its saturated state can be at least 9 mm, at least 10 mm, or more.

Since the outsole is the outer most sole of the shoe it is directly exposed to abrasion and wear. In some aspects, various portions of the outsole can be constructed with different thickness and can exhibit different degrees of flexibility. The outsole can comprise materials that are selected to provide necessary or desired properties, such as a degree of waterproofing, durability, and/or a coefficient of friction that is high enough to prevent slipping. In some cases, two or more materials of different densities can be incorporated into the outsole to give a hardwearing outer surface. In some aspects, the hardwearing outsole can be combined with a softer, more flexible midsole for greater comfort. For example, the midsole can comprise a foam material formed as sheet stock, by injection molding, or by compression molding. In some aspects, the foam material can be, without limitation, a polyurethane (PU), an ethylene vinyl acetate (EVA), a rubber, or a combination thereof.

In some aspects, the article of footwear or shoe can also include a platform upon which the foot will rest and that separates the upper from the foot of the person wearing the shoe. This platform is typically a separate removable board called an insole (not shown) that is made of cellulose or other materials, such as thermoplastic or thermoset elastomers, capable of providing a cushion between the ground and the foot of the person wearing the shoe. The insole can be treated with additives to inhibit bacterial growth. When desirable, the insole can be incorporated with, e.g., sewn into, the upper.

Referring once again to FIGS. 3B and 3D, in aspects the outsole 65 of the shoe 80 can be engaged with or attached to the upper 85, such as by being directly adhered thereto. In some aspects, at least a portion of the outsole can be attached to the upper 85 through the use of additional means conventionally known or used in the construction of footwear 80, such as through the use of cements or adhesives, by mechanical connectors, and by sewing or stitching, to name a few.

According to another aspect of the present disclosure, the use of an outsole compositionally comprising a hydrogel on the external or ground-facing surface is described. This use involves incorporating the outsole as an externally-facing surface in a finished article of footwear in order to prevent or reduce soil accumulation on the outsole and article. In some aspects, the outsole component or article retains at least 5 percent less soil by weight; alternatively, at least 10 percent less soil by weight, as compared to a conventional component or article that is similar except that the externally facing surface of the conventional component or article is substantially free of the hydrogel.

The following specific examples are given to illustrate the sampling procedures and the test methods used to measure the properties exhibited by the outsoles formed according to the teachings of the present disclosure. These specific examples should not be construed in a way that limits the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Example 1

Sampling Procedures

The predetermined sampling procedure can be a Component Sampling Procedure, when the component is present as an outsole component or an outsole that makes up part of an article of footwear; a Co-extruded or Laminated Film Sampling Procedure, when the component is part of a layered film; a Neat Film Sampling Procedure, when the component is only a film of the hydrogel; or a Neat Material Sampling Procedure, when the component is a material available in a form other than a film. Each of these sampling procedures are described in more detail below.

(A)—Component Sampling Procedure

This procedure can be used to obtain a sample of the hydrogel when the hydrogel is incorporated as the first layer in an outsole component or as the external layer in an outsole of an article of footwear (e.g., bonded to backing materials such as second polymeric material and/or third polymeric material). An outsole sample, which includes the hydrogel in a non-wet state (e.g., at about 25 degrees C. and about 20 percent relative humidity) is obtained as formed into an outsole component or cut from the article of footwear using a blade. This process is performed by separating the outsole component from an associated footwear upper, if present, and removing any materials from the article's top surface (e.g., corresponding to the top surface) that can uptake water and potentially skew the water uptake measurements of the hydrogel. For example, the article's top surface can be skinned, abraded, scraped, or otherwise cleaned to remove any upper adhesives, yarns, fibers, foams, and the like that could potentially take up water themselves.

The resulting outsole component sample includes the hydrogel and any article substrate bonded to the hydrogel, and maintains the interfacial bond between the hydrogel and the associated backing materials of the finished article. As such, any test using a Component Sampling Procedure can simulate how the hydrogel will perform as part of an article of footwear. Additionally, this type of sample is also useful in cases where the interfacial bond between the hydrogel and the backing materials is less defined, such as where the hydrogel of the outsole is highly diffused into the backing materials of the finished article (e.g., with a concentration gradient).

In this procedure, the sample is taken at a location along the outsole component that provides a substantially constant thickness for the component (within plus or minus 10 percent of the average thickness), such as in a forefoot region, mid-foot region, or a heel region of the article, and has a surface area of about 4.0 square centimeters ($cm^2$). In cases where the hydrogel is not present on the outsole component in any segment having a 4.0 $cm^2$ surface area and/or where the thickness is not substantially constant for a segment having a 4.0 cm² surface area, sample sizes with smaller cross-sectional surface areas can be taken and the area-specific measurements are adjusted accordingly.

(B)—Co-extruded or Laminated Film Sampling Procedure

This procedure can be used to obtain a sample of hydrogel of the present disclosure when the hydrogel is co-extruded with or laminated onto a backing substrate (e.g., third polymeric material) to form all or part of the layered film such as the film component used in an outsole of the present disclosure. The backing substrate represents a thermoplastic material that is compatible with the composition of the hydrogel.

In some cases, the samples taken from co-extruded films are suitable substitutes to samples taken directly from outsoles or articles of footwear. Additionally, this sample is also useful in cases where the interfacial bond between the hydrogel and a backing substrate is less defined, such as where the material is highly diffused into the composition of the backing substrate (e.g., with a concentration gradient).

In this case, the hydrogel is co-extruded or laminated with the backing substrate as a web or sheet having a substantially constant thickness for the material (within plus or minus 10 percent of the average material thickness), and cooled to solidify the resulting web or sheet. A sample of the hydrogel secured to the backing substrate is then cut from the resulting web or sheet, with a sample size surface area of 4 cm², such that the material of the resulting sample remains secured to the backing substrate.

(C)—Neat Film Sampling Procedure

This procedure can be used to obtain a sample of hydrogel of the present disclosure when the hydrogel is isolated in a neat form (i.e., without any bonded substrate in a layered film). In this case, the hydrogel is extruded as a web or sheet having a substantially constant material thickness for the hydrogel (within plus or minus 10 percent of the average material thickness), and cooled to solidify the resulting web or sheet. A sample of the hydrogel having a surface area of 4 cm² is then cut from the resulting web or sheet.

Alternatively, if a source of the hydrogel is not available in a neat form, the material can be cut from an outsole substrate of a footwear outsole, or from a backing substrate of a co-extruded sheet or web, thereby isolating the material. In either case, a sample of the material having a surface area of 4 cm² is then cut from the resulting isolated hydrogel.

(D)—Neat Material Sampling Procedure

This procedure can be used to obtain a sample of a material of the present disclosure. In this case, the material is provided in neat form, such as flakes, granules, powders, pellets, and the like. If a source of the material is not available in a neat form, the material can be cut, scraped, or ground from an outsole of a footwear outsole or from a backing substrate of a co-extruded sheet or web, thereby isolating the material.

Example 2

Test Protocols

The following test procedures are described with reference to outsoles components used in articles of footwear according to the Component Sampling Procedure. However, the same tests can be applied to samples used in a simulated environment (e.g., using a sample prepared according to the Co-extruded or Laminated Film Sampling Procedure, the Neat Film Sampling Procedure or the Neat Material Sampling Procedure). In other words, a measurement obtained on a neat material can be attributed to an outsole comprising the material where the material defines at least a portion of a surface or side of the outsole. Additionally, a measurement made in a simulated environment can be used to select the desired performance property for an outsole comprising the material where the material defines at least a portion of a surface or side of the outsole.

(I)—Water Uptake Capacity Test Protocol

This test measures the water uptake capacity of the hydrogel after a predetermined soaking duration for a sample (e.g., taken with the above-discussed Component Sampling Procedure). The sample is initially dried at 60° C. until there is no weight change for consecutive measurement intervals of at least 30 minutes apart (e.g., a 24-hour drying period at 60 degrees C. is typically a suitable duration). The total weight of the dried sample ($Wt_{sample\ dry}$) is then measured in grams. The dried sample is allowed to cool down to 25 degrees C., and is fully immersed in a deionized water bath maintained at 25 degrees C. After a given soaking duration, the sample is removed from the deionized water bath, blotted with a cloth to remove surface water, and the total weight of the soaked sample ($Wt_{sample\ wet}$) is measured in grams.

Any suitable soaking duration can be used, where a 24-hour soaking duration is believed to simulate saturation conditions for the thermoplastic hydrogel of the present disclosure (i.e., the hydrophilic thermoplastic hydrogel will be in its saturated state). Accordingly, as used herein, the expression "having a water uptake capacity at 5 minutes" refers to a soaking duration of 5 minutes, the expression "having a water uptake capacity at 1 hour" refers to a soaking duration of 1 hour, the expression "having a water uptake capacity at 24 hours" refers to a soaking duration of 24 hours, and the like.

As can be appreciated, the total weight of a sample taken pursuant to the Component Sampling Procedure includes the weight of the material as dried or soaked ($Wt_{sample\ dry}$ or $Wt_{sample\ wet}$) and the weight of the backing material substrate ($Wt_{substrate}$) needs to be subtracted from the sample measurements.

The weight of the substrate ($Wt_{substrate}$) is calculated using the sample surface area (e.g., 4.0 cm²), an average measured thickness of the backing substrate in the sample, and the average density of the backing substrate material. Alternatively, if the density of the material for the backing substrate is not known or obtainable, the weight of the substrate ($Wt_{substrate}$) is determined by taking a second sample using the same sampling procedure as used for the primary sample, and having the same dimensions (surface area and film/substrate thicknesses) as the primary sample. The material of the second sample is then cut apart from the substrate of the second sample with a blade to provide an isolated substrate. The isolated substrate is then dried at 60 degrees C. for 24 hours, which can be performed at the same time as the primary sample drying. The weight of the isolated backing substrate ($Wt_{substrate}$) is then measured in grams.

The resulting backing substrate weight ($Wt_{substrate}$) is then subtracted from the weights of the dried and soaked primary sample ($Wt_{sample\ dry}$ or $Wt_{sample\ wet}$) to provide the weights of the material as dried and soaked ($Wt_{component\ dry}$ or $Wt_{component\ wet}$) as depicted by Equations 1 and 2.

$$Wt_{component\ dry} = Wt_{sample\ dry} - Wt_{substrate} \qquad \text{(Eq. 1)}$$

$$Wt_{component\ wet} = Wt_{sample\ wet} - Wt_{substrate} \qquad \text{(Eq. 2)}$$

The weight of the dried component ($Wt_{component\ dry}$) is then subtracted from the weight of the soaked component ($Wt_{component\ wet}$) to provide the weight of water that was taken up by the component, which is then divided by the weight of the dried component ($Wt_{component\ dry}$) to provide the water uptake capacity for the given soaking duration as a percentage, as depicted below by Equation 3.

$$\text{Water Uptake Capacity} = \frac{Wt_{component\ wet} - Wt_{component\ dry}}{Wt_{component\ dry}} (100\%) \quad \text{(Eq. 3)}$$

For example, a water uptake capacity of 50 percent at 1 hour means that the soaked component weighed 1.5 times more than its dry-state weight after soaking for 1 hour. Similarly, a water uptake capacity of 500 percent at 24 hours means that the soaked component weighed six times more than its dry-state weight after soaking for 24 hours.

(II)—Water Uptake Rate Test Protocol

This test measures the water uptake rate of the hydrogel by modeling weight gain as a function of soaking time for a sample with a one-dimensional diffusion model. The sample can be taken with any of the above-discussed sampling procedures, including the Component Sampling Procedure. The sample is dried at 60 degrees C. until there is no weight change for consecutive measurement intervals of at least 30 minutes apart (a 24-hour drying period at 60 degrees C. is typically a suitable duration). The total weight of the dried sample ($Wt_{sample\ dry}$) is then measured in grams. Additionally, the average thickness of the component for the dried sample is measured for use in calculating the water uptake rate, as explained below.

The dried sample is allowed to cool down to 25 degrees C., and is fully immersed in a deionized water bath maintained at 25 degrees C. Between soaking durations of 1, 2, 4, 9, 16, and 25 minutes, the sample is removed from the deionized water bath, blotted with a cloth to remove surface water, and the total weight of the soaked sample ($W_{sample\ wet}$) is measured, where "t" refers to the particular soaking-duration data point (e.g., 1, 2, 4, 9, 16, or 25 minutes).

The exposed surface area of the soaked sample is also measured with calipers for determining the specific weight gain, as explained below. The exposed surface area refers to the surface area that comes into contact with the deionized water when fully immersed in the bath. For samples obtained using the Component Sampling Procedure, the samples only have one major surface exposed. For convenience, the surface areas of the peripheral edges of the sample are ignored due to their relatively small dimensions.

The measured sample is fully immersed back in the deionized water bath between measurements. The 1, 2, 4, 9, 16, and 25 minute durations refer to cumulative soaking durations while the sample is fully immersed in the deionized water bath (i.e., after the first minute of soaking and first measurement, the sample is returned to the bath for one more minute of soaking before measuring at the 2-minute mark).

As discussed above in the Water Uptake Capacity Test, the total weight of a sample taken pursuant to the Component Sampling Procedure includes the weight of the material as dried or soaked ($Wt_{component\ wet}$ or $Wt_{component\ dry}$) and the weight of the article or backing substrate ($Wt_{substrate}$). In order to determine a weight change of the material due to water uptake, the weight of the backing substrate ($Wt_{substrate}$) needs to be subtracted from the sample weight measurements. This can be accomplished using the same steps discussed above in the Water Uptake Capacity Test to provide the resulting material weights $Wt_{component\ wet}$ and $Wt_{component\ dry}$ for each soaking-duration measurement.

The specific weight gain ($Ws_t$) from water uptake for each soaked sample is then calculated as the difference between the weight of the soaked sample ($Wt_{component\ wet}$) and the weight of the initial dried sample ($Wt_{component\ dry}$) where the resulting difference is then divided by the exposed surface area of the soaked sample ($A_t$) as depicted in Equation 4.

$$(W_{S_t}) = \frac{(Wt_{component\ wet} - Wt_{component\ dry})}{(A_t)} \quad \text{(Eq. 4)}$$

where t refers to the particular soaking-duration data point (e.g., 1, 2, 4, 9, 16, or 25 minutes), as mentioned above.

The water uptake rate for the hydrogel is then determined as the slope of the specific weight gains ($Ws_t$) versus the square root of time (in minutes), as determined by a least squares linear regression of the data points. For the hydrogel of the present disclosure, the plot of the specific weight gains ($Ws_t$) versus the square root of time (in minutes) provides an initial slope that is substantially linear (to provide the water uptake rate by the linear regression analysis). However, after a period of time depending on the thickness of the component, the specific weight gains will slow down, indicating a reduction in the water uptake rate, until the saturated state is reached. This is believed to be due to the water being sufficiently diffused throughout the hydrogel as the water uptake approaches saturation, and will vary depending on component thickness.

As such, for the component having an average thickness (as measured above) less than 0.3 millimeters, only the specific weight gain data points at 1, 2, 4, and 9 minutes are used in the linear regression analysis. In these cases, the data points at 16 and 25 minutes can begin to significantly diverge from the linear slope due to the water uptake approaching saturation, and are omitted from the linear regression analysis. In comparison, for the component having an average dried thickness (as measured above) of 0.3 millimeters or more, the specific weight gain data points at 1, 2, 4, 9, 16, and 25 minutes are used in the linear regression analysis. The resulting slope defining the water uptake rate for the sample has units of weight/(surface area-square root of time), such as grams/(meter$^2$-minutes$^{1/2}$) or g/m$^2$/$\sqrt{\text{min}}$.

Furthermore, some component surfaces can create surface phenomenon that quickly attract and retain water molecules (e.g., via surface hydrogen bonding or capillary action) without actually drawing the water molecules into the film or substrate. Thus, samples of these films or substrates can show rapid specific weight gains for the 1-minute sample, and possibly for the 2-minute sample. After that, however, further weight gain is negligible. As such, the linear regression analysis is only applied if the specific weight gain in data points at 1, 2, and 4 minutes continue to show an increase in water uptake. If not, the water uptake rate under this test methodology is considered to be about zero g/m$^2$/$\sqrt{\text{min}}$.

(III)—Swelling Capacity Test Protocol

This test measures the swelling capacity of the component in terms of increases in thickness and volume after a given soaking duration for a sample (e.g., taken with the above-discussed Component Sampling Procedure). The sample is initially dried at 60 degrees C. until there is no weight change for consecutive measurement intervals of at least 30 minutes apart (a 24-hour drying period is typically a suitable duration). The dimensions of the dried sample are then measured (e.g., thickness, length, and width for a rectangular sample; thickness and diameter for a circular sample, etc.). The dried sample is then fully immersed in a deionized water bath maintained at 25 degrees C. After a given soaking duration, the sample is removed from the deionized water bath, blotted with a cloth to remove surface water, and the same dimensions for the soaked sample are re-measured.

Any suitable soaking duration can be used. Accordingly, as used herein, the expression "having a swelling thickness (or volume) increase at 5 minutes of." refers to a soaking duration of 5 minutes, the expression "having a swelling thickness (or volume) increase at 1 hour of" refers to a test duration of 1 hour, the expression "having a swelling thickness (or volume) increase at 24 hours of" refers to a test duration of 24 hours, and the like.

The swelling of the component is determined by (1) an increase in the thickness between the dried and soaked component, by (2) an increase in the volume between the dried and soaked component, or (3) both. The increase in thickness between the dried and soaked components is calculated by subtracting the measured thickness of the initial dried component from the measured thickness of the soaked component. Similarly, the increase in volume between the dried and soaked components is calculated by subtracting the measured volume of the initial dried component from the measured volume of the soaked component. The increases in the thickness and volume can also be represented as percentage increases relative to the dry thickness or volume, respectively.

(IV)—Contact Angle Test

This test measures the contact angle of a sample surface (e.g., of a surface of an outsole of the present disclosure where the surface is defined by the hydrogel of the present disclosure, or a surface of a co-extruded film formed of the hydrogel, or a surface of a neat film formed of the hydrogel) based on a static sessile drop contact angle measurement for a sample (e.g., taken with the above-discussed Component Sampling Procedure, Co-extruded or Laminated Film Sampling Procedure, or the Neat Film Sampling Procedure). The contact angle refers to the angle at which a liquid interface meets the solid surface of the sample, and is an indicator of how hydrophilic the surface is.

For a dry test (i.e., to determine a dry-state contact angle), the sample is initially equilibrated at 25 degrees C. and 20 percent humidity for 24 hours. For a wet test (i.e., to determine a wet-state contact angle), the sample is fully immersed in a deionized water bath maintained at 25 degrees C. for 24 hours. After that, the sample is removed from the bath and blotted with a cloth to remove surface water, and clipped to a glass slide if needed to prevent curling.

The dry or wet sample is then placed on a moveable stage of a contact angle goniometer such as the goniometer commercially available under the tradename "RAME-HART F290" from Rame-Hart Instrument Co., Succasunna, NJ. A 10-microliter droplet of deionized water is then placed on the sample using a syringe and automated pump. An image is then immediately taken of the droplet (before material can take up the droplet), and the contact angle of both edges of the water droplet are measured from the image. The decrease in contact angle between the dried and wet samples is calculated by subtracting the measured contact angle of the wet material from the measured contact angle of the dry material.

(V)—Coefficient of Friction Test

This test measures the coefficient of friction of a sample surface (e.g., an outsole surface in accordance with the present disclosure, a surface of a co-extruded film formed of the hydrogel of the present disclosure, or a surface of a neat film formed of the hydrogel of the present disclosure) for a sample (e.g., taken with the above-discussed Component Sampling Procedure, Co-extruded or Laminated Film Sampling Procedure, or the Neat Material Sampling Procedure). For a dry test (i.e., to determine a dry-state coefficient of friction), the sample is initially equilibrated at 25 degrees C. and 20 percent humidity for 24 hours. For a wet test (i.e., to determine a wet-state coefficient of friction), the sample is fully immersed in a deionized water bath maintained at 25 degrees C. for 24 hours. After that, the sample is removed from the bath and blotted with a cloth to remove surface water.

The measurement is performed with an aluminum sled mounted on an aluminum test track, which is used to perform a sliding friction test on the sample by sliding it on the aluminum surface of the test track. The test track measures 127 millimeters wide by 610 millimeters long. The aluminum sled measures 76.2 millimeters×76.2 millimeters, with a 9.5 millimeter radius cut into the leading edge. The contact area of the aluminum sled with the track is 76.2 millimeters×66.6 millimeters, or 5,100 square millimeters).

The dry or wet sample is attached to the bottom of the sled using a room temperature-curing two-part epoxy adhesive commercially available under the tradename "LOCTITE 608" from Henkel, Düsseldorf, Germany. The adhesive is used to maintain the planarity of the wet sample, which can curl when saturated. A polystyrene foam having a thickness of about 25.4 millimeters is attached to the top surface of the sled (opposite of the test sample) for structural support.

The sliding friction test is conducted using a screw-driven load frame. A tow cable is attached to the sled with a mount supported in the polystyrene foam structural support, and is wrapped around a pulley to drag the sled across the aluminum test track. The sliding or frictional force is measured using a load transducer with a capacity of 2,000 Newtons. The normal force is controlled by placing weights on top of the aluminum sled, supported by the polystyrene foam structural support, for a total sled weight of 20.9 kilograms (205 Newton). The crosshead of the test frame is increased at a rate of 5 millimeters/second, and the total test displacement is 250 millimeters. The coefficient of friction is calculated based on the steady-state force parallel to the direction of movement required to pull the sled at constant velocity. The coefficient of friction itself is found by dividing the steady-state pull force by the applied normal force. Any transient value relating static coefficient of friction at the start of the test is ignored.

(VI)—Storage Modulus Test

This test measures the resistance of a sample of material (e.g., hydrogel) to being deformed (ratio of stress to strain) when a vibratory or oscillating force is applied to it, and is a good indicator of the hydrogel's compliance in the dry and wet states. For this test, a sample is provided in film form using the Neat Film Sampling Procedure, which is modified such that the surface area of the test sample is rectangular with dimensions of 5.35 millimeters wide and 10 millimeters long. The material thickness can range from 0.1 millimeters to 2 millimeters, and the specific range is not particularly limited as the end modulus result is normalized according to material thickness.

The storage modulus (E') with units of megaPascals (MPa) of the sample is determined by dynamic mechanical analysis (DMA) using a DMA analyzer commercially available under the tradename "Q800 DMA ANALYZER" from TA Instruments, New Castle, DE, which is equipped with a relative humidity accessory to maintain the sample at constant temperature and relative humidity during the analysis.

Initially, the thickness of the test sample is measured using calipers (for use in the modulus calculations). The test sample is then clamped into the DMA analyzer, which is operated at the following stress/strain conditions during the analysis: isothermal temperature of 25 degrees C., frequency of 1 Hertz, strain amplitude of 10 micrometers, preload of 1 Newton, and force track of 125 percent. The DMA analysis is performed at a constant 25 degrees C. temperature according to the following time/relative humidity (RH) profile: (i) 0 percent RH for 300 minutes (representing the dry state for storage modulus determination), (ii) 50 percent RH for 600 minutes, (iii) 90 percent RH for 600 minutes (representing the wet state for storage modulus determination), and (iv) 0 percent RH for 600 minutes.

The E' value (in MPa) is determined from the DMA curve according to standard DMA techniques at the end of each time segment with a constant RH value. Namely, the E' value at 0 percent RH (i.e., the dry-state storage modulus) is the value at the end of step (i), the E' value at 50 percent RH is the value at the end of step (ii), and the E' value at 90 percent RH (i.e., the wet-state storage modulus) is the value at the end of step (iii) in the specified time/relative humidity profile.

The sample of the material can be characterized by its dry-state storage modulus, its wet-state storage modulus, or the reduction in storage modulus between the dry-state and wet-state materials, where wet-state storage modulus is less than the dry-state storage modulus. This reduction in storage modulus can be listed as a difference between the dry-state storage modulus and the wet-state storage modulus, or as a percentage change relative to the dry-state storage modulus.

(VII)—Glass Transition Temperature Test

This glass transition temperature may be determined according to the test method detailed in ASTM D3418-97 Standard Test Method for Transition Temperatures and Enthalpies of Fusion and Crystallization of Polymers by Differential Scanning Calorimetry, consistent with the description herein. This test measures the glass transition temperature ($T_g$) of a sample of the hydrogel, where the hydrogel is provided in neat form, such as with the Neat Film Sampling Procedure or the Neat Material Sampling Procedure, with a 10-milligram sample weight. The sample is measured in both a dry state and a wet state (i.e., after exposure to a humid environment as described herein).

The glass transition temperature is determined with DMA using a DMA analyzer commercially available under the tradename "Q2000 DMA ANALYZER" from TA Instruments, New Castle, DE, which is equipped with aluminum hermetic pans with pinhole lids, and the sample chamber is purged with 50 milliliters/minute of nitrogen gas during analysis. Samples in the dry state are prepared by holding at 0 percent RH until constant weight (less than 0.01 percent weight change over a 120 minute period). Samples in the wet state are prepared by conditioning at a constant 25 degrees C. according to the following time/relative humidity (RH) profile: (i) 250 minutes at 0 percent RH, (ii) 250 minutes at 50 percent RH, and (iii) 1,440 minutes at 90 percent RH. Step (iii) of the conditioning program can be terminated early if sample weight is measured during conditioning and is measured to be substantially constant within 0.05 percent during an interval of 100 minutes.

After the sample is prepared in either the dry or the wet state, it is analyzed by Differential Scanning Calorimetry (DSC) to provide a heat flow versus temperature curve. The DSC analysis is performed with the following time/temperature profile: (i) equilibrate at −90 degrees C. for 2 minutes, (ii) ramp at +10 degrees C./minute to 250 degrees C., (iii) ramp at −50 degrees C./minute to −90 degrees C., and (iv) ramp at +10 degrees C./minute to 250 degrees C. The glass transition temperature value (in Celsius) is determined from the DSC curve according to standard DSC techniques.

(VIII) Melt Flow Index Test.

The melt flow index is determined according to the test method detailed in ASTM D1238-13 Standard Test Method for Melt Flow Rates of Thermoplastics by Extrusion Plastometer, using Procedure A described therein. Briefly, the melt flow index measures the rate of extrusion of thermoplastics through an orifice at a prescribed temperature and load. In the test method, approximately 7 grams of the material is loaded into the barrel of the melt flow apparatus, which has been heated to a temperature specified for the material. A weight specified for the material is applied to a plunger and the molten material is forced through the die. A timed extrudate is collected and weighed. Melt flow rate values are calculated in g/10 min.

(IX) Cold Ross Flex Test.

The cold Ross flex test is determined according the following test method. The purpose of this test is to evaluate the resistance to cracking of a sample under repeated flexing to 60 degrees in a cold environment. A thermoformed plaque of the material for testing is sized to fit inside the flex tester machine. Each material is tested as five separate samples. The flex tester machine is capable of flexing samples to 60 degrees at a rate of 100+/−5 cycles per minute. The mandrel diameter of the machine is 10 millimeters. Suitable machines for this test are the Emerson AR-6, the Satra S Tm 141F, the Gotech GT-7006, and the Shin II Scientific SI-LTCO (DaeSung Scientific). The sample(s) are inserted into the machine according to the specific parameters of the flex machine used. The machine is placed in a freezer set to −6 degrees Celsius for the test. The motor is turned on to begin flexing with the flexing cycles counted until the sample cracks. Cracking of the sample means that the surface of the material is physically split. Visible creases of lines that do not actually penetrate the surface are not cracks. The sample is measured to a point where it has cracked but not yet broken in two.

(X) Modulus Test.

The modulus for a thermoformed plaque of material is determined according to the test method detailed in ASTM D412-98 Standard Test Methods for Vulcanized Rubber and Thermoplastic Rubbers and Thermoplastic Elastomers-Tension, with the following modifications. The sample dimension is the ASTM D412-98 Die C, and the sample thickness used is 2.0 millimeters+/−0.5 millimeters. The grip type used is a pneumatic grip with a metal serrated grip face.

The grip distance used is 75 millimeters. The loading rate used is 500 millimeters/minute. The modulus (initial) is calculated by taking the slope of the stress (MPa) versus the strain in the initial linear region.

Within this specification, embodiments have been described in a way which enables a clear and concise specification to be written, but it is intended and will be appreciated that embodiments can be variously combined or separated without parting from the invention. For example, it will be appreciated that all preferred features described herein are applicable to all aspects of the invention described herein.

Additional aspects of the composition and properties of the hydrogels incorporated into the outsoles used in forming articles of footwear herein, as well as additional aspects of other components used in the articles of footwear and additional aspects of the associated test methods and sampling procedures are described in International Patent Publication No.'s WO 2016/033276A1 (Int. Appl. No. PCT/US2015/047086); WO 2016/033274A1 (Int. Appl. No. PCT/US2015/047084); and WO 2016/033271A1 (Int. Appl. No. PCT/US2015/047081). The entire contents of each of these patent publications are hereby incorporated by reference.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

The present disclosure can be described in accordance with the following numbered Clauses.

Clause 1. A method of manufacturing an outsole component for an article of footwear, the method comprising:
providing a film component, the film component including a first layer compositionally comprising a polymeric hydrogel material, the first layer defining an externally-facing surface of the film component;
providing a mold having a molding surface;
placing the film component into the mold so that a portion of the first layer contacts a portion of the molding surface;
restraining the portion of the first layer against the portion of the molding surface while charging a second polymeric material into the mold;
at least partially solidifying the charged second polymeric material in the mold to produce the outsole component with the portion of the first layer of the film component forming an outermost layer of the outsole component; and removing the outsole component from the mold.

Clause 2. The method of manufacturing according to Clause 1, wherein the step of providing the film component comprises providing a film component having a substantially planar geometry.

Clause 3. The method of manufacturing according to Clause 1 or 2, wherein the step of providing the film component comprises providing an extruded film component.

Clause 4. The method of manufacturing according to any of Clauses 1-3, wherein the step of providing the film component comprises providing a film component comprising a layered film including a backing layer operably connected to the first layer, the backing layer compositionally comprising a third polymeric material.

Clause 5. The method of manufacturing according to any of Clauses 1-4, wherein the step of placing the film component into the mold so that a portion of the first layer contacts a portion of the molding surface comprises placing the film component into the mold so that the first layer contacts a portion of the molding surface which is less than 85% of a total molding surface area of the mold.

Clause 6. The method of manufacturing according to any of Clauses 1-5, wherein the method includes maintaining the film component at a temperature in a range of about 10 degrees Celsius (C) to about 80 degrees C. except while charging the second polymeric material into the mold, following charging the second polymeric material into the mold, and while at least partially solidifying the charged second polymeric material in the mold.

Clause 7. The method of manufacturing according to any of Clauses 1-6, wherein the step of providing the film component comprises providing the third polymeric material;
providing the polymeric hydrogel material;
forming the layered film from the polymeric hydrogel material and the third polymeric material using a co-extrusion process or a lamination process; and cutting the layered film to form the film component.

Clause 8. The method of manufacturing according to any of Clauses 1-7, wherein the method further comprises providing a pre-formed traction element and adding the pre-formed traction element to the mold before charging the second polymeric material into the mold.

Clause 9. The method of manufacturing according to any of Clauses 1-8, wherein the method further comprises providing a pre-formed fitting for a traction element and adding the pre-formed fitting for a traction element to the mold before charging the second polymeric material into the mold.

Clause 10. The method of manufacturing according to any one of Clauses 1-9, wherein providing the film component comprises cutting a film to form the film component, wherein the film component is configured to fit between or around one or more traction elements.

Clause 11. The method of manufacturing according to Clause 9, wherein the step of providing the film component comprises die cutting a film using a flatbed press or a rotary press to form the film component.

Clause 12. The method of manufacturing according to Clause 11, wherein the step of die cutting uses a solid engraved die, an adjustable die, magnetic plate tooling, a dinking die, or a combination thereof.

Clause 13. The method of manufacturing according to any one of Clauses 1-12, wherein the step of providing the film component comprises configuring a portion of a film to fit between or around one or more traction elements by cutting one or more holes in the portion of the film to accommodate the traction elements, or by shaping the portion of the film to avoid the one or more traction elements, or by both cutting and shaping the film.

Clause 14. The method of manufacturing according to any of Clauses 1-13, wherein the second polymeric material is a thermoplastic polymeric material.

Clause 15. The method of manufacturing according to any of Clauses 1-14, wherein the third polymeric material is a thermoplastic polymeric material.

Clause 16. The method of manufacturing according to any of Clauses 1-15, wherein the step of charging the second polymeric material into the mold comprises closing the mold and injecting the second polymeric material into the closed mold using an injection molding process.

Clause 17. The method of manufacturing according to any of Clauses 1-16, wherein charging the second polymeric material into the mold comprises charging the second polymeric material into the mold, closing the mold before, during or after the charging, and applying compression to the closed mold.

Clause 18. The method of manufacturing according to any of Clauses 1-17, wherein the step of restraining the first layer against the portion of the molding surface comprises using a vacuum, using one or more retractable pins, or using both a vacuum and one or more retractable pins.

Clause 19. The method of manufacturing according to any of Clauses 1-18, wherein the molding surface is in the predetermined shape of the component of the outsole.

Clause 20. The method of manufacturing the outsole according to any of Clauses 1-19, wherein at least a portion of the molding surface has a predetermined curvature.

Clause 21. The method of manufacturing according to any of Clauses 1-20, wherein placing the film component in the mold and/or restraining the portion of the first layer of the film component against the portion of the molding surface includes bending or curving the film component to conform to a curvature of the molding surface while maintaining the film component at a temperature in a range of about 10 degrees C. to about 80 degrees C.

Clause 22. The method of manufacturing the outsole according to any of Clauses 1-21, wherein the second and third polymeric materials are substantially the same in composition.

Clause 23. The method of manufacturing the outsole according to any of Clauses 1-21, wherein the second and third polymeric materials are substantially different in composition from one another.

Clause 24. The method of manufacturing according to any of Clauses 1-23, wherein the one or more traction elements are integrally formed with the outsole component during the molding step; separately added as snap-fit or screw-on components after the outsole is removed from the mold; or a combination thereof.

Clause 25. The method of manufacturing according to any of Clauses 1-24, where the one or more traction elements are integrally formed with the outsole component using the second polymeric material.

Clause 26. The method of manufacturing according to any of Clauses 1-25, wherein the method further comprises adding a fourth polymeric material into the mold;
wherein the fourth polymeric material integrally forms the traction elements as part of the outsole component.

Clause 27. The method of manufacturing according to Clause 26, wherein the fourth polymeric material is a thermoplastic polymeric material.

Clause 28. The method of manufacturing according to any of Clauses 26 or 27, wherein the fourth polymeric material is substantially the same in composition as the second polymeric material.

Clause 29. The method of manufacturing according to any of Clauses 26 or 27, wherein the fourth polymeric material has a greater level of abrasion resistance than the second polymeric material.

Clause 30. The method of manufacturing according to any of Clauses 1-29, wherein the method further comprises placing one or more fittings into the mold prior to adding the second polymeric material;
wherein the one or more fittings are configured to couple with the snap-fit or screw-on components.

Clause 31. The method of manufacturing according to any of Clauses 1-30, wherein the method further comprises placing one or more preformed traction element tips into the mold prior to adding the second polymeric material.

Clause 32. The method of manufacturing according to any of Clauses 30 or 31, wherein the snap-fit or screw-on components comprise a material that is different in composition from the second polymeric material.

Clause 33. The method of manufacturing according to any of Clauses 1-33, wherein the outsole component comprises traction elements, and the traction elements are lugs, cleats, studs, spikes, or a combination thereof.

Clause 34 The method of manufacturing according to any of Clauses 1-33, wherein the outsole component has a water uptake capacity at 1 hour of greater than 40 percent by weight as characterized by the Water Uptake Capacity Test with the Component Sampling Procedure.

Clause 35. The method of manufacturing according to any of Clauses 1-34, wherein the outsole component has a water uptake rate greater than 20 $g/m^2/\sqrt{min}$ as characterized by the Water Uptake Rate Test with the Component Sampling Procedure.

Clause 36. The method of manufacturing according to any of Clauses 1-35, wherein the outsole component has a swell thickness increase at 1 hour greater than 20 percent as characterized by the Swelling Capacity Test with the Component Sampling Procedure.

Clause 37. The method of manufacturing according to any of Clauses 1-36, wherein at least a portion of the external surface of the outsole component exhibits one or more of a wet-state contact angle less than 80° as characterized by the Contact Angle Test and a wet-state coefficient of friction less than 0.8 as characterized by the Coefficient of Friction Test, with the Component Sampling Procedure.

Clause 38. The method of manufacturing according to any of Clauses 1-37, wherein the polymeric hydrogel material exhibits a wet-state glass transition temperature equilibrated at 90 percent relative humidity and a dry-state glass transition temperature equilibrated at 0 percent relative humidity, as characterized by the Glass Transition Temperature Test with the Neat Material Sampling Process;
wherein the wet state glass transition temperature is more than 6 degrees C. lower than the dry-state glass transition temperature.

Clause 39. The method of manufacturing according to any of Clauses 1-38, wherein the polymeric hydrogel material has a wet-state storage modulus when equilibrated at 90 percent relative humidity and a dry-state storage modulus when equilibrated at 0 percent relative humidity, as characterized by the Storage Modulus Test with the Neat Material Sampling Procedure;
wherein the wet-state storage modulus is less than the dry-state storage modulus of the polymeric hydrogel material.

Clause 40. The method of manufacturing according to any of Clauses 1-39, wherein the polymeric hydrogel material is a thermoplastic hydrogel material.

Clause 41. The method of manufacturing according to any of Clauses 1-40, wherein the polymeric hydrogel material comprises one or more polymers selected from a polyurethane, a polyamide homopolymer, a polyamide copolymer, and any combination thereof.

Clause 42. The method of manufacturing according to any of Clauses 1-41, wherein the polymeric hydrogel material comprises a polyurethane.

Clause 43. The method of manufacturing according to Clause 42, wherein the polyurethane is a thermoplastic polyurethane.

Clause 44. The method of manufacturing according to any of Clauses 1-43, wherein the polymeric hydrogel material comprises a polyamide block copolymer.

Clause 45. The method of manufacturing according to any of Clauses 1-44, wherein the polymeric hydrogel material comprises at least 80% of an external surface of the outsole component.

Clause 46. The method of manufacturing according to any of Clauses 1-45, wherein the polymeric hydrogel material has a dry-state thickness ranging from 0.1 millimeters (mm) to 2 mm.

Clause 47. The method of manufacturing according to any of Clauses 1-46, wherein at least one of the second polymeric material and the third polymeric material comprises one or more natural or synthetic rubbers.

Clause 48. The method of manufacturing according to any of Clauses 1-47, wherein the second polymeric material and/or the third polymeric material further comprises one or more processing aids.

Clause 49. The method of manufacturing according to Clause 48, wherein the processing aids are independently selected from the group of curing agents, initiators, plasticizers, mold release agents, lubricants, antioxidants, flame retardants, dyes, pigments, reinforcing and non-reinforcing fillers, fiber reinforcements, and light stabilizers.

Clause 50. The method of manufacturing according to any of Clauses 1-49, wherein the step of at least partially solidifying the second polymeric material comprises at least partially crosslinking the second polymeric material.

Clause 51. The method of manufacturing according to Clause 50, wherein the step of at least partially crosslinking the second polymeric material comprises at least partially crosslinking the second polymeric material using a sulfur-based crosslinking process, or a peroxide-initiated crosslinking process.

Clause 52. The method of manufacturing according to Clause 51, wherein the cross-linking mechanisms occur upon exposure of the first polymeric material and/or second polymeric materials to actinic radiation at a concentration and for a duration of time sufficient to at least partially cure the first and/or second polymeric materials.

Clause 53. The method of manufacturing according to any of Clauses 1-52, wherein the first polymeric material and/or second polymeric material is fully cured.

Clause 54. An outsole component manufactured according to the method of any of Clauses 1-53.

Clause 55. A method of manufacturing an article of footwear, the method comprising:
  providing an outsole component manufactured according to any of the Clauses 1-53;
  providing an upper; and
  securing the outsole component and the upper to each other, such that the polymeric hydrogel material of the outsole component defines a ground-facing surface of the article of footwear.

Clause 56. The method according to Clause 55, wherein the method further comprises:
  receiving a midsole; and
  attaching the midsole to the outsole component and/or the upper prior to securing the outsole component to the upper, such that the midsole resides between the outsole component and the upper.

Clause 57. The method according to any of Clauses 55 or 56, wherein the upper comprises, leather, a thermoset polymer, a thermoplastic polymer, or a mixture thereof.

Clause 58. The method according to any of Clauses 55-57, wherein the upper comprises a textile selected as one from a knit textile, a woven textile, a non-woven textile, a braided textile, or a combination thereof.

Clause 59. The method according to Clause 58, wherein the textile includes one or more natural or synthetic fibers or yarns.

Clause 60. The method according to Clause 59, wherein the synthetic fibers or yarns comprise a thermoplastic polyurethane (TPU), a polyamide, a polyester, a polyolefin, or a mixture thereof.

Clause 61. The method according to any of Clauses 55-60, wherein securing the outsole component to the upper includes the use of an adhesive, a primer, or a combination thereof.

Clause 62. An outsole for use in an article of footwear comprising an outsole component manufactured according to any of Clauses 1-54.

Clause 63. The use of the outsole component formed according to the method of any of Clauses 1-54 in the article of footwear.

Clause 64. The article of footwear manufactured according to any of Clauses 55-61.

Clause 65. The use of an article of footwear formed according to the method of any of Clauses 55-61.

Clause 66. An outsole component for an article of footwear, the outsole component comprising:
  a film component, the film component having a first surface, a second surface opposite the ground-contacting surface, and an external perimeter, the film component compositionally comprising a polymeric hydrogel material, the polymeric hydrogel material defining the first surface of the film component, and at least a portion of the first surface of the film component providing at least a portion of a ground-contacting surface of the outsole component;
  a second polymeric material operably connected to the second surface of the film component and to the entire external perimeter of each of the one or more film components; and
  one or more traction elements;
  wherein the film component fits between or around the one or more traction elements.

Clause 67. The outsole component according to Clause 66, wherein the outsole component comprises one or more traction elements, the one or more traction elements having a ground-contacting surface, and the ground-contacting surface of the one or more traction elements does not include the film component.

Clause 68. The outsole component according to Clause 66 or 67, wherein the film component has a void having an interior perimeter, and the traction element passes through the void of the film component.

Clause 69. The outsole component according to any of Clauses 66-68, wherein the traction element comprises the second polymeric material, and the second polymeric material is operably connected to the interior perimeter of the film component.

Clause 70. The outsole component according to any of Clauses 66-69, wherein the second polymeric material defines the ground-contacting surface of the traction element.

What is claimed is:

1. An outsole manufactured according to the following steps comprising:
  providing a mold having a molding surface;
  placing a pre-cut flat film component that has not been thermoformed into the mold, wherein the flat film component comprises a first externally-facing surface, the flat film component including a first layer compositionally comprising a polymeric hydrogel material, the first layer defining at least a portion of the first externally-facing surface of the flat film component;

placing and restraining the flat film component so that at least a portion of the first layer is in contact with the molding surface, forming a restrained film component;

maintaining the flat film component at a temperature in a range of about 10 degrees Celsius (C) to about 80 degrees C. during at least the step of placing and restraining the flat film component so that the flat film component is not thermoformed;

charging a second polymeric material into the mold with the restrained film component;

at least partially solidifying the charged second polymeric material in the mold to produce an outsole component with an outermost surface comprising at least a portion of the first layer of the film component; and removing the outsole component from the mold.

2. The outsole manufactured according to claim 1, further comprising a step of extruding or co-extruding a flat film component comprising the polymeric hydrogel material.

3. The outsole manufactured according to claim 1, wherein the flat film component further comprises a backing layer operably connected to the first layer, the backing layer compositionally comprising a third polymeric material.

4. The outsole manufactured according to claim 1, wherein the flat film component is placed or restrained in the mold so that less than 85 percent of a total molding surface area of the mold is contacted by the flat film component.

5. The outsole manufactured according to claim 1, wherein the method further comprises a step of maintaining the flat film component at a temperature in a range of about 10 degrees C. to about 80 degrees C. except during the steps of charging the second polymeric material into the mold, and at least partially solidifying the charged second polymeric material in the mold.

6. The outsole manufactured according to claim 3, wherein the method further comprises:
a step of providing the third polymeric material;
a step of providing the polymeric hydrogel material;
a step of forming a layered film comprising a first layer of polymeric hydrogel material and a backing layer comprising the third polymeric material using a co-extrusion process or a lamination process; and
a step of cutting the layered film to form the flat film component.

7. The outsole manufactured according to claim 1, wherein the method further comprises providing one or more traction elements that are formed integrally with or operably coupled with the molded outsole component, or a combination thereof.

8. The outsole manufactured according to claim 7, wherein the method further comprises a step of adding a pre-formed traction element or pre-formed fitting for a traction element to the mold before charging the second polymeric material into the mold.

9. The outsole manufactured according to claim 7, wherein the flat film component is configured to fit between or around the one or more traction elements.

10. The outsole manufactured according to claim 1, further comprising a step of die cutting a film using a flatbed press, a rotary press, a solid engraved die, an adjustable die, magnetic plate tooling, a dinking die, or a combination thereof, to form the film component.

11. The outsole manufactured according to claim 7, further comprising a step of cutting one or more holes or voids in a portion of the flat film component that corresponds to the location of the one or more traction elements, or by shaping a portion of the flat film component to avoid the location of one or more traction elements, or by both cutting and shaping the film component.

12. The outsole manufactured according to claim 1, wherein the second polymeric material is a thermoplastic polymeric material.

13. The outsole manufactured according to claim 3, wherein the third polymeric material is a thermoplastic polymeric material.

14. The outsole manufactured according to claim 1, wherein the step of restraining the first layer against the portion of the molding surface comprises a step of using a vacuum, using one or more retractable pins, or using both a vacuum and one or more retractable pins.

15. The outsole manufactured according to claim 1, wherein placing the flat film component in the mold and/or restraining the portion of the first layer of the flat film component against the portion of the molding surface comprises a step of bending or curving the flat film component to conform to a curvature of the molding surface while maintaining the flat film component at a temperature in a range of about 10 degrees C. to about 80 degrees C.

16. The outsole manufactured according to claim 1, wherein the polymeric hydrogel material comprises polymers or copolymers of polyurethane, polyurea, polyester, polycarbonate, polyetheramide, addition polymers of ethylenically unsaturated monomers, and any combination thereof.

* * * * *